(12) United States Patent
Amour

(10) Patent No.: US 8,065,212 B2
(45) Date of Patent: Nov. 22, 2011

(54) SYSTEM AND METHODS FOR PROVIDING GAMING ACTIVITIES

(75) Inventor: Marc Amour, Potts Point (AU)

(73) Assignee: SRG Enterprizes Pty Limited, Ruschcutters Bay, New South Wales (AU)

( * ) Notice: Subject to any disclaimer, the term of this patent is extended or adjusted under 35 U.S.C. 154(b) by 0 days.

(21) Appl. No.: 12/527,341

(22) PCT Filed: Sep. 10, 2008

(86) PCT No.: PCT/AU2008/001348
§ 371 (c)(1),
(2), (4) Date: Mar. 16, 2010

(87) PCT Pub. No.: WO2009/033222
PCT Pub. Date: Mar. 19, 2009

(65) Prior Publication Data
US 2010/0227672 A1 Sep. 9, 2010

(30) Foreign Application Priority Data

| Sep. 10, 2007 | (AU) | 2007904938 |
| Mar. 3, 2008 | (AU) | 2008100204 |
| Mar. 3, 2008 | (AU) | 2008100206 |
| Mar. 3, 2008 | (AU) | 2008100207 |
| Mar. 3, 2008 | (AU) | 2008100208 |
| Mar. 3, 2008 | (AU) | 2008100209 |
| Apr. 2, 2008 | (AU) | 2008901580 |

(51) Int. Cl.
*G06Q 40/00* (2006.01)

(52) U.S. Cl. ............ 705/35; 705/39; 705/42; 705/64; 705/44

(58) Field of Classification Search ............ 705/1, 35, 705/1.1, 44, 42, 39, 36; 463/42, 25, 29; 235/379; 600/365, 347, 558
See application file for complete search history.

(56) References Cited

U.S. PATENT DOCUMENTS

| 5,252,811 A | 10/1993 | Henochowicz et al. |
| 7,351,142 B2 * | 4/2008 | Walker et al. .......... 463/17 |
| 2003/0125011 A1 | 7/2003 | Campbell |

(Continued)

FOREIGN PATENT DOCUMENTS

AU    2007100540 A4    8/2007

(Continued)

OTHER PUBLICATIONS

Nevala Gaming Commission: Regulators approve Venetian fine—Las Vegas Review—Journal—by Rod Smith—Mar. 19, 2004.*

*Primary Examiner* — Ella Colbert
*Assistant Examiner* — John H Holly
(74) *Attorney, Agent, or Firm* — Katten Machin Rosenman LLP

(57) ABSTRACT

Systems and methods for providing gaming activities, these particularly relating to gaming activities implemented in conjunction with a flexible credit arrangement. A consumer is allocated one or more entries in a gaming activity based on a level of transactable flexible credit held by that consumer. For example, the allocation of entries is increased or decreased subject to a corresponding increase or decrease in transactable flexible credit held by the consumer. In some aspects of the present invention, one or more prizes for the gaming activity are funded in whole, or in part, by way of supplementary contributions realized on the basis of consumers' participation in a flexible credit infrastructure.

30 Claims, 26 Drawing Sheets

U.S. PATENT DOCUMENTS

| | | |
|---|---|---|
| 2004/0222285 A1 | 11/2004 | Pohl |
| 2004/0266534 A1 | 12/2004 | Byng |
| 2005/0060258 A1 | 3/2005 | Murphy |
| 2006/0154723 A1 | 7/2006 | Saffari et al. |
| 2007/0167219 A1 | 7/2007 | Groz |

FOREIGN PATENT DOCUMENTS

| | | | |
|---|---|---|---|
| WO | 2006/020692 A2 | | 2/2006 |
| WO | WO 2006/020692 | * | 2/2006 |
| WO | 2007/044925 A2 | | 4/2007 |

* cited by examiner

SYSTEM AND METHODS FOR PROVIDING GAMING ACTIVITIES

This application is a national stage of PCT/AU2008/001348, filed on Sep. 10, 2008, which claims priority to the following applications: AU2008901580, filed on Apr. 2, 2008; AU2008100204, filed on Mar. 3, 2008; AU2008100206, filed on Mar. 3, 2008; AU2008100207, filed on Mar. 3, 2008; AU2008100208, filed on Mar. 3, 2008; AU2008100209, filed on Mar. 3, 2008; and AU2007904938, filed on Sep. 10, 2007. The entire contents and disclosures of which is hereby incorporated by reference.

FIELD OF THE INVENTION

The present invention relates to systems and methods for providing gaming activities. Some embodiments provide hardware and software components for the implementation of such systems and methods. The term "gaming" is intended to be interpreted in the broadest sense, as encompassing the fields of gambling, gaming, wagering, betting, lotteries and games or competitions of skill and/or knowledge and/or chance.

BACKGROUND TO THE INVENTION

The following discussion of the background art is intended to place the invention in an appropriate context and to allow the unique characteristics and advantages of it to be more fully understood. However, any discussion of the background art throughout the specification should in no way be considered as an express or implied admission that such background art is widely known or forms part of common general knowledge in the field.

Traditionally, gaming activities have relied upon a model whereby a player exchanges an entry fee for one or more entries, and does so on the basis that the entry fee is placed at risk in the sense that it will be lost should the one or more entries not be identified as winning entries. This traditional model is founded on a principle whereby entry fees are central to the funding of prizes for a gaming activity.

The present inventor has recognised alternatives to the traditional model. In particular, as discussed in PCT/AU2007/000774, it is possible to use notions of "supplementary contribution" to fund prizes without necessarily making direct use of entry fee capital. In a general sense, by engaging in predefined activities, a player is able to assist in the funding of a prize pool by way of supplementary contribution without necessarily placing any funds at risk. So as to provide a straightforward example, a lottery may be conducted whereby players submit respective entry fees, and subsequently receive full refunds of their entry fees. Notions of supplementary contribution allow a prize pool for that lottery to be funded in whole, or in part, by funds derived by the investment of the players' entry fees for a predetermined period of time. In some cases, the prize pool is funded in whole, or in part, players' supplementary contributions are funded by third parties in consideration for a benefit they receive from the players' involvement in the lottery—for example in terms of a marketing benefit.

By moving away from the traditional model of gaming, there is scope to apply gaming principles in broader contexts.

SUMMARY OF THE INVENTION

It is an object of the present invention to overcome or ameliorate one or more of the disadvantages of the prior art, or at least to provide a useful alternative.

One embodiment provides a method for providing a gaming activity, the method including the steps of:

receiving, subject to an interaction between a consumer and a supplier, data indicative of an account identifier and associated data indicative of a flexible credit adjustment;

querying a consumer account database to identify a consumer account corresponding to the account identifier, wherein each account includes:
  data indicative of a level of transactable flexible credit; and
  data indicative of an allocated none or more entries in a risk free gaming activity;

updating the level of flexible credit in the identified consumer account based on the flexible credit adjustment;

updating the data indicative of the allocated none or more entries such that the allocation of entries corresponds to the updated level of flexible credit.

One embodiment provides a method wherein the transactable flexible credit includes one or more reward points in the context of a reward program.

One embodiment provides a method wherein the data indicative of a flexible credit adjustment includes data indicative of a residual transaction amount.

One embodiment provides a method wherein the data indicative of a flexible credit adjustment includes data indicative of an increase or decrease in value on a stored value card.

One embodiment provides a method wherein the transactable flexible credit includes gaming value in the context of a gaming value account.

One embodiment provides a method wherein the transactable flexible credit includes prepaid credit in the context of a prepaid credit arrangement.

One embodiment provides a method wherein the transactable flexible credit includes credit in an account with a financial institution.

One embodiment provides a method wherein the data indicative of a flexible credit adjustment includes data indicative of one or more characteristics of the interaction between the consumer and the supplier.

One embodiment provides a method wherein the interaction includes a transaction between the consumer and the supplier, and wherein the data indicative of a flexible credit adjustment includes data indicative of a purchase amount for the transaction between the consumer and the supplier.

One embodiment provides a method wherein the interaction includes a transaction between the consumer and the supplier, and wherein the data indicative of a flexible credit adjustment includes data indicative of goods and/or services related to the transaction between the consumer and the supplier.

One embodiment provides a method wherein the data indicative of a flexible credit adjustment includes timing information for the interaction between the consumer and the supplier.

One embodiment provides a method wherein the step of updating the data indicative of the allocated none or more entries is performed retrospectively.

One embodiment provides a method wherein the step of updating the data indicative of the allocated none or more entries includes:

(i) determining whether the flexible credit adjustment is positive or negative;

(ii) in the case that the flexible credit adjustment is positive, increasing the allocation of entries; and (iii) in the case that the flexible credit adjustment is negative, decreasing the allocation of entries.

One embodiment provides a method wherein increasing the allocation of entries includes wholly or partially allocating one or more entries to the consumer account.

One embodiment provides a method wherein decreasing the allocation of entries includes wholly or partially de-allocating one or more entries from the consumer account.

One embodiment provides a method including the steps of:
identifying one or more winning entries;
identifying a prize amount associated with each winning entry;
identifying one or more consumer accounts for which the data indicative of none or more entries is indicative of one or more of the winning entries;
distributing prizes associated with the winning entries between the identified consumer accounts.

One embodiment provides a method wherein the data indicative of none or more entries is indicative of a non-zero allocation proportion for at least one winning entry, and wherein a portion of a prize amount associated with that winning entry is distributed to that consumer account based on the non-zero allocation proportion.

One embodiment provides a method for providing a gaming activity, the method including the steps of:
receiving entry fees from one or more players;
combining the entry fees to provide an entry fee pool;
defining a prize portion of the entry fee pool for addition to a prize pool;
deriving gross supplementary income by virtue of either or both of:
(a) carriage of the funds defining the entry fee pool;
(b) interaction with one or more of the players;
defining net supplementary income by subtracting one or more predefined deductions from the gross supplementary income;
combining the prize portion of the entry fee pool with the net supplementary income to form the prize pool, wherein the prize pool has a value greater than the sum of the entry fees; and
distributing the prize pool among winning players based on a distribution protocol.

In one embodiment the gaming activity is a recurring gaming activity.

In one embodiment deriving gross supplementary income by virtue of carriage of the funds defining the entry fee pool includes subjecting some or all of the entry fee pool to an investment procedure to derive gross investment income.

In one embodiment deriving gross supplementary income by virtue of interaction with one or more of the players includes providing marketing information to one or more of the players, or personal information from one or more of the players, in exchange for gross marketing income from a third party.

In one embodiment deriving gross supplementary income by virtue of interaction with one or more of the players includes providing personal and/or contact information regarding one or more of the players to a third party in exchange for gross marketing income from that third party.

One embodiment provides a method for managing flexible credit, the method including the steps of:
receiving, subject to an interaction between a consumer and a supplier, data indicative of an account identifier and associated data indicative of a flexible credit adjustment;
querying a consumer account database to identify a consumer account corresponding to the account identifier, wherein each account includes:
data indicative of a level of transactable flexible credit; and
data indicative of an allocated none or more entries in a risk free gaming activity;
updating the level of flexible credit in the identified consumer account based on the flexible credit adjustment;
updating the data indicative of the allocated none or more entries such that the allocation of entries corresponds to the updated level of flexible credit.

One embodiment provides a method wherein the transactable flexible credit includes one or more reward points in the context of a reward program.

One embodiment provides a method wherein the data indicative of a flexible credit adjustment includes data indicative of a residual transaction amount.

One embodiment provides a method wherein the data indicative of a flexible credit adjustment includes data indicative of an increase or decrease in value on a stored value card.

One embodiment provides a method wherein the transactable flexible credit includes gaming value in the context of a gaming value account.

One embodiment provides a method wherein the transactable flexible credit includes prepaid credit in the context of a prepaid credit arrangement.

One embodiment provides a method wherein the transactable flexible credit includes credit in an account with a financial institution.

One embodiment provides a method wherein the data indicative of a flexible credit adjustment includes data indicative of one or more characteristics of the interaction between the consumer and the supplier.

One embodiment provides a method wherein the interaction includes a transaction between the consumer and the supplier, and wherein the data indicative of a flexible credit adjustment includes data indicative of a purchase amount for the transaction between the consumer and the supplier.

One embodiment provides a method wherein the interaction includes a transaction between the consumer and the supplier, and wherein the data indicative of a flexible credit adjustment includes data indicative of goods and/or services related to the transaction between the consumer and the supplier.

One embodiment provides a method wherein the data indicative of a flexible credit adjustment includes timing information for the interaction between the consumer and the supplier.

One embodiment provides a method wherein the step of updating the data indicative of the allocated none or more entries is performed retrospectively.

One embodiment provides a method wherein the step of updating the data indicative of the allocated none or more entries includes:
(i) determining whether the flexible credit adjustment is positive or negative;
(ii) in the case that the flexible credit adjustment is positive, increasing the allocation of entries; and
(iii) in the case that the flexible credit adjustment is negative, decreasing the allocation of entries.

One embodiment provides a method wherein increasing the allocation of entries includes wholly or partially allocating one or more entries to the consumer account.

One embodiment provides a method wherein decreasing the allocation of entries includes wholly or partially de-allocating one or more entries from the consumer account.

One embodiment provides a method including the steps of:
identifying one or more winning entries;
identifying a prize amount associated with each winning entry;

identifying one or more consumer accounts for which the data indicative of none or more entries is indicative of one or more of the winning entries;

distributing prizes associated with the winning entries between the identified consumer accounts.

One embodiment provides a method wherein the data indicative of none or more entries is indicative of a non-zero allocation proportion for at least one winning entry, and wherein a portion of a prize amount associated with that winning entry is distributed to that consumer account based on the non-zero allocation proportion.

One embodiment provides a method for managing residual transaction amounts for a plurality of consumers, the method including the steps of:

receiving data indicative of an account identifier and a residual transaction amount;

querying a consumer account database to identify a consumer account corresponding to the account identifier;

crediting the identified consumer account by an amount including at least a portion of the residual transaction amount;

receiving data indicative of the outcome of a gaming activity;

in response to the outcome of the gaming activity, querying the consumer account database to identify one or more winning consumer accounts to which prize amounts are to be distributed.

One embodiment provides a method including the step of being responsive to the residual transaction amount for associating none or more game entries with the identified consumer account.

One embodiment provides a method wherein the step of associating none or more game entries with the identified consumer account includes selectively defining at least a portion of the residual transaction amount as at least part of an entry fee, wherein the entry fee is refundable irrespective of the outcome of the gaming activity.

One embodiment provides a method including the step of crediting the identified one or more winning consumer accounts by respective prize amounts.

One embodiment provides a method including the step of being responsive to the residual transaction amount and one or more account preferences for associating none or more game entries with the identified consumer account.

One embodiment provides a method including the step of being responsive to the residual transaction amount and a supplementary contribution amount for associating none or more game entries with the identified consumer account.

One embodiment provides a method including the steps of:

commencing a gaming period;

for each consumer account, determining a number of entries in the gaming activity for association with that account;

associating with each account the respective determined number of entries.

One embodiment provides a method wherein, for a given consumer account, the determination of the number of entries is based on the credit level of account.

One embodiment provides a method wherein, for a given consumer account, the determination of the number of entries is based on the credit level of that account and a supplementary contribution amount associated with that account.

One embodiment provides a method wherein, in the case that a consumer account corresponding to the account identifier is not identifiable, the method includes the step of defining in the database a new consumer account that is identifiable on the basis of the account identifier, and identifying that new account for the purpose of the subsequent step of crediting.

One embodiment provides a method including the steps of:

receiving, for a given consumer, a withdrawal request indicative of an account identifier;

querying the consumer account database to identify a consumer account corresponding to the account identifier;

debiting the identified consumer account by an amount corresponding to the withdrawal request;

providing a signal indicative of an instruction to provide to the consumer the amount corresponding to the withdrawal request.

One embodiment provides a method wherein the amount corresponding to the withdrawal request is equal to the credit level of the identified account at the time the withdrawal request is received.

One embodiment provides a method wherein the amount corresponding to the withdrawal request is less than the credit level of the identified account at the time the withdrawal request is received.

One embodiment provides a method wherein the amount corresponding to the withdrawal request is defined by or on behalf of the consumer.

One embodiment provides a method for managing residual transaction amounts for a plurality of consumers, the method including the steps of:

receiving data indicative of an account identifier and a residual transaction amount;

querying a consumer account database to identify a consumer account corresponding to the account identifier;

crediting the identified consumer account by an amount including at least a portion of the residual transaction amount;

querying the consumer account database to determine whether or not to exchange a portion of credit in the identified consumer account for gaming value;

in the case that the portion of credit is to be exchanged for gaming value, exchanging the credit for the gaming value.

One embodiment provides a method wherein the gaming value includes one or more entries in one or more gaming activities.

One embodiment provides a method wherein the gaming value includes a partial ownership of one or more entries in one or more gaming activities.

One embodiment provides a method wherein the step of querying the consumer account database to determine whether or not to exchange a portion of credit in the identified consumer account for gaming value is performed responsive to the step of crediting the identified consumer account by an amount including at least a portion of the residual transaction amount.

One embodiment provides a method wherein the step of querying the consumer account database to determine whether or not to exchange a portion of credit in the identified consumer account for gaming value is performed on a periodic basis.

One embodiment provides a method including the step of being responsive to one or more account preferences for determining whether or not to exchange a portion of credit in the identified consumer account for gaming value.

One embodiment provides a method wherein, in the case that a consumer account corresponding to the account identifier is not identifiable, the method includes the step of defining in the database a new consumer account that is identifiable on the basis of the account identifier, and identifying that new account for the purpose of the subsequent step of crediting.

One embodiment provides a method including the steps of:

receiving, for a given consumer, a withdrawal request indicative of an account identifier;

querying the consumer account database to identify a consumer account corresponding to the account identifier;

debiting the identified consumer account by an amount corresponding to the withdrawal request;

providing a signal indicative of an instruction to provide to the consumer the amount corresponding to the withdrawal request.

One embodiment provides a method wherein the amount corresponding to the withdrawal request is equal to the credit level of the identified account at the time the withdrawal request is received.

One embodiment provides a method wherein the amount corresponding to the withdrawal request is less than the credit level of the identified account at the time the withdrawal request is received.

One embodiment provides a method wherein the amount corresponding to the withdrawal request is defined by or on behalf of the consumer.

One embodiment provides a method wherein exchanging the credit for the gaming value includes providing instructions to a gaming service provider.

One embodiment provides a system for managing residual transaction amounts for a plurality of consumers, the system including:

an interface for receiving data indicative of an account identifier and a residual transaction amount;

a processor for querying a consumer account database to identify a consumer account corresponding to the account identifier;

a processor for crediting the identified consumer account by an amount including at least a portion of the residual transaction amount;

an interface receiving data indicative of the outcome of a gaming activity;

a processor for, in response to the outcome of the gaming activity, querying the consumer account database to identify one or more winning consumer accounts to which prize amounts are to be distributed.

One embodiment provides a method for managing residual transaction amounts for a plurality of consumers, the method including the steps of:

receiving data indicative of an account identifier and a residual transaction amount;

querying a consumer account database to identify a consumer account corresponding to the account identifier;

crediting the identified consumer account by an amount including at least a portion of the residual transaction amount;

receiving data indicative of the outcome of a gaming activity;

in response to the outcome of the gaming activity, querying the consumer account database to identify one or more winning consumer accounts to which prize amounts are to be distributed.

One embodiment provides a method including the step of crediting the identified one or more winning consumer accounts by respective prize amounts.

One embodiment provides a method including the steps of:

receiving, for a given consumer, a withdrawal request indicative of an account identifier;

querying the consumer account database to identify a consumer account corresponding to the account identifier;

debiting the identified consumer account by an amount corresponding to the withdrawal request; and providing a signal indicative of an instruction to provide to the consumer the amount corresponding to the withdrawal request.

One embodiment provides a computer implemented method for managing residual transaction amounts for a plurality of consumers, the method including the steps of:

identifying a residual transaction amount for a given consumer; and applying a predetermined proportion of the residual transaction amount as an entry fee in a gaming activity such that the consumer is allocated one or more entries in the gaining activity, wherein:

(i) for each entry that is identified as a winning entry, the consumer is allocated a total return amount having a value greater than the value of the entry fee exchanged for that entry; and (ii) for each entry that is not identified as a winning entry, the consumer is refunded a value corresponding to the entry fee exchanged for that entry.

One embodiment provides a method for managing residual transaction amounts for a plurality of consumers, the method including the steps of:

receiving data indicative of an account identifier and a residual transaction amount;

querying a consumer account database to identify a consumer account corresponding to the account identifier;

crediting the identified consumer account by an amount including at least a portion of the residual transaction amount;

querying the consumer account database to determine whether or not to exchange a portion of credit in the identified consumer account for gaming value; and in the case that the portion of credit is to be exchanged for gaming value, defining that portion as at least part of an entry fee in a gaming activity, wherein the entry fee is at least partially refundable irrespective of the outcome of the gaming activity.

One embodiment provides a method for managing residual transaction amounts for a plurality of consumers, the method including the steps of:

receiving data indicative of an entry fee, the entry fee being defined by at least a portion of a residual transaction amount for a consumer; and exchanging the entry fee for one or more entries in a gaming activity, wherein the entry fee is at least partially refundable irrespective of the outcome of the gaming activity.

One embodiment provides a method for managing residual transaction amounts for a plurality of consumers, the method including the steps of:

receiving data indicative of an account identifier and a residual transaction amount;

querying a consumer account database to identify a consumer account corresponding to the account identifier;

crediting the identified consumer account by an amount including at least a portion of the residual transaction amount;

querying the consumer account database to determine whether or not to exchange a portion of credit in the identified consumer account for gaming value; and in the case that the portion of credit is to be exchanged for gaming value, exchanging the credit for the gaming value.

One embodiment provides a method wherein the step of querying the consumer account database to determine whether or not to exchange a portion of credit in the identified consumer account for gaming value is performed responsive to the step of crediting the identified consumer account by an amount including at least a portion of the residual transaction amount.

One embodiment provides a method wherein the step of querying the consumer account database to determine whether or not to exchange a portion of credit in the identified consumer account for gaming value is performed on a periodic basis.

One embodiment provides a method for managing residual transaction including the steps of:

maintaining a consumer account database including a plurality of records, each record including data indicative of an account identifier for identifying a consumer and a credit amount;

receiving from a first retailer terminal a first signal indicative of a first account identifier and a residual transaction amount for a first consumer;

being responsive to the first signal for identifying a first record in the consumer account database including data indicative of the first account identifier; and increasing the credit amount of the first record by the residual transaction amount.

One embodiment provides a method wherein, in the case that a first record in the consumer account database including data indicative of the first account identifier is not identifiable, the method includes the step of automatically defining in the database a new record that is identifiable on the basis of the first account identifier, and identifying that new account for the purpose of the subsequent step of crediting.

One embodiment provides a method including the steps of:

receiving from a second retailer terminal, on behalf of a second consumer, a second signal indicative of a second account identifier and a withdrawal request having a withdrawal amount;

being responsive to the second signal for identifying a second record in the consumer account database including data indicative of the second account identifier;

decreasing the credit amount of the second record by the withdrawal amount;

providing to the second retailer terminal a third signal indicative of an instruction to provide to the second consumer funds corresponding to the withdrawal amount; and providing a fourth signal for transferring funds corresponding to the withdrawal amount to a location associated with the second retailer terminal.

One embodiment provides a computer implemented method for managing residual transaction amounts for a plurality of consumers, the method including the steps of receiving, for a group of consumers $C_1 \ldots C_n$, respective data indicative of respective residual transaction amounts $A_1 \ldots A_n$, wherein $n \geq 2$;

for each residual transaction amount $A_1 \ldots A_n$, defining a respective proportion as a syndication amount $S_1 \ldots S_n$; and combining the syndication amounts $S_1 \ldots S_n$ to define an entry fee E, wherein $E=\Sigma(S_1 \ldots S_n)$, and wherein the E is to be exchanged for one or more entries in a gaming activity on behalf of a syndicate defined by the group of consumers $C_1 \ldots C_n$ One embodiment provides a method including the steps of:

receiving data indicative of an outcome of the gaming activity;

processing the data indicative of the outcome of the gaming activity to identify whether one or more prizes are to be awarded in relation to the one or more entries; and in the event that one or more prizes are to be awarded, distributing the prize among consumers $C_1 \ldots C_n$. based on the following formula:

$$P_i = P_t\left(\frac{E}{S_i}\right)$$

wherein $P_t$ is the total prize for distribution and $P_i$ is share of $P_t$ distributed to $C_i$.

One embodiment provides a method wherein, for one or more of the residual transaction amounts, $A_i = S_i$.

One embodiment provides a computer program product configured to perform a method as described herein.

One embodiment provides a computer system including a processor configured to perform method as described herein.

One embodiment provides a computer computer-readable carrier medium carrying a set of instructions that when executed by one or more processors cause the one or more processors to carry out a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the present description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms "comprising", "comprised of", or "which comprises" is an open term that means including at least the elements/features that follow, but not excluding others. Thus, the term "comprising", when used in the claims, should not be interpreted as being limitative to the means or elements or steps listed thereafter. For example, the scope of the expression a device comprising A and B should not be limited to devices consisting only of elements A and B. Any one of the terms "including", "which includes" or "that includes" as used herein is also an open term that also means including at least the elements/features that follow the term, but not excluding others. Thus, "including" is synonymous with and means the same as "comprising".

Similarly, the term "coupled", when used herein, should not be interpreted as being limitative to direct connections only. The terms "coupled" and "connected," along with their derivatives, may be used. The scope of the expression a "device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

In the context of the present disclosure, it is assumed that a gaming activity is an activity where multiple players provide respective entry fees. In exchange for the entry fees, the players are respectively allocated one or more entries. The term "player" as used herein refers to a provider of an entry fee. The term should be construed broadly to include both human players, non-human players, constructs or syndicates defined by a group of two or more human and/or non human players (such as a collaboration between human players), and other legal entities (such as corporations or trusts). In some cases, the player is identified in a computing system by a unique identifier, which might include a purpose-defined identifier, identifier based on personal information, email address, cellular telephone number, or the like.

In the context of the present disclosure, there is discussion of players being "allocated" entries and disclosure of players being "provided" entries. The terms "allocated" and "provided" are regarded as synonymous in this regard. Furthermore, neither of these terms should imply a requirement that a player actually physically receives any entries (although, equally, they may do so), only that the entries are notionally allocated to that player.

Although players are considered to provide respective entry fees, it will be appreciated that in some instances a single player provides multiple entry fees on multiple occasions.

In the present context, the term "entry fee" describes a sum of consideration that constitutes a wholly or partially refundable payment. No specific implications or connotations should be drawn from the use of the word "fee", which is descriptive only. In some embodiments the entry fee is provided in whole or in part as monetary currency. In other embodiments the entry fee is notionally derived—such as where a consumer purchases predefined goods and/or services unrelated to an entry, and an entry fee is notionally determined as a function of the purchase value, or where the player participates in marketing activities (by viewing advertisements or responding to a survey, for instance), and an entry fee is notionally defined on the basis of a benefit the gaming operator or a third party receives by virtue of the player's participation in those marketing activities. That is, by purchasing a certain product, a consumer is deemed to have provided an entry fee, and is correspondingly allocated one or more entries. In the presently considered embodiments, the entry fee is wholly provided for the purpose of participation in a gaming activity.

In sonic embodiments, the "entry fee" defines only a portion of the sum of consideration provided by a player in exchange for one or more entries. For example, in some embodiments a player provides an entry amount, including an entry fee and an additional component, this additional component being, in some cases, attributable to an operator service charge. In some embodiments, although an entry fee is fully refundable, it is only the entry fee component of an entry amount that is fully refundable, with the additional component being non-refundable. It should also be appreciated that the "entry fee" need not be monetary in nature at all, but could constitute any tradable commodity having a real, virtual, deemed or perceived value.

References to "refunds", "refundable" entry fees, and the like should be understood, unless the context dictates otherwise, to encompass full and partial refunds, as well as gross and net refunds. In some instances, for example, a nominal refund may be subject to taxes, duties, levies or other charges, such that the net refund actually received by a player is less than the nominal or gross refund, irrespective of whether that refund is notionally full or partial. Such variations should not be considered to depart from the substance or scope of the present invention.

As used herein, the terms "gaming" and "gaming activity" should be construed broadly so as to encompass any form of gambling, gaming, or wagering, including but not limited to:

Lotteries and lottery type games. In the context of the Australian market, particular examples include "Lotto", "Oz Lotto", "Powerball", "Art Union Lotteries", and the like. In the context of the US market, particular examples include "Hot Lotto", "Mega Millions", "Powerball", "Paycheck", and "Tri-State".

Traditional draw lotteries, instant lotteries and "scratch" lotteries.

Raffles, or other games where a player is provided with one or more unique tickets carrying respective ticket identifiers, and one or more winners are identified based on the selection of one or more winning ticket identifiers.

"Keno", "Bingo" and "Housie", "Tombola" and "Chinese Raffle" style games where players seek to reconcile their own numbers with numbers drawn from an independent objective source.

Sports betting activities and football pools, whether pari-mutuel or "fixed-odds" based.

Events-based betting activities involving such outcomes as political contests, Royal or noteworthy births, weather outcomes and natural phenomena.

Totalisators.

Sweepstakes for any events such as horse, dog or any other form of racing, sporting contests, political contests and the like.

PC-based and other electronic gaming contests, including online chance-based, skill-based or combination chance/skill-based gaming contests. These include online video games, where outcomes are in part dependant on a player's skill, and in some cases in part dependent on random factors including chance.

Other games or contests of skill and/or knowledge and/or chance.

Chance-based games played on poker and other electronic gaming machines.

Any games of skill and/or chance involving one or more unknown outcomes, whether pari-mutuel or "fixed-odds" based.

It will be appreciated that, in all of these examples, multiple players provide respective entry fees and, in exchange for the entry fees, the players are respectively provided with one or more entries.

The term "pari-mutuel" refers generally to a gaming arrangement whereby prizes are funded in whole or in part by entry fees. This term is intended to be synonymous with "paramutual", "para-mutual", "parimutuel" "mutual betting" and other variants.

A "method for providing a gaming activity" includes substantially any method by which a gaming activity is provided. This includes, but is not limited to, methods performable by administrators of gaming activities, methods performable by vendors of entries in gaming activities, methods performable by players, computer implemented methods performable in relation to the administration of gaming activities and/or sale of entries in such gaming activities, and so on. Likewise, a "system for providing a gaming activity" includes substantially any hardware component or group of hardware components associated with the performance of a method for providing a gaming activity. For example, such systems include information systems maintained or implemented by or on behalf of administrators of gaming activities, vendors of entries in gaming activities, or the players themselves.

As used herein, the term "gaming operator" describes a party or group of parties responsible for the carriage and administration of a gaming activity. That is, a gaming operator is responsible for tasks including, but not limited to defining entry parameters and other predefined terms and conditions for the gaming activity, offering for sale entries in exchange for entry fees, receiving entry fees from players, allocating entries to players in exchange for those entry fees, identifying one or more winning entries, and arranging for the distribution of prizes among the players. In practice, these tasks are often performed by a number of parties. For example, a first category of party (such as vendors or agents) may be responsible for offering for sale entries in exchange for entry fees and receiving entry fees from players, whilst a second party may be responsible for identifying one or more winning entries. However, this is ignored for the present purposes, and the term "gaming operator" should be read sufficiently broadly so as to cover whatever group of related and/or unrelated parties are responsible for the carriage and administration of a particular gaming activity.

Thus, in some cases, a gaming activity may be provided by a plurality of parties, which might or might not be related or affiliated. Additionally, in some cases, a gaming activity may include a plurality of sub-activities, such as individual lotteries, that might in themselves be provided by differing parties. However, it should be appreciated that a plurality of such sub-activities, regardless of the nature of the relationship between providing parties, should be considered as a single gaming activity in the context of the present disclosure. In some cases, a plurality of sub-activities may be conducted by differing parties in different locations and/or with differing branding. However some or all of the entry fees from these sub-activities might be notionally or physically combined into a common pool, for example to facilitate investment, risk management or infrastructure sharing activities. In such cases, the sub-activities should certainty be collectively regarded as a single gaming activity in the context of the present disclosure.

In some cases a first gaining activity is provided by a first party, and this first gaming activity leveraged by a second party to provide a second gaming activity. For example, various embodiments discussed herein include an arrangement whereby a flexible credit service provider is responsible for providing a gaming activity, and to do so leverages an existing gaming activity that is provided by a gaming service provider, or via a scheme such as a Bonus Bonds or Prize Bonds scheme. In such circumstances, it is generally considered that both parties provide gaming activities.

The term "complementary" is primarily used herein with reference to relative percentages of two mutually exclusive components or proportions, primarily the proportion of an entry fee that is placed at risk, and the "complementary" proportion that is refundable (or vice versa). In this context, if a given proportion is X %, then the complementary proportion would be 100%-X %. It should also be noted that as used herein, unless the context clearly dictates otherwise, any reference to "a proportion" is intended to encompass the situations where that proportion is 0% or 100%, as well as any intermediate percentage.

BRIEF DESCRIPTION OF THE DRAWINGS

Preferred embodiments of the invention will now be described, by way of example only, with reference to the accompanying drawings in which.

DETAILED DESCRIPTION

Figure 1:
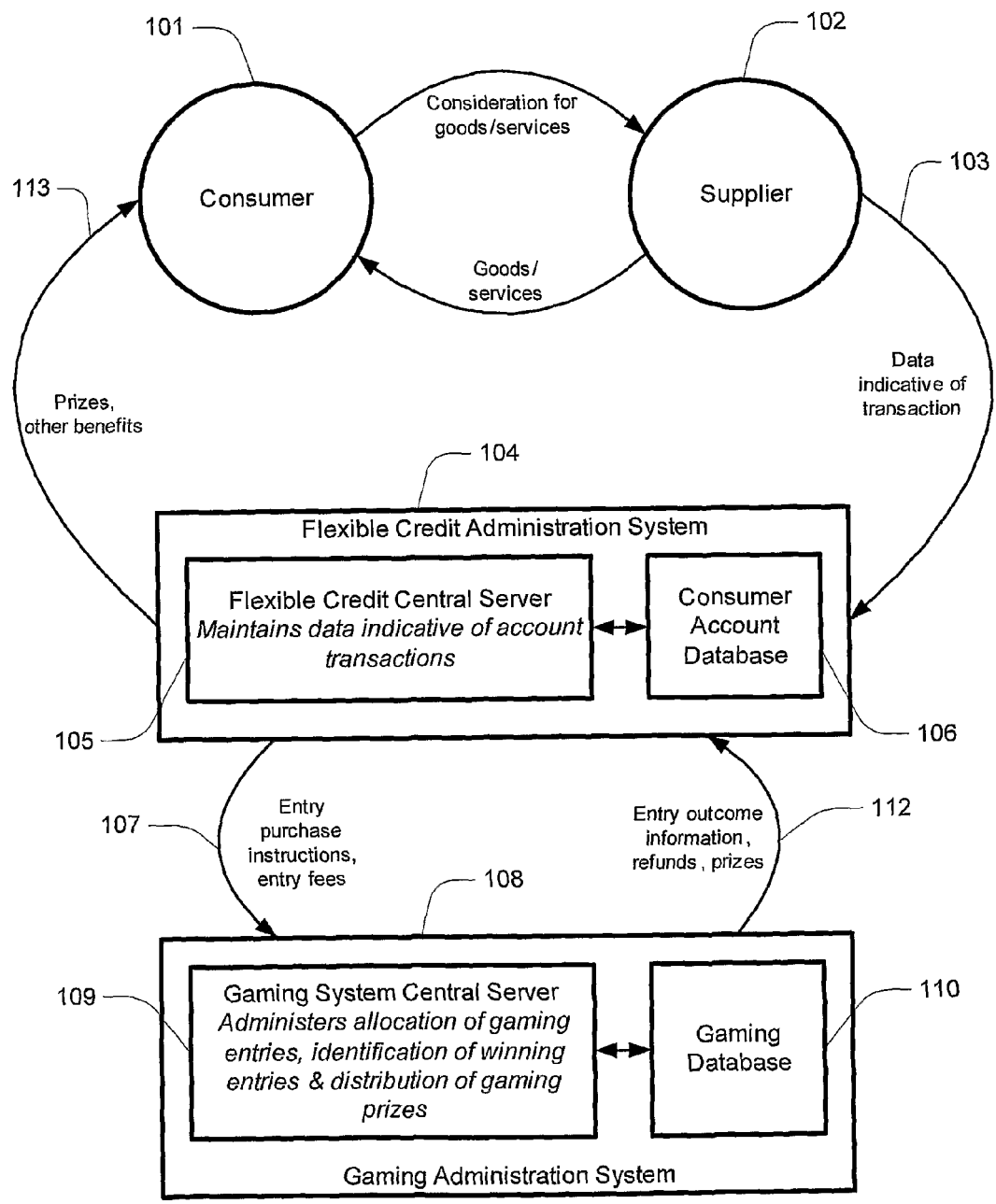
FIG. 1 illustrates an arrangement for providing a gaming activity in the context of a flexible credit arrangement according to one embodiment.

Described herein are various systems and methods for providing gaming activities, these particularly relating to gaming activities implemented in conjunction with a flexible credit arrangement. In overview, a consumer is allocated one or more entries in a gaming activity based on a level of transactable flexible credit held by that consumer. For example, the allocation of entries is increased or decreased subject to a corresponding increase or decrease in transactable flexible credit held by the consumer. In some embodiments, one or more prizes for the gaming activity are funded in whole, or in part, by way of supplementary contributions realized on the basis of consumers' participation in a flexible credit infrastructure.

The terms "flexible credit" and "transactable flexible credit" are used interchangeably herein. That is, although in some instances the term "transactable" is omitted, it is to be assumed that the flexible credit in question is transactable nevertheless. Further elaboration in relation to the meaning of these terms is provided further below.

Various embodiments described herein leverage notions of "risk free" gaming or "reduced-risk" gaming, whereby a player's entry fee is wholly or partially refundable irrespective of the outcome of a gaming activity. However, the present invention is by no means limited as such. That is, some embodiments are implemented in conjunction with traditional "at-risk" gaming activities. Additional discussion of "risk free gaming", "reduced-risk" gaming, and "at-risk" gaming is provided further below.

Overview of Flexible Credit

Broadly speaking, the term "flexible credit" is used to describe a form of credit that is received subject to an interaction between a supplier and a consumer (such as a form of transaction, retail or otherwise), and maintained for use in subsequent transactions. In many cases, the flexible credit exists in conjunction with a reservoir of interest bearing funds that are directly or indirectly transactable by consumers to whom the funds are attributable. The funds are "interest bearing" in the sense that an investment return can be derived. This investment return is not necessarily attributable to the owner of the funds (i.e. the consumer/account holder). Rather, the investment return is, at least in the first instance, controlled by the party responsible for holding the funds (i.e. the administrator of a flexible credit arrangement, which in some cases is the supplier or an affiliate of the supplier).

The terms "supplier" and "consumer" should be afforded broad interpretations. A supplier is any party that provides goods and or services to another. Likewise, a consumer is any party that receives goods and or services from another party.

Specific examples of flexible credit include (but are not limited to):

Reward points in the context of a reward program. In broad terms, such reward programs allow consumers to accrue "reward points" and redeem those for a benefit. Some embodiments described herein afford to consumers the opportunity to win a prize based on the quantum of reward points they have respectively accrued, without affecting the ability to later redeem those points for a benefit. For example, in some embodiments a monetary value corresponding to the quantum of reward points is used to fund one or more entries in a gaming activity, whereby the entries are allocated on the basis of a no-risk profile. In this manner, the entry fees are fully refundable.

Residual transaction amounts, in the context of a residual transaction amount management system. In overview, a transaction between a consumer and a supplier results in a residual transaction amount (such as "loose change" for a purchase transaction). This residual transaction amount is maintained by a service provider as flexible credit for use by the consumer in subsequent transactions.

Stored value, in the context of a stored value card arrangement. In such arrangements, a consumer purchases flexible credit from a supplier, and this is stored on a smartcard or the like. The consumer is therefore able to partake in cashless transactions with other collaborating suppliers. Flexible credit of this sort is widely used in the context of public transportation systems.

Gaming value, in the context of a gaming value account. These are, in some cases, analogous to a stored value card issued by a gaming service provider. The gaming service provider holds funds on behalf of a consumer, and the consumer is able to access those funds by way of a loyalty card or the like.

Prepaid credit, in the context of a prepaid credit arrangement. In such arrangements, a consumer exchanges a set amount of funds for a particular consumable service in advance, and consumes these funds over time as the service is used. A common example is prepaid cellular telephone credit.

Standard transactable credit, such as funds in a conventional bank account (such as an at-call cash account) held by the consumer with a financial institution. In some such embodiments the at-call account receives a lower-than-usual level of interest (or no interest at all). It will be appreciated from the discussion herein that additional interest derived by the financial institution can be used, in whole or in part, to finance risk free gaming activities (again, in whole or in part). For example, in some cases a portion of the investment return is used to fund entries in a risk free gaming activity.

In each of these situations, a flexible credit service provider holds funds on behalf of a plurality of consumers (either directly or notionally), funds being required to cover the cost of benefits purchased by those consumers using flexible credit. The funds increase over time as additional flexible credit is awarded, and decrease as flexible credit is consumed. In some embodiments of the present invention, at least a portion of these funds are used provide the consumers with access to a risk free gaming activity.

In some embodiments the funds are used to obtain "no-risk recurring entries" in a suitable gaming activity (such as a no-risk lottery or other risk free gaming activity provided in accordance with principles set out in PCT/AU2007/000774) such that those entries are able to be allocated to consumers. Further discussion of "no-risk recurring entries" and "risk free gaming activities" (also referred to as "no-risk gaming activities") is provided further below. The allocation of entries between consumers is not necessarily one-to-one; in some embodiments a single entry is proportionally allocated between a plurality of consumers, who likewise proportionally share any resulting prize. For example, this may occur by way of a syndication mechanism.

In some embodiments the funds are used to obtain bonds or the like in a scheme such as NZ Bonus Bonds or Irish Prize Bonds, and these "Bonus Bonds" allocated to consumers. For the present purposes, such schemes are regarded as "risk free gaming activities", although they by some interpretations "investment activities" rather than "gaming activities". For the purposes of the present specification, it is the element of chance in allocation of rewards that categorises such an investment scheme as a gaming activity. Again, allocation is not necessarily one-to-one; in some embodiments a single entry might be proportionally allocated between a plurality of consumers, who would likewise proportionally share any resulting prize. In fact, in this case the consumers participate in a gaming activity that is in effect provided by the existence of such bonds, although the consumer themselves do not engage in ownership of Bonus Bonds (and therefore need not be concerned with matters of investment). Rather, the service provider holds the bonds, maintains a record of the allocation of these among the consumers, and distributes any prizes accordingly.

It will be appreciated that further embodiments implement alternate approaches for providing entries in a pre-existing risk free gaming activity.

System Level Overview

FIG. 1 illustrates an exemplary flexible credit arrangement according to one embodiment. In this example, the arrangement is driven, at least in part, by transactions between consumers, such as consumer 101, and suppliers, such as supplier 102. In the illustrated example, this is a retail-style transaction for goods and/or services. However, in other instances there may be an alternate form of interaction between the consumer and another party.

Data 103 is indicative of a transaction between consumer 101 and supplier 102. This data is provided to a flexible credit administration system 104. The nature of data 103 varies between embodiments. However, at a general level, it is indicative of the consumer (for example by way of a consumer reward account identifier or by way of a unique transaction identifier which identifies the consumer by virtue of the transaction) and indicative of one or more characteristics of the transaction (such as the total transaction value). This data is processed at a central server 105 to determine a level (e.g. quantum/value) of flexible credit that should be allocated to the consumer. This level of flexible credit is allocated to the consumer in a consumer account database 106.

In some embodiments, consumers are individually identifiable in the consumer account database based on respective consumer identifiers. However, in other embodiments, a consumer is identifiable based on a consumer identifier that does not directly identify a particular consumer. For example, a consumer identifier may be derived from an anonymously purchased stored value card or the like. In such cases, a consumer is identifiable based on carriage of the stored value card, rather than a personalising characteristic (such as a personalised loyalty card, credit card, personal account login information, or the like).

The flexible credit administration system 104 interacts with a gaming administration system 108. This gaming system provides an arrangement whereby an entry fee is able to be exchanged for one or more entries in a gaming activity.

In overview, system 104 obtains entries in a gaming activity from system 108 for allocation to consumers, such as consumer 101. In some embodiments, entries are "allocated" to consumers in the sense that database 106 is updated to associate a given consumer identifier with one or more entry identifiers for entries that have been allocated (in whole or in part) to the consumer.

System 104 provides to system 108 data 107 indicative of entry fees and entry purchase instructions. Data 107 is, in some cases, provided in respect of each appropriate item of data 103. For example, each item of data 103 is processed to determine an entry fee amount, and this entry fee amount is applied as an entry fee in the context of system 108. In other cases data 107 is provided periodically. For example, system 104 maintains a pool of entries for allocation to consumer accounts, and periodically increases the size of that pool to ensure that sufficient entries are available for allocation to consumers over time.

System 108 includes a gaming server 109, which is responsible for the allocation of entries, identification of winning entries, and distribution of prizes. This server operates in conjunction with a gaming database 110.

System 108 provides to system 107 data 112 indicative of entry outcome information, refunds, and prizes. In the case that an entry allocated to a given consumer is a winning entry, the resulting prize is marked for distribution to that consumer. In some cases less than 100% of the prize is distributed to the consumer.

Discussion in relation to the present embodiments centres on the use of "no-risk recurring entries". These are, in essence, entries that have a periodic opportunity to win a prize, but are fully refundable at substantially any time. Additional discussion of the concepts underlying no-risk recurring entries is provided in PCT patent application PCT/AU2007/000774, and some general guidance provided in the following section.

Risk Free Gaming Activities and No-Risk Recurring Entries

In some embodiments, entries are allocated by system 108 on the basis of a risk profile. Detailed discussion of risk profiles is provided in PCT/2007/000774, and some general context provided below.

In a gaming activity, wherein a plurality of players provide respective entry fees, one or more risk profiles are able to be defined. Each risk profile defines a proportion of an entry fee that is refundable on the basis of predetermined refund criteria and a complementary proportion of the entry fee that is placed at risk. For each player, entry data is indicative of the entry fee provided by that player and a risk profile selected by that player. Each player is allocated, on the basis of the entry fee provided by that player and the risk profile selected by that player, one or more entries in relation to the gaming activity.

The term "complementary" is primarily used herein with reference to relative percentages of two mutually exclusive components or proportions, primarily the proportion of an entry fee that is placed at risk, and the "complementary" proportion that is refundable (or vice versa). In this context, if a given proportion is X %, then the complementary proportion would be 100%-X %. It should also be noted that as used herein, unless the context clearly dictates otherwise, any reference to "a proportion" is intended to encompass the situations where that proportion is 0% or 100%, as well as any intermediate percentage.

The nature and number of risk profiles defined varies between embodiments. There are three main categories of risk profile:

"No-risk" risk profiles. These are risk profiles for which 100% of the entry fee is refundable. A "no-risk entry" is an entry that is allocated on the basis of a risk profile for which 100% of the entry fee is refundable.

"Full-risk" risk profiles. These are risk profiles for which 100% of the entry fee is placed at risk.

"Hybrid" risk profiles. These are risk profiles for which X % of the entry fee is refundable and Y % of the entry fee is placed at risk, wherein X+Y=100 and wherein 0<X<100. It will be appreciated that, at least theoretically, an infinite number of hybrid risk profiles are definable.

It will be appreciated that which of these categories are made available varies between embodiments. In particular, some embodiments make use of a no-risk profile and full-risk profile exclusively, some embodiments make use of a no-risk profile, full-risk profile and one or more hybrid risk profiles, some embodiments make use of a no-risk profile and one or more hybrid risk profiles, some embodiments make use of full-risk profile and one or more hybrid risk profiles, and some embodiments may only make use of one or more hybrid risk profiles.

The manner in which risk profiles are defined also varies between embodiments. Generally speaking, there are two main approaches, which are by no means mutually exclusive. The first approach is for a gaming operator to stipulate one or more predefined risk profiles, and make these available to players. In one such embodiment only the "no-risk" and "full-risk" profiles are made available, while in another such embodiment hybrid-risk profiles are additionally or alternatively made available at, for example, 20% increments (20% at-risk with 80% refundable, 40% at-risk with 60% refundable, and so on). Of course, this simple example should not be regarded as limiting, and other increments (including consistent and inconsistent increments) are used in other instances. The second approach is for a gaming operator to allow players to stipulate risk profiles. For example, a given player is invited to stipulate precisely how much of his or her entry fee is to be placed at risk, and/or how much of his or her entry fee is to be refundable. Although "and/or" is used in this situation, it will be appreciated that in most cases a player, by stipulating precisely how much of his or her entry fee is to be placed at risk, inherently by exclusion stipulates how much is to be refundable, and vice versa.

Although the majority of embodiments discussed in PCT/2007/000774 are concerned with a situation where a plurality (that is, two or more) risk profiles are defined, in some embodiments there is only a single risk profile. In particular, in some embodiments only a single hybrid risk profile is defined. That is, all of the players place their respective entry fees on the basis of the same hybrid risk profile. Furthermore, embodiments of the present invention are applicable to gaming activities where the only risk profile is a no-risk risk profile.

The term "refund" as used herein is intended to encompass a full or partial refund of the value component of an entry fee, whether in the form in which it was contributed or in some other form. Refunds may therefore be in cash or in kind. In particular, in some embodiments of the invention, a refund may take the form of a limited rollover entry for a specified number of subsequent gaming activities of the same or different type, an unlimited rollover entry for an indeterminate number of subsequent gaming activities of the same or different type, or the maintenance of a limited rollover entry or an unlimited rollover entry from a previous gaming activity. The term is also intended to encompass the option of a refund, in whatever form, whether or not that option is exercised at any particular point in time, or at all. In some embodiments a player is able to exercise the option of a refund at substantially any point in time. Further, the term "refund" is intended to encompass the concept of a promised prize, whether as an alternative to, or in addition to, a refund based on the value component of the entry itself. It is therefore possible that a refund in the context of particular gaming activities may exceed the full value component of the corresponding entry.

As noted, a "no-risk entry" is an entry that is allocated on the basis of a risk profile for which 100% of the entry fee is refundable. A "no-risk recurring entry" is, in general terms, a no-risk entry which has the opportunity of win a prize in periodic draws of a gaming activity, as discussed below.

Figure 2:
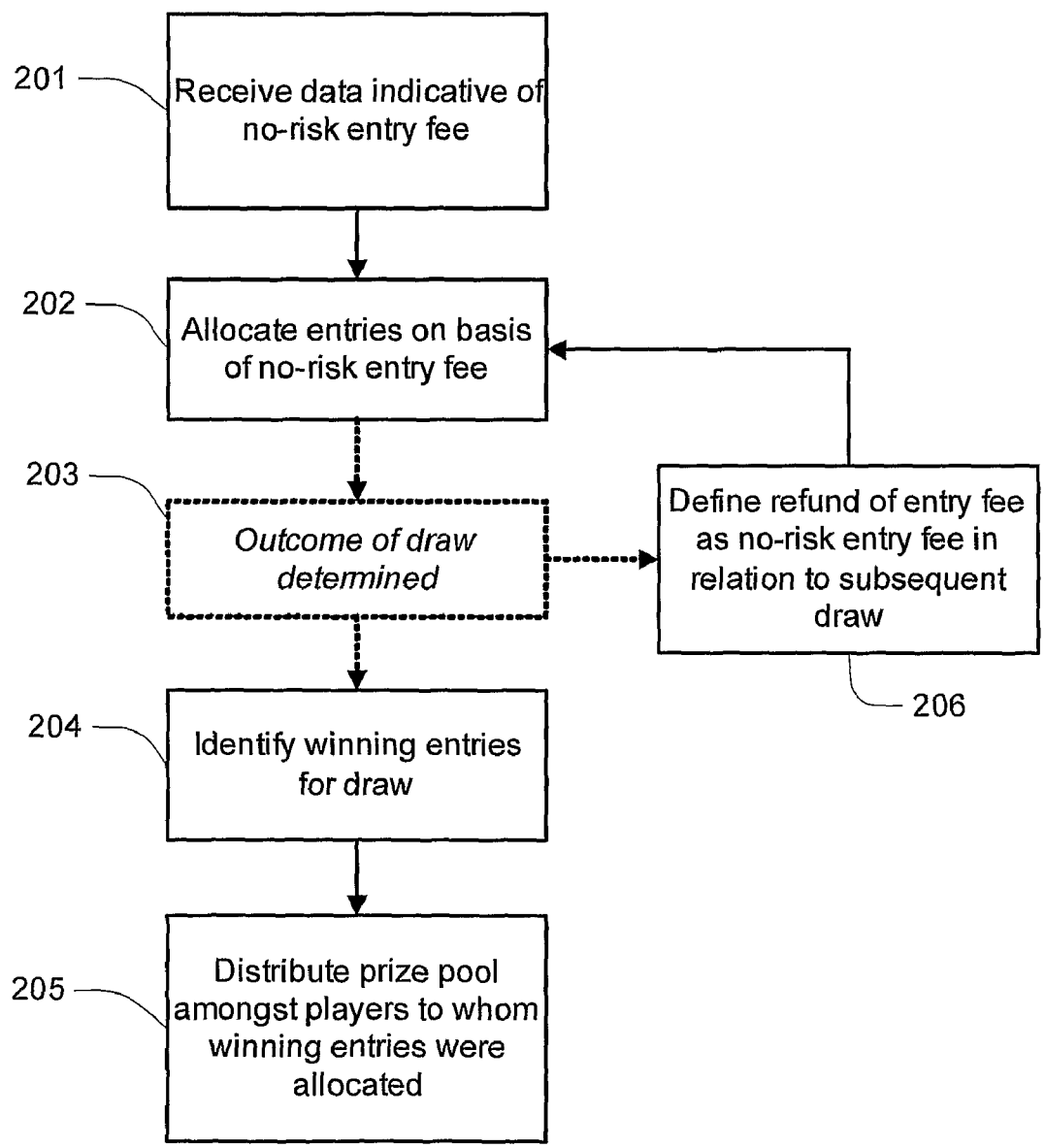
FIG. 2 illustrates a method according to one embodiment.

FIG. 2 illustrates an exemplary method 200 for implementing no-risk recurring entries. In this example, a gaming activity includes a plurality of periodic draws. Step 201 includes receiving data indicative of a no-risk entry fee provided for the purchase of no-risk recurring entries. For example, this data may be received in system 108 from system 104. Step 202 includes allocating one or more entries on the basis of the entry fee, presently being no-risk recurring entries.

The outcome of the gaming activity is determined at step 203. Step 203 is bounded by a dashed line to indicate that it is, at least in some cases, an independent event, and not necessarily part of method 200. For example in some embodiments, the outcome of a gaming activity is determined by the completion of a sporting event or the like.

Step 204 includes identifying one or more winning entries. In the context of some gaming activities, there is only a single winning entry, whereas in other gaming activities there are multiple winning entries. In overview, the gaming operator has in place predefined criteria for determining, based on the outcome of the gaming activity, which entries are "winning entries" (entries in respect of which a win-event applies) and which entries are "non-winning entries" (entries in respect of which a no-win event applies). In one simple example, the gaming activity involves wagering on the outcome of a sporting event between two teams, Team A and Team B. Assume a given entry is placed on the basis of a wager that Team A will be victorious. If the outcome of the sporting event reveals that Team A was indeed victorious, that entry would be identified as a winning entry. Otherwise, it would be identified as a non-winning entry. It will be appreciated that identifying winning entries is a more detailed procedure in, for example, complex lottery style games.

Step 205 includes distributing a prize pool of prizes to players to whom the winning entries were allocated. That is, a prize pool is used to fund one or more prizes, and these prizes are awarded to the winning players (or player, in the event that there is only one prize, or in the event that one player wins all prizes). This is carried out in accordance with a predefined prize distribution protocol. There is no requirement that, at the completion of step 204, the relevant players have physically received prizes. Rather, in some embodiments, step 205 includes simply making it possible for winning players to obtain prizes by redeeming their entries in a designated manner. In some practical cases, winning entries are never redeemed, and the corresponding prizes never physically awarded.

The prize pool, and prizes distributed from that prize pool, need not be monetary in nature. For example, in some embodiments the prize pool includes goods and/or services for distribution as prizes. Examples include, but are not limited to, automobiles, consumer electronic devices, fashion products, retail goods, livestock, real property, professional services, education services, hospitality services, discount coupons, entries in other gaming activities and so on.

Step 206 includes refunding the entry fees, and more precisely defining the refund of entry fee as no-risk entry fee in relation to a subsequent draw. This is, in some embodiments, notional only, and a given entry is by default treated as a recurring entry without any physical refund process. For example, in one embodiment an entry is indicative of a set of one or more lottery numbers, and the same set of one or more lottery numbers is used by that entry in multiple draws.

The party to whom an entry is allocated is permitted to cancel the recurring nature of that entry, and in doing so receive a refund of the associated entry fee. In this manner, it is possible for system 104 to periodically obtain and surrender entries via system 108 depending on various considerations, including cash flow and the like.

It should be appreciated that the term "no-risk" is not intended to mean that there is absolutely no risk whatsoever. For example, although there is "no-risk" in a descriptive sense as applied to a gaming activity, some risk will always exist in an absolute sense, for example subject to natural/economic disasters or the like.

Application of No-Risk Recurring Entries to Flexible Credit Embodiments

It will be appreciated that, in terms of flexible credit embodiments, consumers take on the role of "players". The term "player" describes a party who has a chance to win a prize—i.e. a party to whom one or more entries are wholly or partially allocated.

As noted, in some embodiments system 108 allocates recurring entries on the basis of a 100% refundable (i.e. no-risk) risk profile (i.e. entry fees are refundable regardless of whether an entry is a winning entry). In some cases system 108 provides for other risk profiles in addition. However, as will be appreciated from the discussion herein, it is particularly advantageous to implement the present embodiments in the context of a no-risk profile gaming activity.

It will be appreciated that there may be forms of no-risk recurring entries present in activities other then those specifically described herein, or present by virtue of artefacts in further scenarios that provide subject matter similar in function to no-risk recurring entries. For example, investment programs such as Ireland's Prize Bonds, the UK's Premium Bonds, and New Zealand's Bonus Bonds effectively provide subject matter similar in function to no-risk recurring entries. In particular, bonds are purchased, these providing a periodic opportunity to win a prize. The bonds can be redeemed at any time for a full refund.

In broad terms, consumers are allocated a number of no-risk recurring entries corresponding to the level of flexible credit in their respective accounts, or more particularly allocation/de-allocation occurs responsive to variations in the level of flexible credit. The number of entries increases as does the level of credit. Likewise, where credit is consumer (e.g. redeemed for benefits or applied against a transaction), the number of entries is decreased.

The general approach of applying no-risk recurring entries to flexible credit embodiments allows for consumers to participate in gaming (at least in terms of having an opportunity to win a prize) without risk, and simply for maintaining a level of transactable flexible credit.

Flexible Credit Methods

Figure 3:
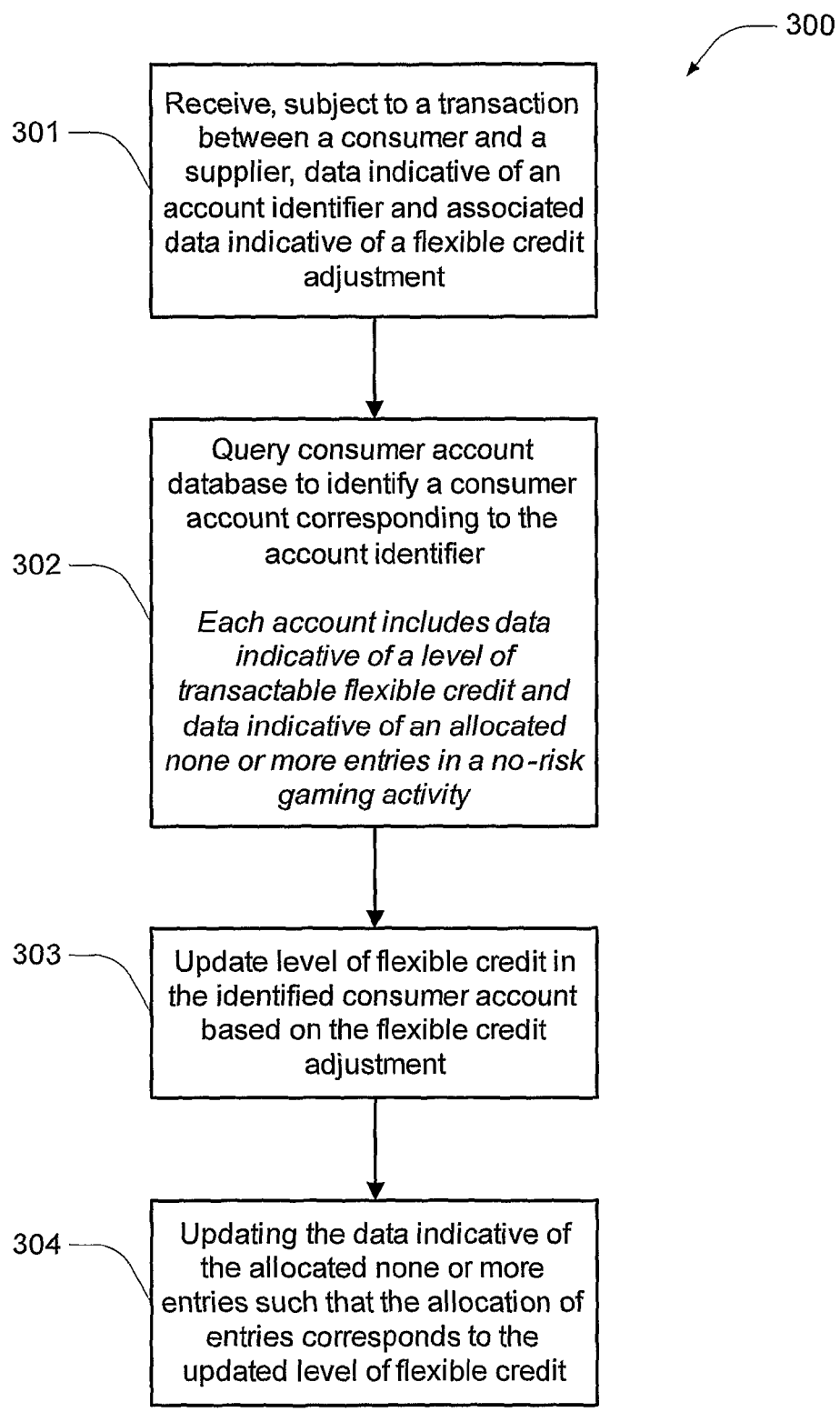
FIG. 3 illustrates a method according to one embodiment.

FIG. 3 illustrates a method 300 for managing flexible credit according to one embodiment. It will be appreciated that this method is in some cases performed by way of software instructions executing in the context of a computer system.

Step 301 includes receiving, subject to a transaction between a consumer and a supplier, data indicative of an account identifier and associated data indicative of a flexible credit adjustment. The nature of data indicative of the account identifier varies between embodiments, and the notion should be read broadly. In essence, all that is required is some form data that allows the identification of a unique account in a consumer account database. The data indicative of a flexible credit adjustment may relate to an increase in credit or a decrease in credit.

Step 302 includes querying a consumer account database to identify a consumer account corresponding to the account identifier. This database includes data for a plurality of accounts. The database is configured so that each account includes data indicative of a level of transactable flexible credit. Each account also includes data indicative of an allocated none or more entries in a risk free gaming activity.

Step 303 includes updating the level of flexible credit in the identified consumer account based on the flexible credit adjustment. For example, where the adjustment is an increase (in, for instance, reward points or monetary value), the level of flexible credit is increased.

Step 304 includes updating the data indicative of the allocated none or more entries such that the allocation of entries corresponds to the updated level of flexible credit. In broad terms, where the level of flexible credit increases, the consumer account receives an increased allocation of entries. Likewise, where the level of flexible credit decreases, the consumer account is updated to reflect a decreased allocation of entries (i.e. there is a de-allocation of entries). This may be based upon notions of "contribution", whereby there is relative proportionality between a player's contribution (for example in terms of the funding of entries or the funding of a prize pool) and the allocation of entries to that player. That is, where a first player makes a first level of contribution, and a second player makes a second level of contribution that is greater than the first level of contribution, the second player receives a greater allocation of entries than the first player (and therefore has a greater relative probability of wining a prize).

To facilitate convenient allocation/de-allocation ("de-allocation" should be interpreted as the converse of "allocation") of entries, some embodiments implement a model whereby the service provider maintains a pool of entries for allocation/re-allocation to consumers ("re-allocation" describes a process whereby an entry is allocated for a second, third or $n^{th}$ time, by allocation, de-allocation, and then re-allocation, and so on). For example, a number of no-risk recurring entries are purchased from a gaming provider, and these entries are maintained in a pool for allocation/re-allocation to consumers. This is contrasted with an approach whereby entries are obtained from (or returned to) a gaming provider in response to each flexible credit adjustment. Rather, the size of the pool is periodically adjusted over time such that sufficient entries are available for allocation, and optionally such that sufficient funds are retained on hand to cover the costs associated a steady pattern or flexible credit redemptions. It will be appreciated that such a balance is easier to strike where a lesser proportion of funds held on behalf of consumers is directed into gaming.

The term "allocation" should be read broadly to include "partial allocation". That is, a single entry might be 10% allocated to one consumer, 20% to another, and so on. In this manner, small amounts of money from a plurality of consumers can be syndicated together such that a level of participation is possible even for a relatively insignificant value of flexible credit. Where a single entry is allocated to a plurality of consumers based on a given ratio, any resulting prize is shared among those consumers on the basis of a like ratio.

Based on the present pool model, there may be situations where a prize is awarded in respect of an entry that is wholly or partially unallocated. In some embodiments, the prize (or part thereof corresponding to the unallocated portion of the entry) is retained by the service provider. In other embodiments a protocol is applied such that the prize (or part thereof corresponding to the unallocated portion of the entry) is distributed to one or more of the consumers, optionally subject to a "second chance draw" or the like.

A significant advantage of the pool model is the ability to apply retrospective allocation/de-allocation of entries. This is particularly significant in the context of stored value card arrangements where flexible credit is able to be obtained and/or consumed at terminals that are not in constant communication with a central account database. In such cases, the value of flexible credit for a given consumer is maintained locally on the stored value card itself (for example by way of smartcard technology). However, there may be a time delay in adjustment data being propagated back to the central account database (this will depend on the manner by which non-connected terminals are managed in the particular circumstances). Retrospective allocation/de-allocation is used to manage resulting complications. For example, where flexible credit adjustment data is received subject to a delay, data indicative of the transaction time for that adjustment is used to retrospectively allocate or de-allocate entries as of that time.

Provided below is an exemplary database record for a consumer account according to one embodiment:

| Account Identifier | Allocated Entry | Allocation % | Allocation Time |
|---|---|---|---|
| 123ABC | 111-1112 | 10% | Time A-Time B |
|  | 111-1112 | 9% | Time B-??? |
|  | 111-1225 | 22% | Time C-??? |
|  | 111-1522 | 100% | Time D-??? |

In this example, the consumer account is identified by account identifier "123ABC". Three entries are allocated to this account, two being partially allocated, and one being fully allocated. Entry "111-1112" was 10% allocated from "Time A" to Time B", and 9% allocated from "Time B" onwards. This indicates that, at Time B, there was a consumption of flexible credit resulting in the de-allocation of a share of that entry.

It will be appreciated that this exemplary record is provided for the sake of explanation only, and should not be regarded as limiting in any way. For example, in some embodiments each account includes further information, such as personal/contact information, transaction history information, and so on.

In some embodiments, rather than partially allocating entries, an alternate approach is used whereby each obtained entry in a pool (such as a single no-risk recurring entry or a single Bonus Bond) is notionally split into a larger number of lesser value sub-entries for allocation to consumers. These sub-entries are provided respective unique entry identifiers by the flexible credit service provider.

In other embodiments, alternate approaches are implemented for retrospective allocation/de-allocation of entries is conducted on a retrospective basis. The underlying rationale is to ensure that the consumers' opportunity to win prizes based on one or more entries extends only over the time during which funds are held on behalf of that consumer result in a sufficient gaming allocation value to cover the cost of entry fees in respect of those one or more entries. In some cases there is a lag between flexible credit being used (and the value of held funds actually decreasing) and an event being initiated such that the number of allocated entries is decreased. This is particularly relevant in the case of some stored value card arrangements, whereby credit may be used at disconnected terminals, and knowledge of this use is conveyed to a central server at a later point in time. To this end, some embodiments implement a retrospective entry allocation reconciliation method. Such a method is typically initiated by a redemption request, whereby the consumer presents his/her stored value card to a connected terminal, and a check is initiated to determine whether the consumer has won a prize. Firstly, the consumer's transaction history is processed to determine the held value over time. From this, it is possible to retrospectively determine, by way of unique entry identifiers, those entries that should have been allocated to the consumer over time. It is then considered whether prizes were awarded in respect of those entries are the relevant times. It will be appreciated that other retrospective entry allocation reconciliation methods are used in further embodiments.

Figure 4:
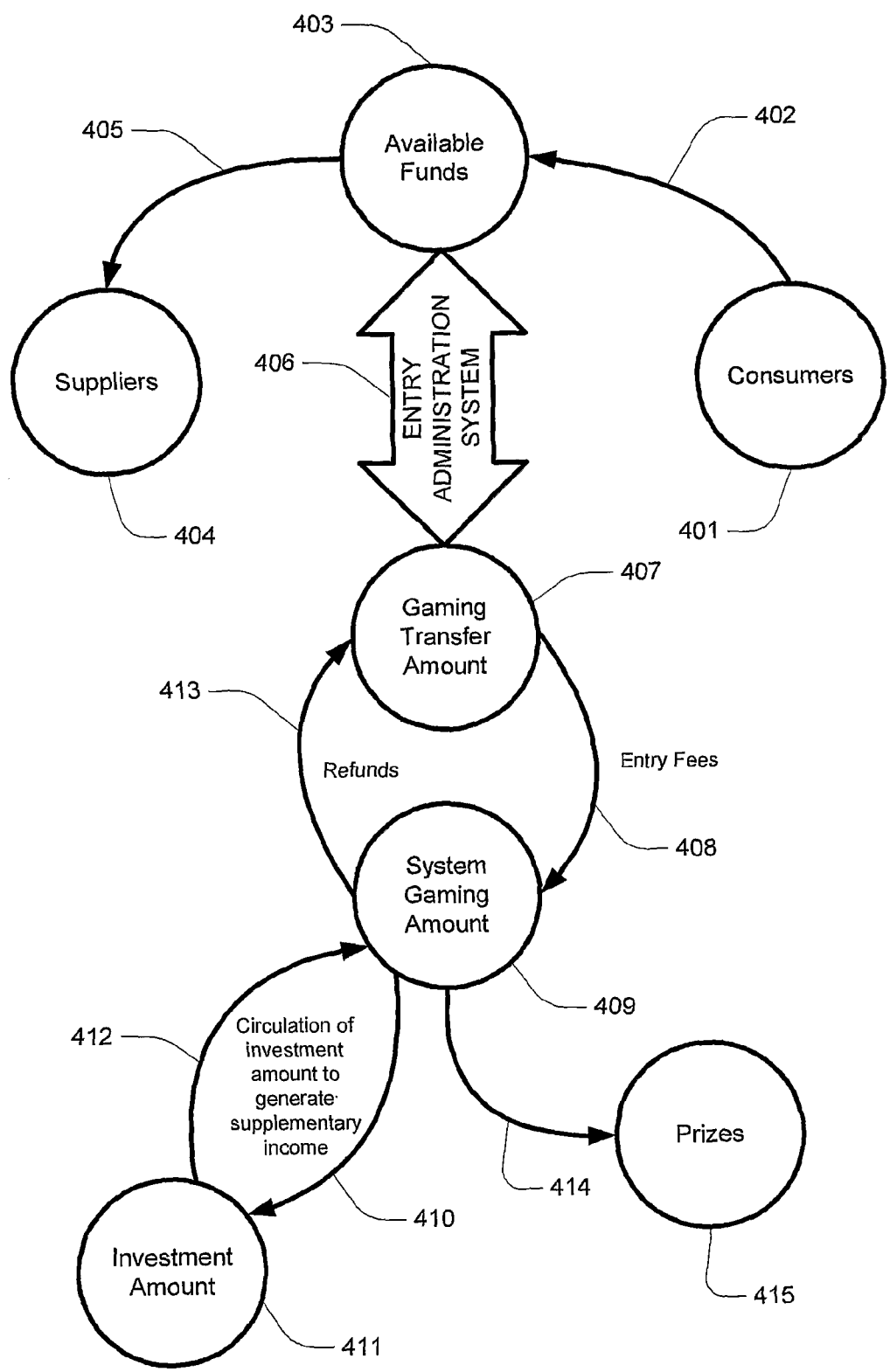
FIG. 4 illustrates an arrangement for providing a gaming activity in the context of a flexible credit arrangement according to one embodiment.

FIG. 4 provides a schematic overview of a further flexible credit embodiment. Consumers 401 obtain or consumer flexible credit subject to transactions (for example by purchasing this credit from an authorised distribution agency). A value in funds 402 corresponding to the value of the flexible credit purchased by each consumer is transferred to available funds 403. For example, this may occur by way of electronic funds transfer. Flexible credit is provided to the consumer by way of transactions with suppliers 404. Each such transaction results in a value in funds 405 being transferred from available funds 403 to a supplier 404. Again, this may occur by way of electronic funds transfer.

An entry administration system 406 coordinates the allocation of no-risk recurring entries to consumers. In overview, system 406 maintains the value of available funds 402 at a threshold level suitable for funding day-to-day realisations of flexible credit. Where funds 402 causes available funds 403 to exceed this threshold level, an amount is allocated to a gaming transfer amount 407. Likewise, where funds 404 reduce the value of available funds 403 to below the threshold level, system 406 reduces the value of the gaming transfer amount 407 to increase the value of available funds 403. In this manner, amount 407 essentially provides a bridge between flexible credit and gaming.

A portion 408 of amount 407 is used to fund entry fees, and is attributable to a system gaming amount 409. A portion 410 of the gaming amount is attributable to an investment amount 411, and a portion 412 is returned to the gaming amount. It will be appreciated that this provides a circulation for the generation of supplementary income in the form of a net investment return amount, as discussed in more detail further below. In broad terms, investment activities are used to derive a return which is, at least in part, used in the funding of prizes.

A portion 414 of the gaming amount is distributed as prizes 415. Another portion 413 of the gaming amount relates to refunds, and is returned to the gaming transfer amount 407. In overview, refunds are obtained where there is a need to increase the value of available funds 403 (i.e. one or more entries are cancelled to receive refunds of the associated entry fees).

Figure 5:
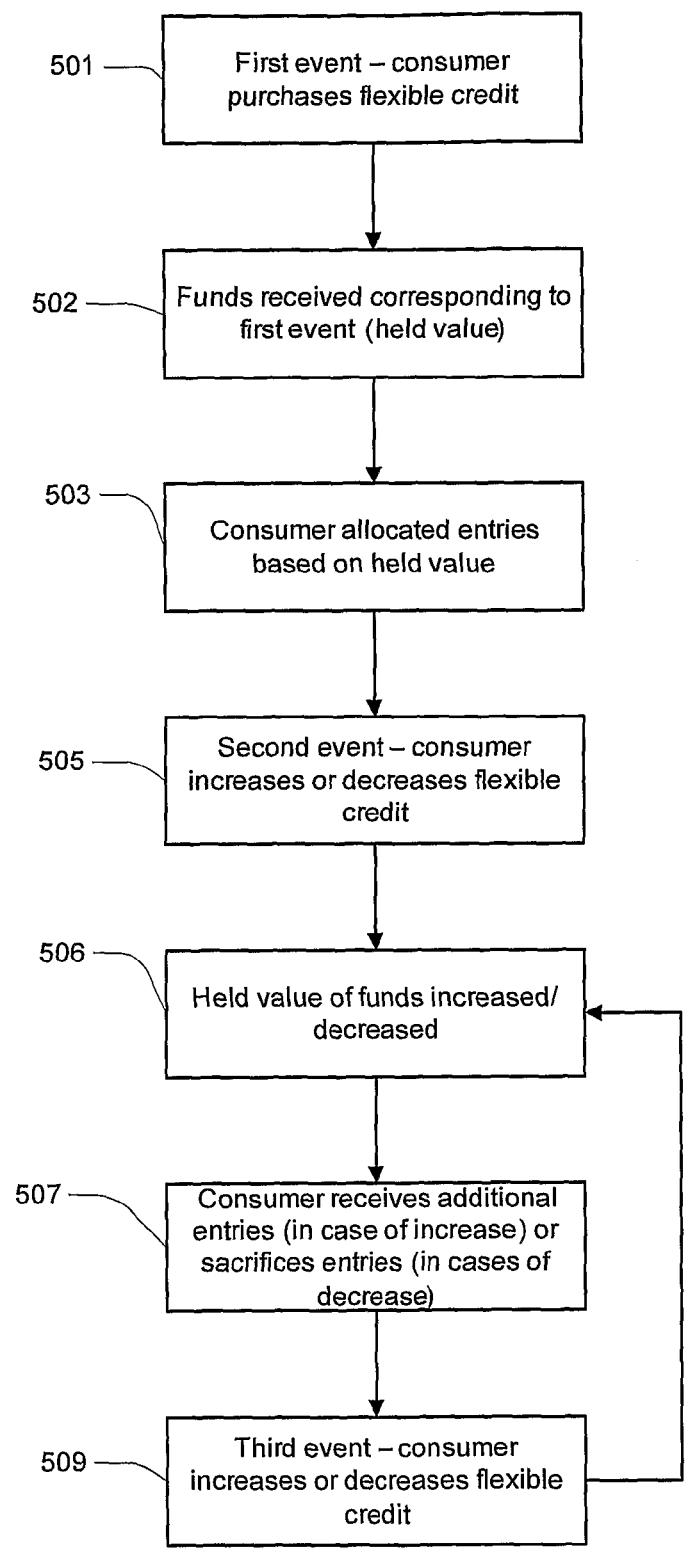
FIG. 5 illustrates a method according to one embodiment.

FIG. 5 illustrates a method corresponding to the embodiment of FIG. 4. In the context of this method, step 501 describes a first event whereby a consumer purchases flexible credit. At step 502, funds are received corresponding to the first event. These are described as "held funds", as they are held on behalf of the consumer, until such a time as the consumer consumes those funds by realising the flexible credit by way of a transaction. Step 503 includes allocating to the consumer one or more entries in a gaming activity (presently being recurring no-risk entries) based on the held value. In the present example, an administrator maintains a pool of entries for allocation to consumers, these being obtained based on a fixed per-entry entry fee. A predetermined proportion of the held value is determined to define a gaming allocation amount, this proportion typically being in the order of 40% to 90%, although in other embodiments alternate proportions are used (including, in some cases, 100% or close to 100%). The gaming allocation amount and the fixed per-entry entry fee determine the number of entries allocated to a given consumer. More specifically, the consumer is effectively allocated the number of no-risk recurring entries that could be purchased with an entry fee having the same quantum as the gaming allocation amount (which may be a value less than one, i.e. partial ownership in an entry).

Step 505 describes a second event whereby the consumer increases his/her flexible credit (i.e. by purchasing additional flexible credit) or decreases his/her flexible credit (i.e. by exchanging some or all of the flexible credit for goods/services). Based on this second event, the held value either increases or decreases at step 507. It will be appreciated that such a variation in the held value affects the gaming allocation amount for the relevant consumer (noting that the gaming allocation amount is a predetermined proportion of the held value). To account for this, step 507 includes allocating to the consumer one or more additional entries (in the case of an increase) or de-allocating from the consumer one or more entries (in the case of a decrease). De-allocated entries are, depending on the circumstances, cancelled to obtain refunds (for example where there exists a need to increase value 302), allocated to another one or more consumers, or returned to the pool for subsequent allocation to one or more consumers.

Reward Program Embodiments

As noted, a specific example of flexible credit includes reward points in the context of a reward program. In some embodiments, a gaming activity is implemented in conjunction with a reward program, such as a frequent flyer program. In broad terms, such reward programs allow consumers to accrue "reward points" and redeem these for a benefit. The present approach affords to consumers the opportunity to win a prize based on the quantum of reward points they have respectively accrued, without affecting the ability to later redeem those points for a benefit. For example, in some embodiments a monetary value corresponding to the quantum of reward points is used to fund one or more entries in a gaming activity, whereby the entries are allocated on the basis of a no-risk profile. In this manner, the entry fees are fully refundable.

The term "reward program" describes an arrangement whereby consumers accrue "reward points", with are redeemable against a benefit. These notions should be construed in a broad manner. Common examples include frequent flyer programs and other loyalty schemes. In overview, each consumer has a reward account, identifiable on the basis of a unique account identifier. This account maintains a value of reward points (which need not be greater than zero). A reward program administrator is responsible for increasing the value of reward points in a given consumer reward account in the case that the relevant consumer participates in predefined activities. These activities might include:

- The purchase of goods and/or services by way of a particular payment mode. For example, it is known to link a reward program to a credit card or the like, such that a consumer accrues reward points for using a specific credit card.
- The purchase of goods and/or services from a participating supplier. In some cases, a consumer presents a loyalty card or the like when completing a transaction with the participating supplier, thereby to initiate the procedure for having reward points allocated on the basis of that transaction. In some embodiments this includes furnishing a "frequent flyer number" when purchasing air travel with a participating airline.
- The purchase of prescribed goods and/or services. In this case, the allocation of points is product specific, rather than supplier specific. Often, such a regime is implemented in conjunction with one of the previous examples, to encourage particular consumer behaviours by way of "bonus" reward points or the like.
- Participation in other prescribed activities. In such cases, there need not be a monetary transaction between a consumer and a supplier. Rather, loyalty points are allocated for other actions of the consumer.

It will be appreciated that the above context is provided for the sake of explanation only, and that the present invention should not be limited in any way to particular reward program characteristics.

Figure 6:
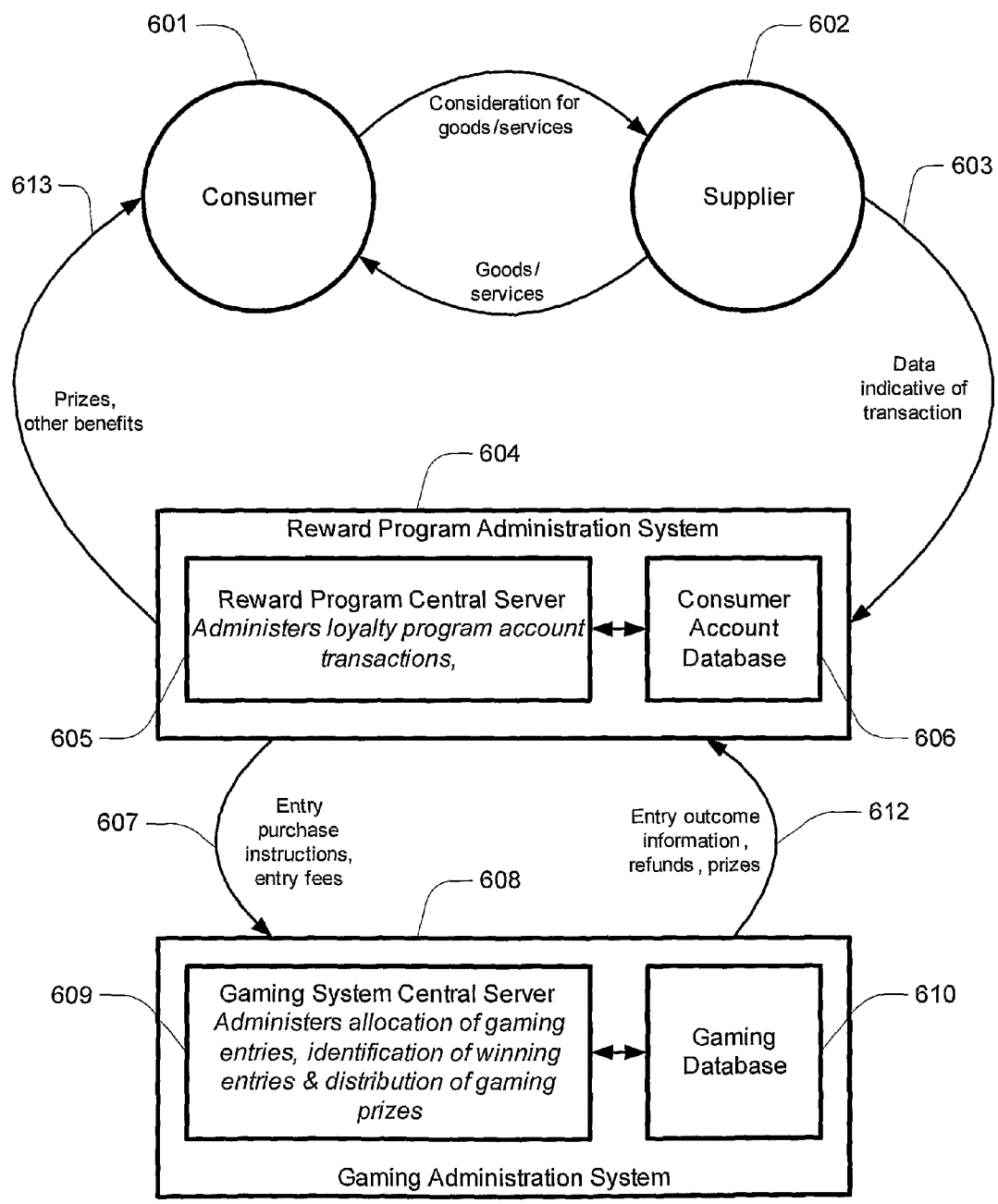
FIG. 6 illustrates an arrangement for providing a gaming activity in the context of a reward program arrangement according to one embodiment.

FIG. 6 illustrates an exemplary reward program according to one embodiment. In this example, the reward program is driven, at least in part, by transactions between consumers, such as consumer 601, and suppliers, such as supplier 602. In the illustrated example, this is a retail-style transaction for goods and/or services. However, in other instances there may be an alternate form of interaction between the consumer and another second party.

Data 603 indicative of a transaction between consumer 601 and supplier 602 is provided to a reward program administration system, 604. The nature of data 603 varies between embodiments. However, at a general level, it is indicative of the consumer (for example by way of a consumer reward account identifier) and indicative of one or more characteristics of the transaction (such as the total transaction value). This data is processed at a rewards program server 605 to determine a quantum/value of reward points that should be allocated to the consumer. These reward points are allocated to the consumer in a consumer account database 606.

The terms "supplier" and "consumer" should be afforded broad interpretations. A supplier is any party that provides goods and or services to another. Likewise, a consumer is any party that receives goods and or services from another party.

The reward program administration system 604 interacts with a gaming administration system 608. This gaming system provides an arrangement whereby an entry fee is able to be exchanged for one or more entries in a gaming activity on the basis of a no-risk profile (i.e. entry fees are refundable regardless of whether an entry is a winning entry). In some cases system 608 provides for other risk profiles in addition. However, as will be appreciated from the discussion herein, it is particularly advantageous to implement the present embodiments in the context of a no-risk profile gaming activity. Furthermore, a recurring entry option is selected such that a given entry fee essentially provides an ongoing opportunity to win a prize. This is discussed in more detail above in the section dealing with risk free gaming and no-risk recurring entries.

In overview, system 604 obtains no-risk recurring entries in a gaming activity from system 608 for allocation to consumers, such as consumer 601. In some embodiments, entries are "allocated" to consumers in the sense that database 606 is updated to associate a given consumer identifier with one or more entry identifiers for entries that have been allocated (in whole or in part) to the consumer.

System 604 provides to system 608 data 607 indicative of entry fees and entry purchase instructions. Data 607 is, in some cases, provided in respect of each appropriate item of data 603. For example, each item of data 603 is processed to determine an entry fee amount, and this entry fee amount is applied as an entry fee in the context of system 608. In other cases data 607 is provided periodically. For example, system 604 maintains a pool of entries for allocation to consumer accounts, and periodically increases the size of that pool to ensure that sufficient entries are available for allocation to consumers over time.

System 608 includes a gaming server 609, which is responsible for the allocation of entries, identification of winning entries, and distribution of prizes. This server operates in conjunction with a gaming database 610.

System 608 provides to system 607 data 612 indicative of entry outcome information, refunds, and prizes. In the case that an entry allocated to a given consumer is a winning entry, the resulting prize is marked for distribution to that consumer. In some cases less than 100% of the prize is distributed to the consumer.

In broad terms, consumers are allocated a number of no-risk recurring entries corresponding to the number of reward points in their respective accounts. The number of entries increases as does the number of points. Likewise, where points are redeemed for benefits, the number of entries is decreased.

Figure 7:
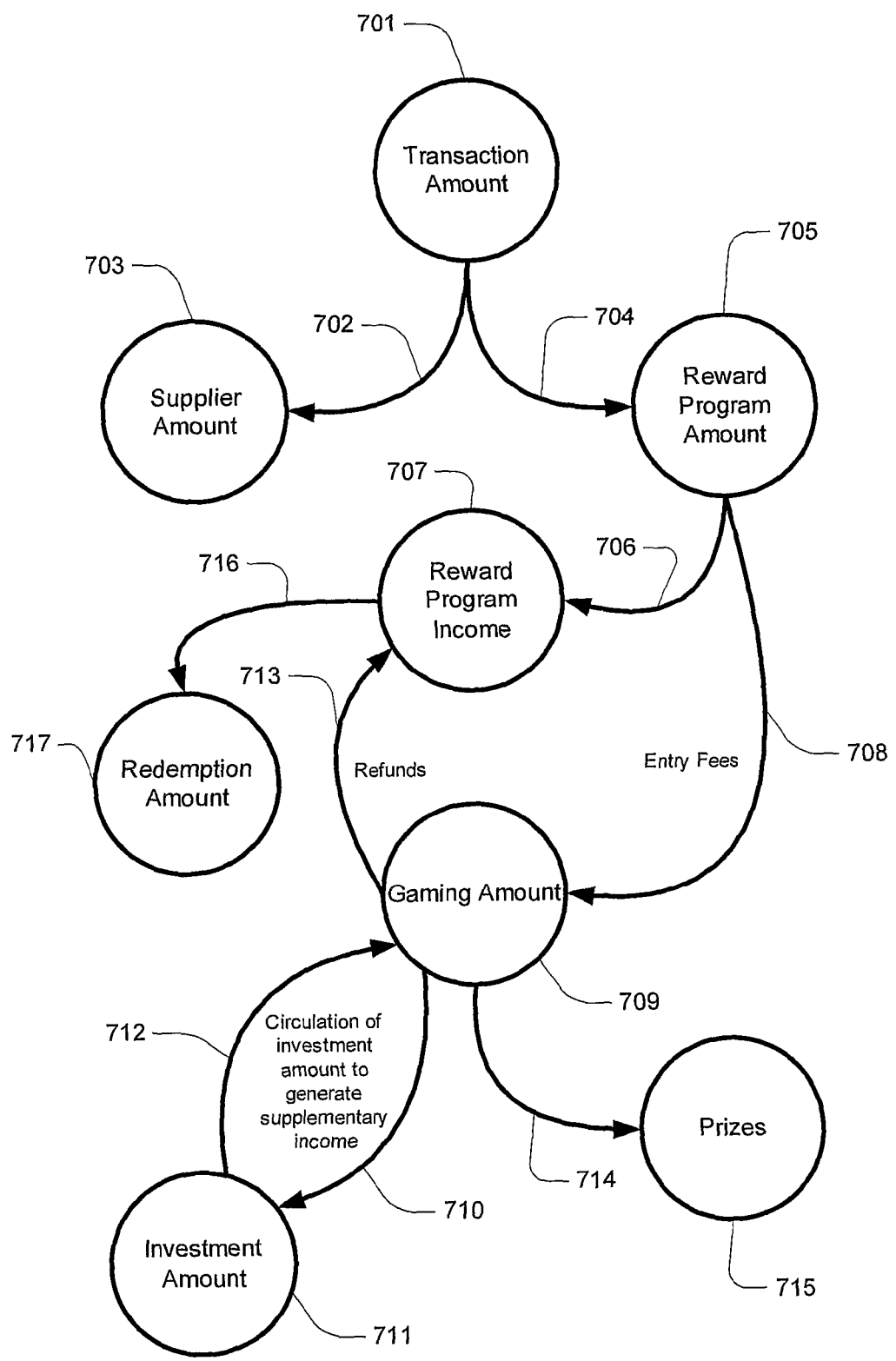
FIG. 7 illustrates an arrangement for providing a gaming activity in the context of a reward program arrangement according to one embodiment.

FIG. 7 provides an exemplary cash-flow diagram according to one embodiment. This is not intended to illustrate a precise flow of monies, but rather illustrate underlying concepts as to how activities are funded, even if only at a notional level. The term "portion" should be read to describe a percentage from 0% to 100% inclusive of the extremities.

A transaction amount 701 is provided by a consumer to a supplier in exchange for goods or services. A portion 702 of amount 701 is attributable to a supplier amount 703, this essentially being the amount retained by the supplier less a portion 704 that is provided to an reward program administrator as a reward program amount 705 (i.e. in the form of commission or the like). A portion 706 of reward program amount 705 is attributable to reward program income 707. Another portion 708 is used to fund entry fees, and is attributable to a gaming amount 709. A portion 710 of the gaming amount is attributable to an investment amount 711, and a portion 712 is returned to the gaming amount. It will be appreciated that this provides a circulation for the generation of supplementary income in the form of a net investment return amount, as discussed in more detail elsewhere in the present specification A portion 714 of the gaming amount is distributed as prizes 715. Another portion 713 of the gaming amount relates to refunds, and is attributable to reward program income 707.

Reward program income 707 is used to fund benefits that are realised by the redemption of reward points. To this end, a portion 716 of reward program income 707 is attributable to a redemption amount 717.

Taking a wider view of the above example, it will be recognised that the administrator of a reward program essentially takes a small commission to cover the costs of providing benefits to consumers. In many conventional situations, this small commission is held by the administrator until such a time as a redemption is made, and then applied towards funding the benefit. In the present embodiments, the commission (or part thereof) is used to fund no-risk recurring entries in a gaming activity. This provides consumers with an ongoing opportunity to win prizes simply by having reward points in their account. At the same time, it does not prevent consumers from redeeming their respective points for benefits in the conventional manner. This provides a significant commercial advantage over conventional reward programs.

Figure 8:
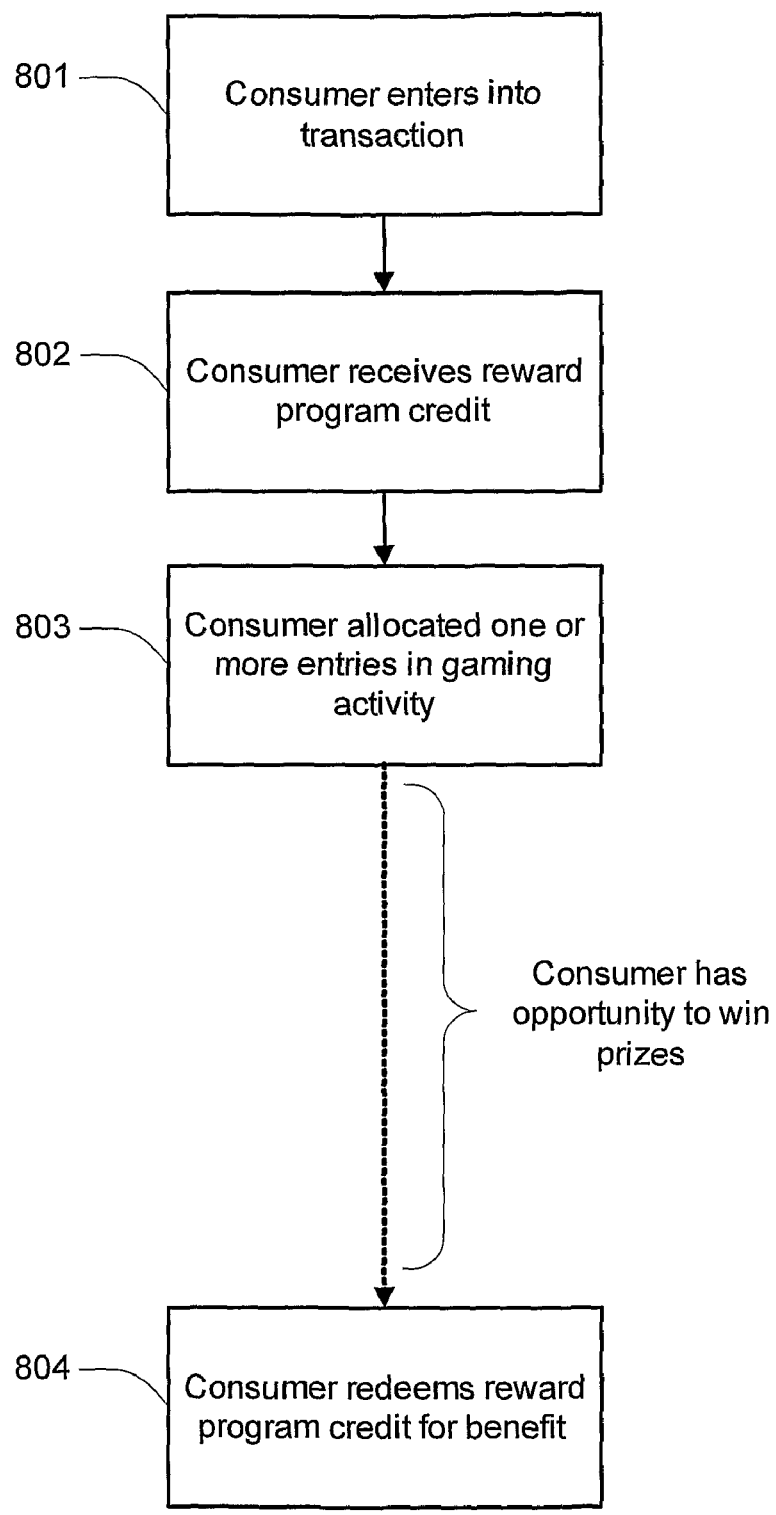
FIG. 8 illustrates a method according to one embodiment.

FIG. 8 illustrates a general method along the lines of the above examples. A consumer enters into a transaction at step 801. The consumer then receives reward program credit at step 802. The consumer is also allocated one or more entries in a gaming activity at 803, presently being no-risk recurring entries. The consumer later redeems some or all of the reward program credit at 804. Between 803 and 804, the consumer has the opportunity to win a prize as a result of entries allocated based on reward program credit held during that time.

Figure 9:
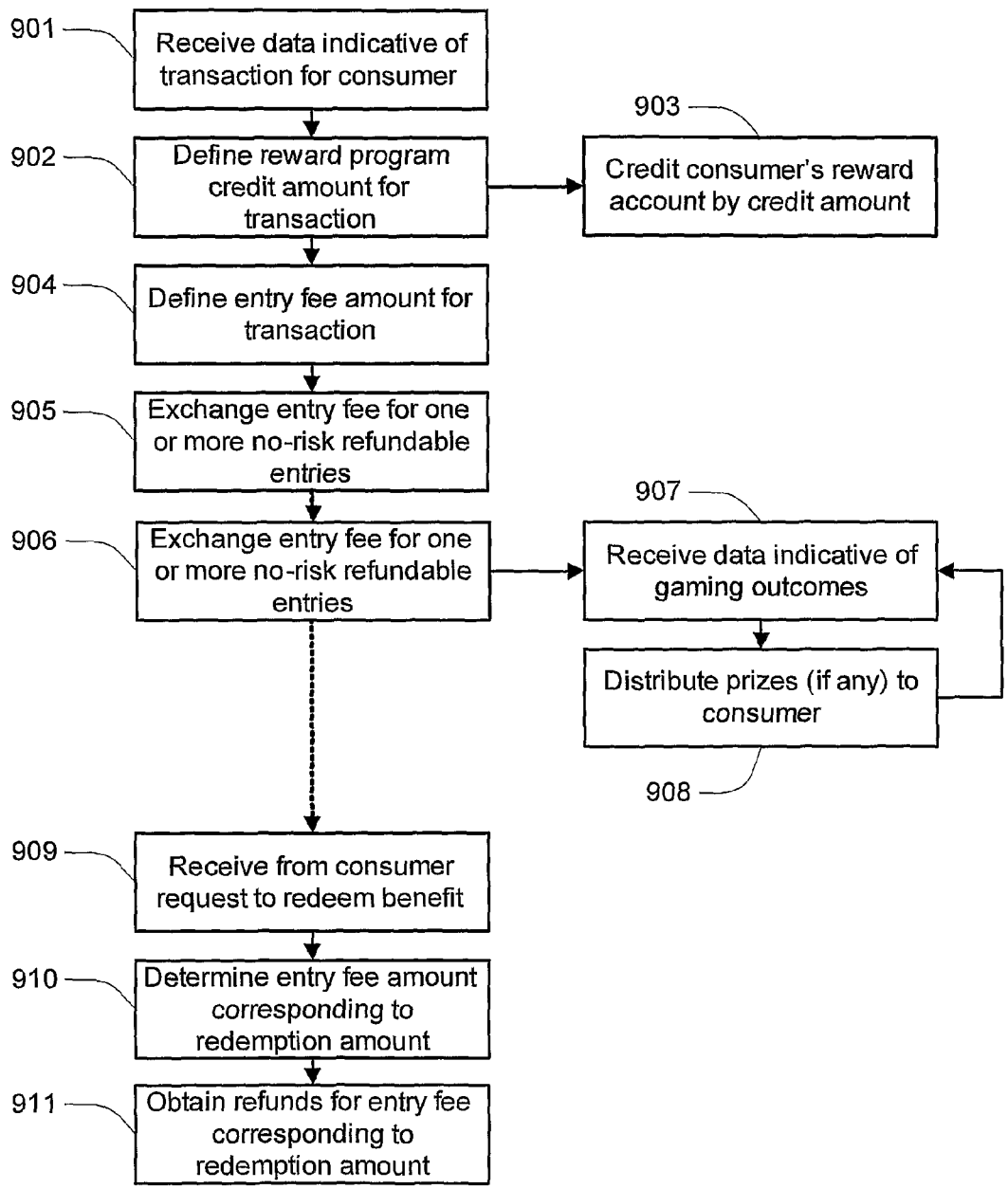
FIG. 9 illustrates a method according to one embodiment.

FIG. 9 illustrates a corresponding method, viewed in this instance from the perspective of a reward program administration system. Step 901 includes receiving data indicative of a transaction for a consumer. Step 902 includes defining a reward program credit amount for the transaction. This is defined on the basis of rules implemented in the context of the reward program (in a simple example a set number of points are allocated for each dollar spent). The consumer's reward account is credited by the defined credit amount at 903.

Step 904 includes defining an entry fee amount for the transaction. In some cases the entry fee amount is based on the defined reward program credit. For example, in one embodiment it is determined that each X number of reward points correspond to an entry fee amount of $Y. In some cases, the entry fee amount is based on data indicative of the transaction. For example, in one embodiment it is determined that each $X of transaction value correspond to an entry fee amount of $Y. In further cases criteria such as reward program income and the like are used.

Step 905 includes exchanging the entry fee amount for one or more no-risk recurring entries. In some embodiments this includes providing the entry fee amount to a gaming administrator to obtain such entries. In other embodiments this is an internal procedure whereby a pool of pre-obtained unallocated entries is maintained for the reward program, and step 906 effectively includes allocating to the relevant consumer a value of these entries corresponding to the entry fee amount. It will be appreciated that, by such an approach, the reward program holds a quantity of entries that are not at all times allocated to consumers. However, this is not necessarily problematic given that there is a minimal overhead associated with holding entries. For example, in some embodiments the cost of holding entries is defined by the opportunity cost associated with non-investment of funds on hand.

Steps 906 and 907 respectively define the receipt of data indicative of a gaming outcome and the distribution of prizes (if any) to consumers. This loops over time, as prize draws occur in respect of the gaming activity.

Step 908 includes receiving from the consumer a request to redeem reward points for a benefit. In some cases this request is directly received (for example the consumer uses reward points to make purchases via a website). In other cases it is indirectly received (for example the consumer liaises with a third party, who then passes on information regarding the redemption to an administrator of the reward program). Step 909 includes determining an entry fee amount corresponding to the redemption amount. This is essentially a reverse of the process at step 904. That is, whereas at step 904 an entry fee amount is defined for a credit in reward points, at step 909 an entry fee amount is defined for a debit in reward points. This identifies the number of entries that must be refunded to cover the redemption request—this many entries are "un-allocated" from the consumer. In embodiments where the reward program administrator maintains a pool of entries, the un-allocated entries are returned to the pool. In other examples, the entries are redeemed for refunds directly with an administrator of the gaming system.

It will be appreciated that the present reward program embodiments provide a valuable application for risk free gaming, and correspondingly provide significant advantages in comparison to known reward programs.

Conventional Banking Embodiments

As foreshadowed, in some embodiments a flexible credit arrangement is implemented whereby a financial institution manages accounts on behalf of consumers on a "cash at call" basis. On the basis of funds maintained in these accounts (for example by way of some or all of the interest derived, or some or all of the capital), the financial institution maintains entries in a risk free gaming activity (optionally being an activity that provides subject matter being functionally similar to entries in a risk free gaming activity, as discussed above). These entries are wholly or partially allocated between account holders, thereby to provide the account holders with an opportunity to win prizes. The manner of allocation for the entries is generally based on the level of capital in a given account, optionally in combination with additional factors. In some cases the risk free gaming activity is provided by a party other than the financial institution, optionally being a lottery conducted by a third party in accordance with the teachings of PCT/AU2007/000774, are a Bonus Bonds style arrangement. In the case of the latter, a consumer is effectively able to particulate in a Bonus Bonds style arrangement by way of a conventional cash-at-call account.

Figure 10:
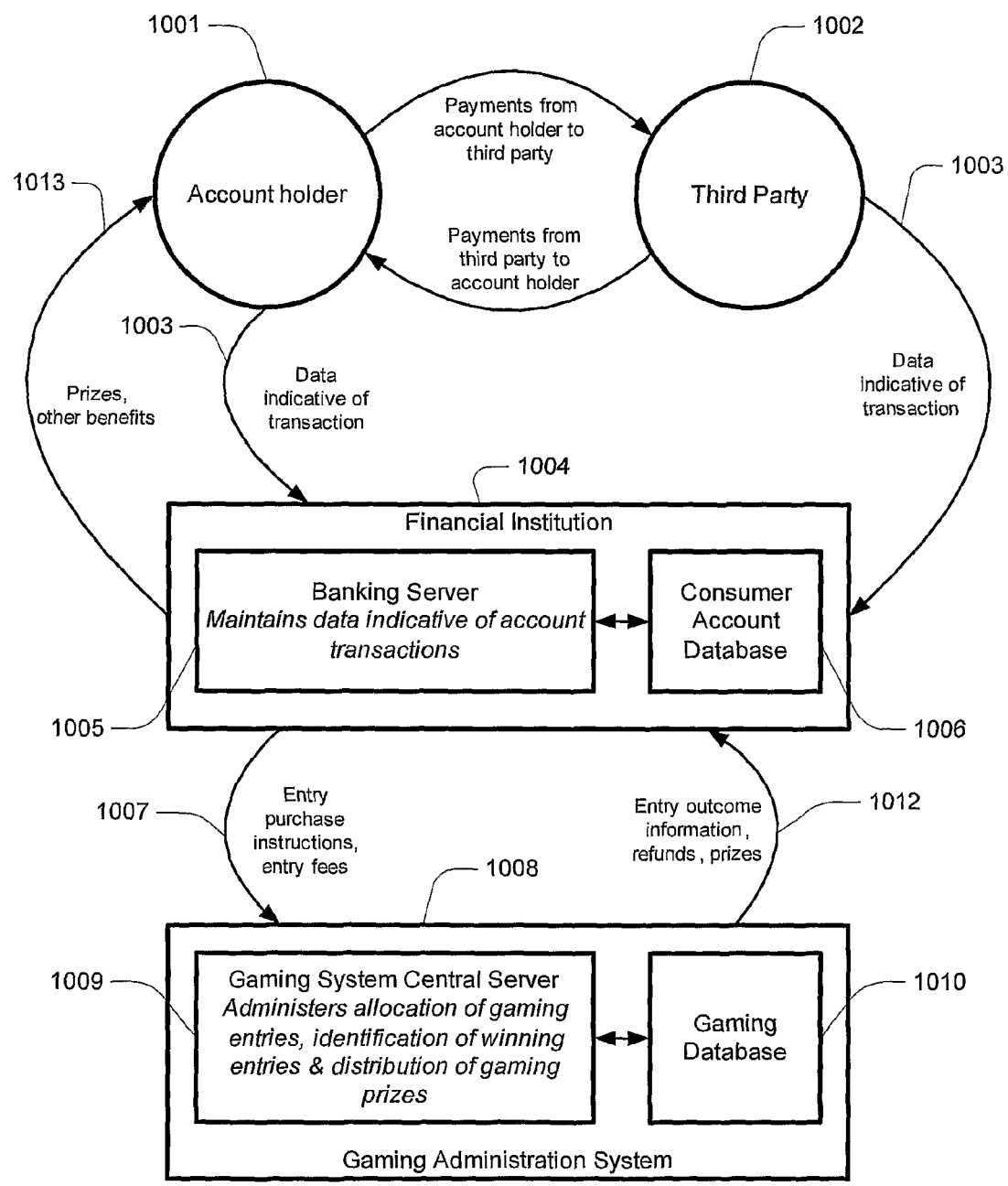
FIG. 10 illustrates an arrangement for providing a gaming activity in the context of a financial institution according to one embodiment.

FIG. 10 illustrates an exemplary flexible credit arrangement according to one conventional banking embodiment. In this example, the arrangement is driven, at least in part, by transactions involving an account holder 1001 and a third party 1002.

Data 1003 is indicative of a transaction between account holder 1001 and third party 1002. This data may be provided by either of account holder 1001 and third party 1002, depending on the nature of the transaction. For example, where the third party is a retailer, data 1003 may be provided by the third party via EFTPOS or another electronic payment arrangement to indicate that a payment has been made by the account holder. Where the third party is an employer, data 1003 may be provided by the third party subject to an electronic funds transfer for transferring funds to the account holder. In some cases the account holder makes an electronic funds transfer via an online banking facility or the like thereby to provide data 1003.

Data 1003 is provided to a financial institution system 1004, for example by way of an EFTPOS system or other electronic funds transfer arrangement. The nature of data 1003 varies between embodiments. However, at a general level, it is indicative of the account holder (for example by way of an account identifier, or payment card identifier for a payment card issued by the financial institution) and indicative of one or more characteristics of the transaction (such as the total transaction value). This data is processed at a banking server 1005 to determine a level (e.g. quantum/value) of funds that should be allocated to the account holder, or de-allocated from the account holder. This level of funds is allocated to, or de-allocated from, the account holder in a account holder account database 1006.

The financial institution system 1004 interacts with a gaming administration system 1008. This gaming system provides an arrangement whereby an entry fee is able to be exchanged for one or more entries in a gaming activity.

In overview, system 1004 obtains entries in a gaming activity from system 1008 for allocation to account holders, such as account holder 1001. In some embodiments, entries are "allocated" to account holders in the sense that database 1006 is updated to associate a given account holder identifier with one or more entry identifiers for entries that have been allocated (in whole or in part) to the account holder.

System 1004 provides to system 1008 data 1007 indicative of entry fees and entry purchase instructions (for example in relation to no-risk recurring entries). Data 1007 is, in some cases, provided in respect of each appropriate item of data 1003. For example, each item of data 1003 is processed to determine an entry fee amount, and this entry fee amount is applied as an entry fee in the context of system 1008. In other cases data 1007 is provided periodically. For example, system 1004 maintains a pool of entries for allocation to account holder accounts, and periodically increases the size of that pool to ensure that sufficient entries are available for allocation to account holders over time.

System 1008 includes a gaming server 1009, which is responsible for the allocation of entries, identification of winning entries, and distribution of prizes. This server operates in conjunction with a gaming database 1010.

System 1008 provides to system 1007 data 1012 indicative of entry outcome information, refunds, and prizes. In the case that an entry allocated to a given account holder is a winning entry, the resulting prize is marked for distribution to that account holder. In some cases less than 100% of the prize is distributed to the account holder.

It will be appreciated that the above described arrangement is suitable for providing a gaming activity in conjunction with flexible credit in accordance with various methods described herein.

Residual Transaction Embodiments

As foreshadowed, another form of flexible credit includes residual transaction amounts, in the context of a residual transaction amount management system. Described herein are various systems and methods for managing residual transaction amounts. In some embodiments, such systems and methods are implemented to allow a consumer to direct "loose change" resulting from a cash transaction towards an electronic account, as opposed to receiving the loose change as physical legal tender. In some such embodiments, the loose change of a given consumer is subsequently applied to at least partially fund one or more entries in a gaming activity, essentially providing the consumer with an opportunity to win a prize. In most cases, the loose change results from a transaction for goods and/or services unrelated to the gaming activity itself, and unrelated to gaming generally.

It will be appreciated that features and functionalities described in the context of residual transaction embodiments are equally applicable to other flexible credit arrangements in a broader context.

One embodiment provides a method for managing residual transaction amounts in which data is received, this data being indicative of an account identifier and a residual transaction amount. Subsequently, the method includes the step of querying a consumer account database to identify a consumer account corresponding to the account identifier, and crediting the identified consumer account by an amount including at least a portion of the residual transaction amount, on the basis of predetermined credit allocation criteria. The method, at least in some embodiments, also includes receiving data indicative of the outcome of a gaming activity and, in response to the outcome of the gaming activity, querying the consumer account database to identify one or more winning consumer accounts to which prize amounts are to be distributed. In some embodiments, the method includes querying the consumer account database to identify one or more consumer accounts for which some or all of the respective credit is to be exchanged for one or more entries in a gaming activity (or in some cases one or more partial entries in a gaming activity), and subsequently exchanging that credit for the one or more entries (or partial entries).

Figure 11:
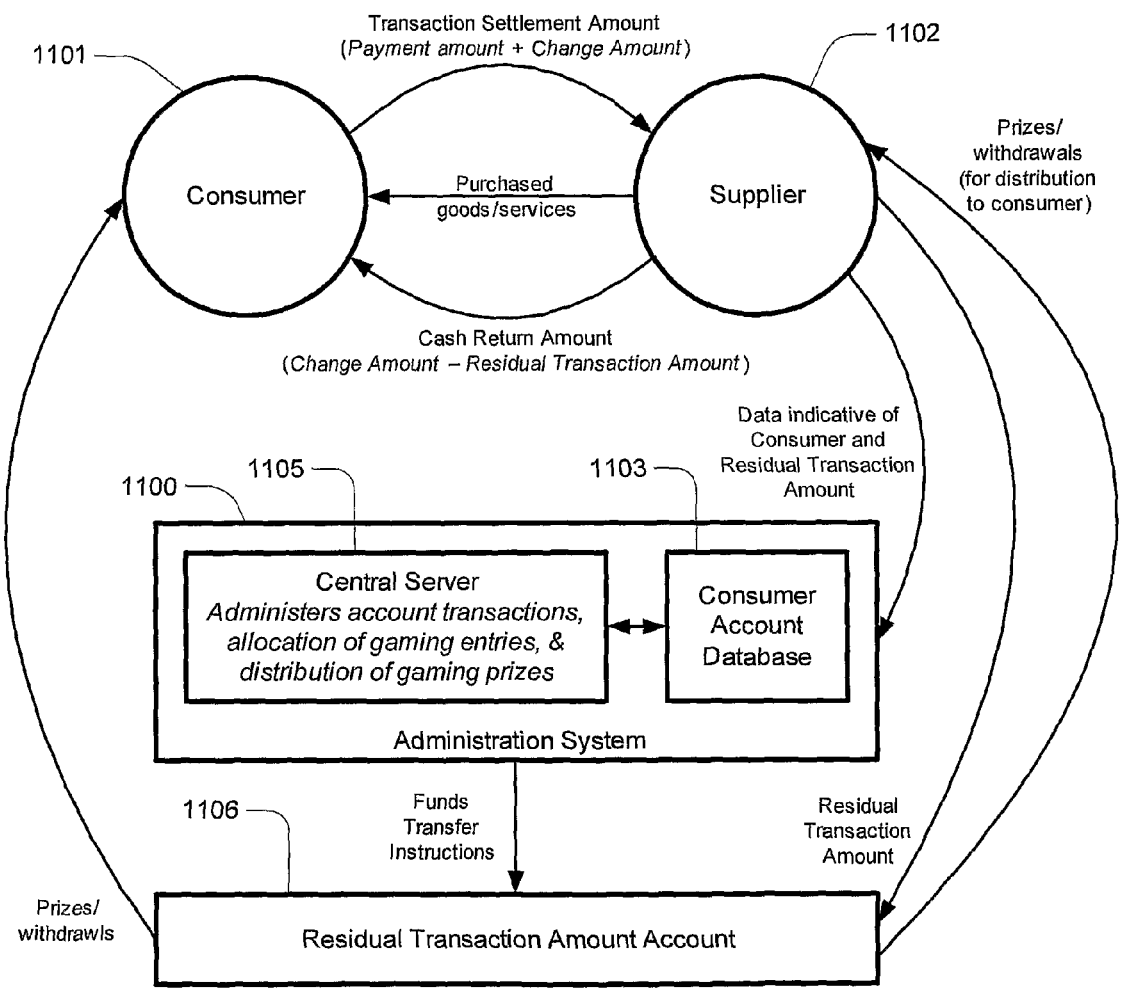
FIG. 11 illustrates an arrangement for providing a gaming activity in the context of a residual transaction management system according to one embodiment.

FIG. 11 illustrates a system for managing residual transaction amounts, in the form of an administration system 1100. In overview, system 1100 is configured to manage residual transaction amounts stemming from transactions between consumers and suppliers, such as consumer 1101 and supplier 1102 illustrated in FIG. 11.

At a broad level, in a transaction between a consumer and a supplier, the consumer exchanges a "transaction settlement amount" for predefined goods or services. Essentially, this "transaction settlement amount" corresponds to the specified or agreed price of the relevant goods or services. However, in practice, the consumer often provides to the supplier a "payment amount" which is greater than the "transaction settlement amount", the difference between the "payment amount" and the "transaction settlement amount" defining a "change amount". The supplier reimburses the consumer for the "change amount". Conventionally, the supplier provides this change amount in cash (i.e. in the form of coins, notes or a combination of both).

In the present context, the "change amount" is considered to comprise two components (either of which might be zero in certain circumstances) —a "residual transaction amount", and another component. This other component, for the present purposes, is referred to as a "cash return amount". The general notion, elaborated on below, is that the process of reimbursing the consumer for the "change amount" includes directly providing to the consumer a currency amount corresponding to the "cash return amount" (assuming this to be non-zero), and arranging for the "residual transaction amount" to be managed on behalf of the consumer (again, assuming this to be non-zero).

Although the precise definition of "residual transaction amount" varies between embodiments, as further enunciated below, for some implementations the general concept is for it to be defined by the "loose change" of a transaction. The term "loose change" essentially describes an amount of currency, in coin and/or note form, for which the perceived inconvenience of physical carriage is perhaps greater than the immediate perceived value. It is appreciated that these are subjective considerations, with perceptions of inconvenience and value varying from person to person. Ultimately, determining an appropriate definition for the term "residual transaction amount" is a matter to be determined during implementation. Some general guidelines are provided below.

At a fundamental level, the following applies:

$$0 \leq \text{RESIDUAL TRANSACTION AMOUNT} \leq \text{CHANGE AMOUNT}$$

In some cases the "residual transaction amount" has a value equal to the "change amount", whereas in other embodiments it has a value of less than 100% of the "change amount", or even zero. In some embodiments the "residual transaction amount" is determined according to one of the following formulae:

$$\text{RESIDUAL TRANSACTION AMOUNT} = \text{CHANGE AMOUNT} - \text{NEAREST LOWER WHOLE DOLLAR AMOUNT}$$

OR $$\text{RESIDUAL TRANSACTION AMOUNT} = \text{CHANGE AMOUNT} - \text{NEAREST LOWER CURRENCY NOTE AMOUNT}$$

It will be appreciated that, in other embodiments, other formulae may be used. In some embodiments only currency notes of over a predetermined value are considered for determinations using the latter formula (for example, in the context of US currency, this might be the "nearest lower currency note amount of $10 or greater"). In some embodiments the consumer is provided with an option to designate a particular residual transaction amount between zero and the change amount. That is, to consider the extremities, in some cases the consumer can select a zero value for the residual transaction amount in which case the total value of the change amount would simply be returned to the consumer as cash in the usual way, and in some cases the consumer can select the entire change amount to define the residual transaction amount, in which case the total value of the change amount would be allocated for management as "loose change" according to an embodiment of the present invention.

Although a useful feature of certain embodiments is the ability to reduce the need for consumers to physically carry currency coins or low-value currency notes (specifically by defining a residual transaction amount as a "loose change" component of the change amount), it is envisaged that in various cases the residual transaction amount might be either greater than or less than the next lowest currency note amount available as change for a given transaction. That is, although various embodiments are described herein by reference to the concept of "loose change", it should be appreciated that this term describes a subset of what is defined by the term "residual transaction amount", and it follows that the scope of the present disclosure should by no means be limited to the concept of "loose change".

There are particular advantages in defining the residual transaction amount by reference to the nature of legal tender in a particular jurisdiction. For example, in circumstances where legal tender takes both note and coin form, such as the United States and Australia, the residual transaction amount is able to be defined by the portion of the residual transaction amount that is typically provided by way of currency coins and/or low-value currency notes. For instance, in such situations, the residual transaction amount is the change amount less the nearest lower whole dollar amount, and is essentially "loose change" by one definition. However, in some cases, low-value currency notes (such as US $1 notes) are also considered to be "loose change". Conversely, in some cases, high-value currency coins (such as Australian $1 and $2 coins) may not be considered to be "loose change".

By way of example, in jurisdictions where one or more units of coin currency have a significant value, such as Australia where $1 and $2 currency coins are used and the lowest currency note value is $5, whether or not such coins are included in the residual transaction amount (i.e. considered to be loose change) varies between embodiments. For example, in one embodiment based on the Australian situation, the residual transaction amount is the change amount less the nearest lower whole dollar amount ($1 and $2 coins are considered to be loose change), and in another embodiment, again based on the Australian situation, the residual transaction amount is deemed to be the change amount less the nearest $5 integral multiple amount ($1 and $2 coins are not considered to be loose change). In practice, determinations for a particular currency system are able to be made pursuant to an arbitrary value-based determination.

In some jurisdictions, the lowest denomination of physical currency has a value greater than the minimum theoretical single unit of currency. This leads to a situation whereby, at a practical level, rounding is often applied to a change amount. For example, in Australia, the lowest denomination of physical currency is $0.05. If a consumer purchases an item for $0.98 by way of a $1 cash payment amount, the change amount is, in theory, $0.02. However, because the lowest denomination of physical currency is a five-cent coin, this change amount is, in practice, rounded down to $0.00 (i.e. no change is provided). Alternatively, it might be considered that the price of that item is rounded up to $1.00 (again resulting in no change). On the other hand, by some embodiments of the present invention, a residual transaction amount of $0.02 is nevertheless defined. As will be appreciated from discussions below, the consumer therefore does in fact receive $0.02 as change for the transaction (this is credited to an electronic account), in spite of the fact that in absence of system 1100 no physical change amount would have been received.

In some embodiments various rounding procedures are implemented, including approaches whereby all change amounts are rounded down to the nearest set level (such as to the nearest $0.05, with $0.96 to $0.99 being rounded to $0.95), rounded up to the nearest set level (such as to the nearest $0.05, with $0.96 to $0.99 being rounded to $1.00), or to the closest set level (such as to the nearest $0.05, with $0.93 to $0.97 being rounded to $0.95).

As illustrated in FIG. 11, data indicative of the residual transaction amount is transmitted, along with data indicative of the consumer, to system 1100. This data is used to update a consumer account database 1103 under the control of a central server 1105. In this way, database 1103 maintains data indicative of the amount of credit on behalf of the consumer, and on behalf of a plurality of other consumers. The actual residual transaction amount is provided, for example by way of electronic credit transfer, to a residual transaction amount account 1106. In some cases account 1106 is defined by a plurality of distributed accounts.

System 1100 is configured to provide instructions for allowing the transfer of credit from account 1106 to predefined locations. In some embodiments, the predefined locations include:

A bank account nominated by consumer 1101 (i.e. credit is transferred directly to the consumer).

A bank account nominated by supplier 1102 (i.e. credit is indirectly transferred to the consumer via the supplier).

In the case of the latter, in some circumstances credit is provided to the supplier at a time following distribution of the credit to the consumer by the supplier in cash form or as in-store credit (i.e. reimburse the supplier for monies already distributed to the consumer).

In some embodiments, the intermediate account 1106 may be omitted, and the respective credits may be transferred directly to individual consumer accounts, for example In the presently considered embodiments, server 1100 provides consumers with an opportunity to participate in one or more gaming activities on the basis of their respective residual transaction amounts. In some embodiments such participation occurs on the basis of a predefined default situation; whilst in other embodiments such participation is subject to a positive consumer selection.

In some embodiments, residual transaction amounts are exchanged for entries in a gaming activity, such as a lottery. Pursuant to the outcome of this gaming activity, winning entries are identified, and prizes (which may or may not be financial in nature) are distributed (or marked for distribution) among those consumers to whom winning entries were allocated.

In some cases there is a minimum spend level in a gaming activity (for example a minimum entry cost of $1), this minimum spend level being greater than some or all of the residual transaction amounts. In some cases, a consumer is allocated an entry only when the cumulative total of residual transaction amounts maintained on behalf of that consumer accrues to the minimum spend level (for example this might occur following a plurality of transactions). In other embodiments, consumers are syndicated together such that a single entry is essentially purchased by a plurality of consumers, each "owning" a respective proportion of that entry corresponding to their relative share in the cost. In such cases, in the event of a winning entry, the prize would be shared among the associated entrants in the same respective proportions, or optionally on some other predetermined basis.

In some embodiments, the gaming activity is a traditional gaming activity by which the entry fees (i.e. the portion of individual or cumulative residual transaction amounts exchanged for entries) are placed fully at risk. However, in other embodiments, as described further below, entry fees are refundable.

The terms "supplier" and "consumer" should be afforded broad interpretations in the context of the present invention. A supplier is any party that provides goods and/or services to another party in exchange for a transaction settlement amount (i.e. a supplier receives payment for goods and/or services). Likewise, a consumer is any party that receives goods and/or services from another party in exchange for a transaction settlement amount (i.e. a c consumer pays for goods and/or services). Suppliers are predominately described herein by reference to the example of retailers; however it should be appreciated that in all circumstances where the term "retailer" is used, the broader term "supplier" should be equally applicable unless the context clearly dictates otherwise.

Residual Transaction Management—System Overview

Provided below is a description of an exemplary hardware configuration for implementing some embodiments of the present invention. It should be appreciated that this is set out for the purposes of example only, and should not be read as necessarily limiting the scope of the present disclosure.

Figure 12:
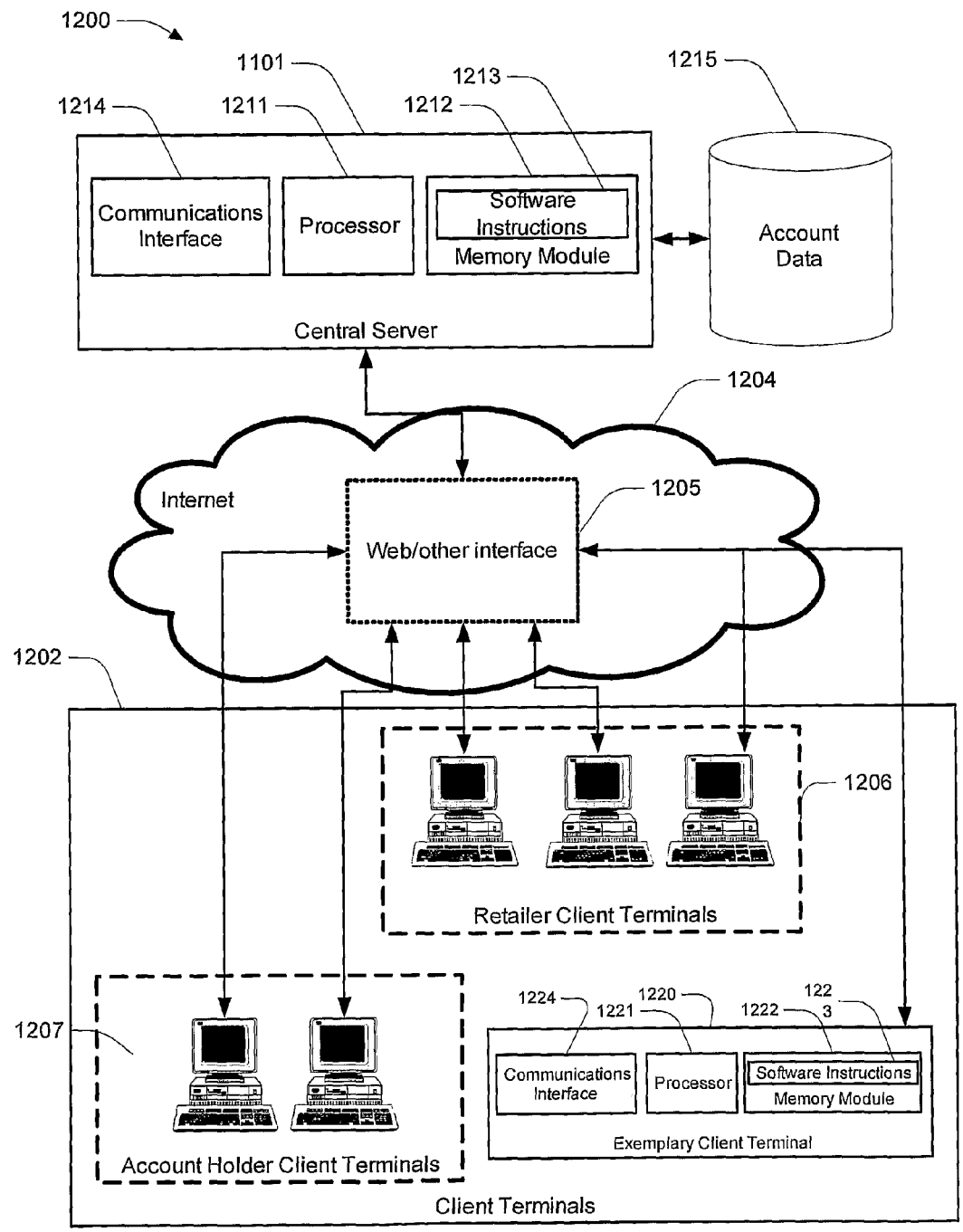
FIG. 12 illustrates a residual transaction management system according to one embodiment.

FIG. 12 illustrates a system 1200 for managing residual transaction amounts according to one embodiment. As illustrated, the system includes a central server 1201, which is configured to communicate with a plurality of client terminals 1202 over a communications network 1204. In the illustrated example, network 1204 is provided by an internet-based interface 1205. However, it will be appreciated that the manner by which the central server communicates with client terminals varies between embodiments. For example, various wired and wireless communications networks are used in other embodiments. In some embodiments combinations are present, such as a combination of cellular networks (for example where client terminals include cell phones) and the Internet (for example where client terminals include POS terminals and/or personal computers).

It should be appreciated that server 1201 is illustrated as a single discrete component for the purposes of illustration only, and in other embodiments server 1201 includes multiple discrete (and in some cases distributed) components. In the illustrated example, server 1201 includes a processor 1211 coupled to a memory module 1212 that maintains software instructions 1213 for execution on processor 1211. These software instructions allow server 1201 to perform various methods and provide various functionalities discussed herein. Also coupled to processor 1211 is a communications interface 1214 for allowing communication between server 1201 and client terminals 1202. Server 1201 operates in conjunction with an account holder database 1215, which might also include distributed components. Database 1215 maintains data indicative of consumer accounts. In overview, each consumer that makes use of system 1200 has an account defined in database 1215. This account maintains information concerning the account, such as a level of credit in the account, user preferences associated with the account, and/or contact information for the consumer.

The consumer accounts do not, in the present embodiments, actually maintain any physical monetary credit. Rather, they are "virtual accounts', optionally configured to include data indicative of a value in credit respectively attributable to the relevant consumers. Actual monies are maintained in one or more physical accounts, such as interest bearing accounts, and are optionally subjected to various investment procedures to derive investment income.

As illustrated, client terminals 1202 include retailer client terminals 1206 and account holder client terminals 1207, although the latter are only present in select embodiments, as discussed further below. An exemplary client terminal 1210 includes a processor 1221 coupled to a memory module 1222 that maintains software instructions 1223 for execution on processor 1221. These software instructions allow terminal 1210 to perform various methods and provide various functionalities discussed herein. In some embodiments these software instructions are implemented in conjunction with software instructions 1213 for this purpose (such as where a "thin client" or browser based approach is implemented). Also coupled to processor 1221 is a communications interface 1224 (such as an Ethernet interface, GSM/other cellular communications module, or other communications interface) for allowing communication between server 1201 and client terminals 1202.

Retailer terminals 1206 include any one or more of point of sale (POS) terminals, discrete hardware devices coupled to POS terminals, or the combination of such discrete hardware devices coupled with their respective POS terminals. The underlying concept is that a retailer terminal 1206 is configured to receive data indicative of a residual transaction amount (such as a residual transaction amount itself or other data from which a residual transaction amount is able to be determined subject to further processing).

Residual Transaction Amounts—Retailer Terminal Procedure

Figure 13A:
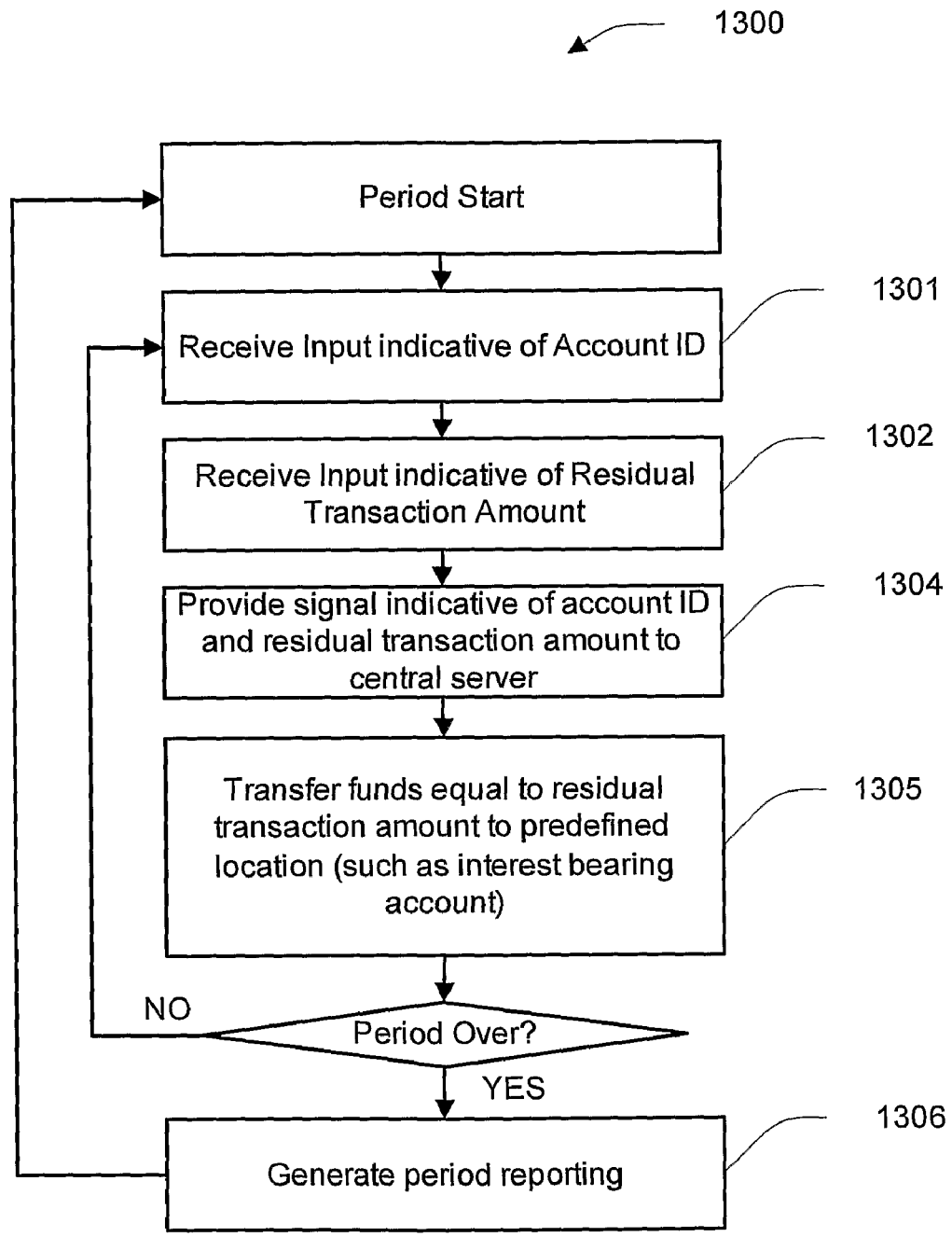
FIG. 13A illustrates a method according to one embodiment.

FIG. 13A illustrates an exemplary method 1300 performable by a retailer terminal 1206 (for example based on software instructions 1223 optionally in combination with software instructions 1213). Steps 1301 and 1302 respectively include receiving input data indicative of an account identifier and a residual transaction amount. It will be appreciated that these steps might be performed in any order, or substantially simultaneously.

In the present embodiment, a consumer is identifiable on the basis of an account identifier. This account identifier may be, for example, a numeric, alphanumeric, or alphabetic string that identifies a unique account in database 1215.

Three examples of how account identifiers are provided to consumers are considered below:

In some embodiments, one or more of the consumers are provided with a respective machine readable token or passcode which is indicative of an account identifier for the relevant consumer, or from which an account identifier for the relevant consumer is able to be derived. In some such embodiments, consumers undergo a registration procedure for the creation of their accounts. The term "machine readable" describes the likes of tokens including magnetic strips, printed/embossed material, RFID tags, barcodes, smartcard information, and so on. Machine readable tokens are read by appropriate hardware (for example, by "swiping" a card having a magnetic strip), and the machine readable information processed to derive an account identifier.

In some embodiments one or more of the consumers have respective pre-existing machine readable tokens or passcodes. For example, this token might be a pre-existing credit card, debit card, loyalty card, picture ID, driver's license, passport, healthcare card (such as "Medicare" in Australia), social security card or the like—substantially any machine readable token capable of uniquely identifying a particular consumer may be used. In some such embodiments, consumers undergo a registration procedure for the creation of their accounts. However, in other embodiments an account is inherently defined for a consumer upon the reading of a token or acceptance of a passcode that has previously not been presented in the context of system 1200.

In some embodiments, fingerprint scanners, iris or retina scanners, voice analysis software or similar technologies may be used to generate or verify account identifiers based on data indicative of unique physical characteristics of the consumer.

It will be appreciated that other approaches are implemented in other embodiments.

Although each account identifier identifies only a single account, in some embodiments multiple account identifiers identify a single account. For example, in some embodiments a single consumer account is identified upon the presentation of either a credit card, passcode, or other loyalty card attributable to a given consumer. For instance, a consumer presents a credit card for the purposes of providing an account identifier for one transaction, and the same consumer presents a loyalty card for the purposes of providing an account identifier for another transaction. Assume, for the sake of example, that each of these transactions results in a residual transaction amount. These amounts would be "managed" as described herein by reference to different account identifiers stemming from the credit card and loyalty card respectively. However, the consumer might wish for both of these amounts to go to a single consumer account, essentially requiring an account that has multiple account identifiers. In some cases this is implemented by initially creating multiple consumer accounts, and subsequently allowing a consumer to whom these accounts are commonly attributable to collate the accounts, for example by way of options provided in a web-based interface accessible via an account holder terminal 1207.

Although some embodiments described herein are perhaps concerned to some extent with situations where residual transaction management occurs across a potentially large number of venues, in some embodiments residual transaction is limited to a predetermined group of venues (for example a single chain, a group of subscribing participants, or venues in a common mall or geographical area) or even to a single venue. It will be appreciated that such issues generally hinge on commercial factors.

Step 1304 includes providing a signal indicative of the account identifier and residual transaction amount to the central server. In response, at least in some embodiments, the central server performs a step of crediting the identified consumer account by an amount including at least a portion of the residual transaction amount. In some embodiments this is the whole residual transaction amount. In some embodiments this is greater than the residual transaction amount, for example where a consumer is allocated a supplementary contribution amount (resulting, for example, from participation in distribution or collection marketing at the point of sale). In some embodiments this is less than the whole residual transaction amount, for example where an operator of system 1200 deducts a service fee or commission amount (which may assist in covering administration overheads).

The manner by which a consumer account is "credited" varies between embodiments. In some cases a credit level attributable to a given account is maintained solely in a relevant record in database 1215. However, in other embodiments this credit level is additionally or alternatively maintained on a machine readable/writable token carried by the consumer, such as a smartcard or rewritable RFID tag. For example, in one embodiment consumers' respective smartcards are the primary source of credit information, and back-end information in database 1215 is used primarily as a cross-check or back-up against fraud, data corruption, card loss and the like. In another embodiment the credit is solely stored on a smartcard or the like.

Step 1305 includes transferring, for example by electronic credit transfer, an amount in credit equal to the residual transaction amount to a predefined location, such as an interest bearing account with a financial institution. It should be appreciated that this step of transferring need not include performing a physical fund transfer process, and might simply involve providing a signal for initiating such a process.

Although the example of FIG. 13A deals with a situation where credit transfer occurs after each transaction, in other embodiments credit transfer occurs less frequently. For example, credit transfer occurs only at the end of a predefined period, as method 1310 of FIG. 13B, and step 1305 includes transferring an amount in credit equal to the sum of the residual transaction amounts for the period.

Figure 13B:
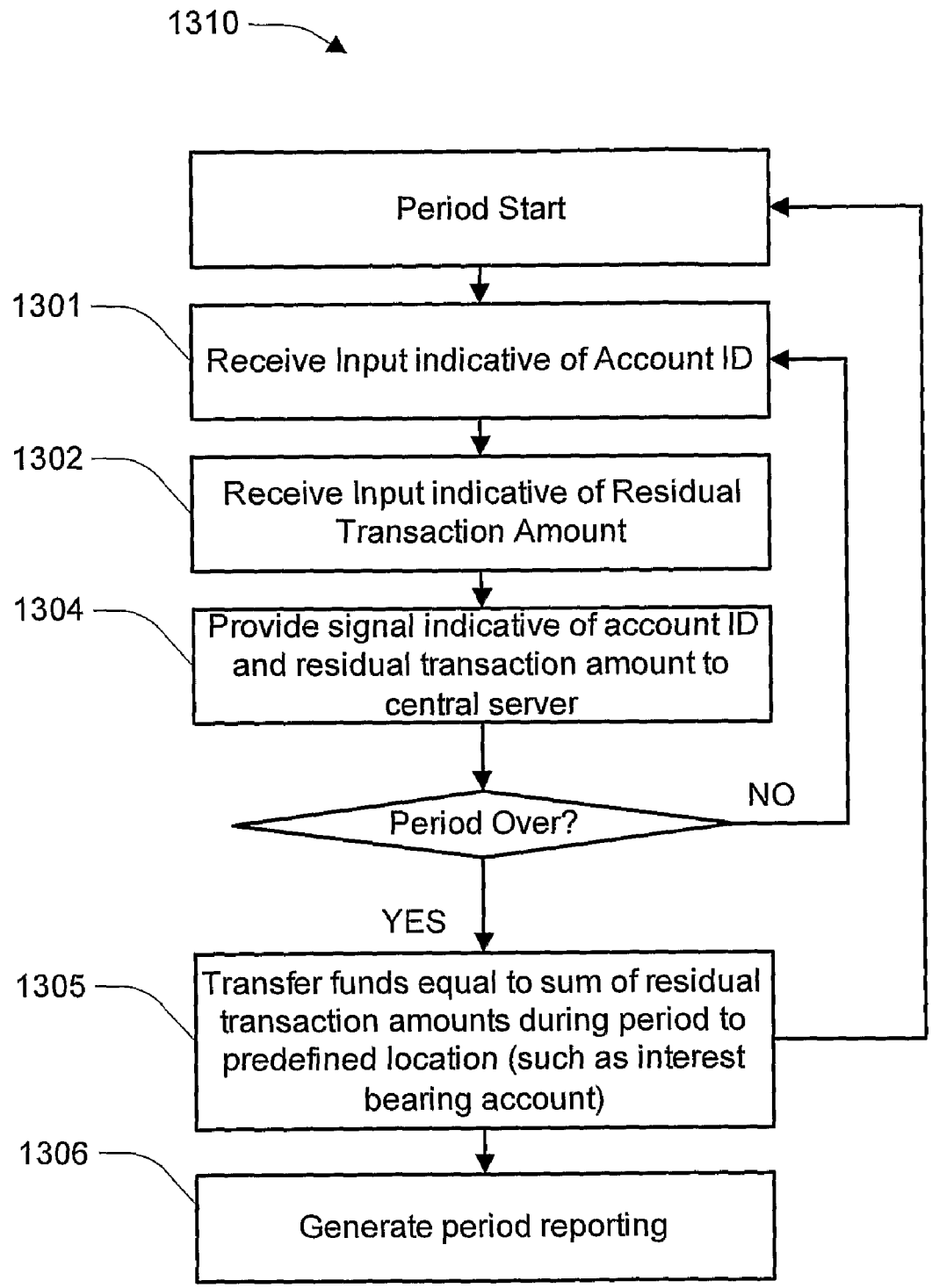
FIG. 13B illustrates a method according to one embodiment.

Both FIG. 13A and FIG. 13B deal with a situation where there is a predefined period, which is often defined as a single business day or 24-hour period, or optionally a longer or shorter period. A report is generated at the end of this period at step 1306 to allow reconciliation of monies that have been retained by a retailer as cash with credit that has been electronically transferred as residual transaction amounts. At a practical level, at the end of a given period, a retailer should have an amount in cash that exceeds the collective value of transaction settlement amounts for that period by the value of electronic credit transfers at step 1305 for that period (having accounted for any cash withdrawals from electronic credit transfers, for example by EFTPOS). It will be appreciated that such an approach facilitates a relatively straightforward reconciliation process.

Figure 13C:
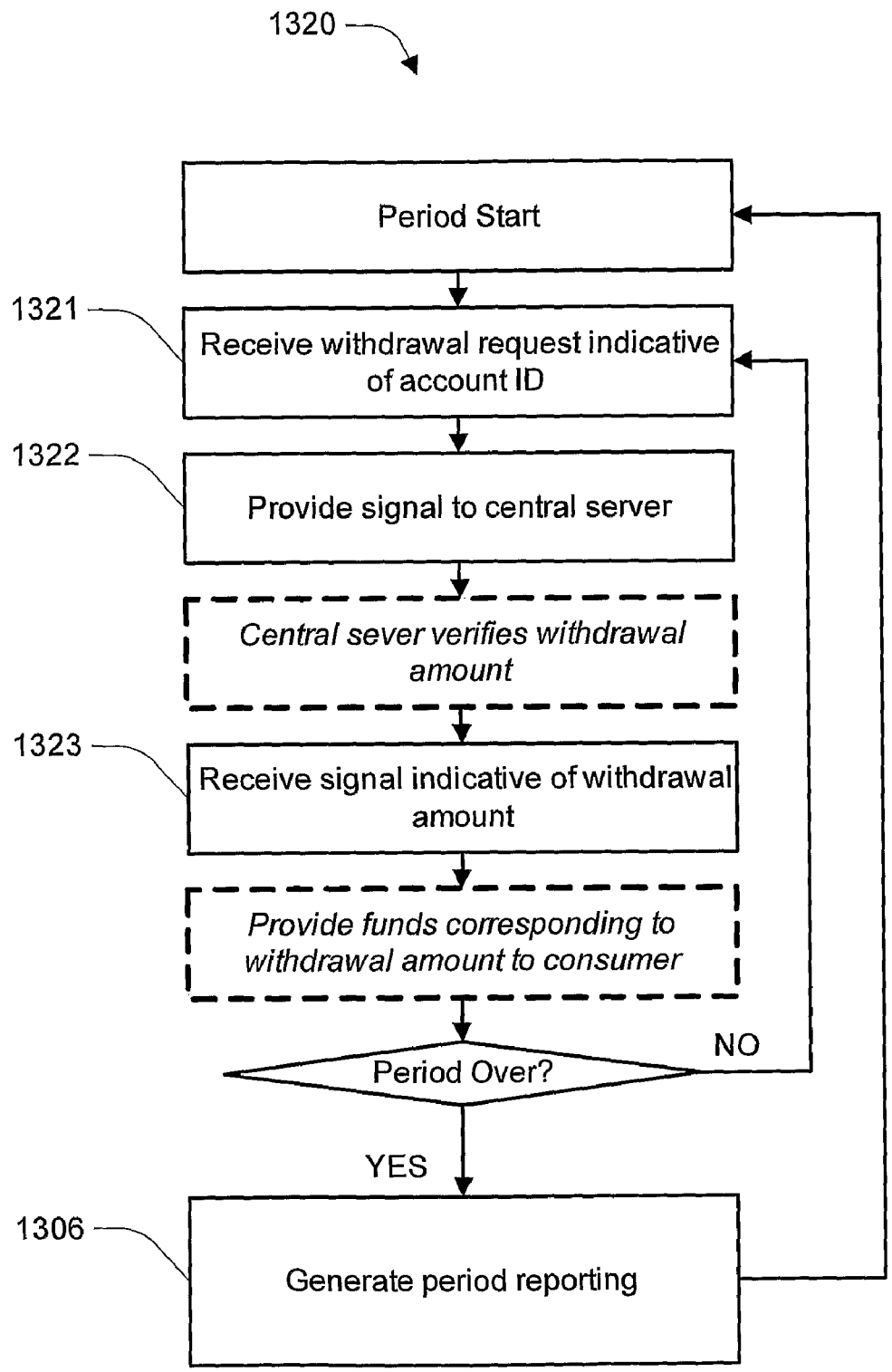
FIG. 13C illustrates a method according to one embodiment.

In some embodiments, retailer terminals are not only configured to allow the application of credits to consumer accounts, but also to allow consumers to make withdrawals from those accounts. An example of such a procedure is provided by method 1320 of FIG. 13C. Step 1321 includes receiving a withdrawal request indicative of an account identifier. A signal indicative of this account identifier is provided to the central server at 1322 such that a withdrawal amount can be verified. In some embodiments the withdrawal amount is equal to the total amount in credit available in the consumer account for that consumer, as indicated by database 1215. In other embodiments the consumer nominates a proposed withdrawal amount, and the verification process ensures that the nominated amount is less than or equal to the total amount in credit available in the consumer account for that consumer, as indicated by database 1215. Data indicative of the verified withdrawal amount is received at step 1323, and this amount is subsequently provided to the consumer as cash or as credit against goods and/or services (in some embodiments only one of these options is available). In some embodiments the amount is directly or indirectly applied to a gaming machine, for example to provide the relevant consumer with gaming credits at a poker machine/slot machine. As in the examples of FIG. 13A and FIG. 13B, method 1320 has a reporting period to allow for reconciliation. An electronic credit transfer is made by the central server to the relevant retailer either corresponding to each withdrawal request or corresponding to each period such that the retailer is reimbursed for withdrawal amounts paid to consumers.

In some embodiments, consumers are additionally permitted to make supplementary deposits, this being implemented in much the same manner as withdrawals, albeit with the direction of electronic credit transfers reversed. In some embodiments, a supplementary deposit may be applied at the time of a purchase transaction, to increase the amount credited to the consumer over and above the residual transaction amount. In some embodiments, a supplementary deposit may be made independently of any specific purchase transaction. In various embodiments, deposits can be made at retailers, via electronic kiosks and banking terminals, or over the Internet. In one embodiment, a consumer provides a collection of coins to an electronic kiosk, which counts the coins and credits the consumer's account accordingly.

Residual Transaction Amounts—Carriage of Gaming Activity

In some embodiments, system 1200 is configured to provide consumers with access to gaming. For example, in some cases this is internalized gaming whereby system 1200 wholly or partially provides a gaming activity, wherein the players include a subset or all of those consumers for whom a consumer account is defined in database 1215. In other cases, this is externalized gaming, whereby credit in consumer accounts is exchanged for gaming value in relation to a gaming activity provided wholly by an external party. That is, in the case of externalized gaming, system 1200 has no involvement beyond the allocation of entries, or in some cases beyond providing instructions for the allocation of entries.

At a very general level, a gaming activity occurs as follows: (i) players are allocated entries in a gaming activity in exchange for respective entry fees, (ii) one or more winning entries are identified on the basis of an event outcome, and (iii) prizes are distributed to the or each player to whom a winning entry or entries were allocated. In the case of internalized gaming, system 1200 is responsible for at least (i) and (iii), although the actual event outcome might be determined externally. For example, in some cases system 1200 leverages an existing lottery system, and yet provides "internalised gaming" in the sense that it is responsible for the distribution of prizes.

In one example of externalized gaming, system 1200 is responsible for providing instructions to a gaming service provider (such as a lottery agency) to allocate entries to certain consumers, and additionally responsible for providing entry fees corresponding to these instructions (i.e. credit is exchanged for gaming value). The lottery service provider is then responsible for determining winners and distributing prizes. In this sense, system 1200 queries the consumer account database to determine whether or not to exchange a portion of credit in a given consumer account for gaming value and, in the case that the portion of credit is to be exchanged for gaming value, provides a corresponding instruction to the lottery service provider.

For the purposes of discussion below, there is a general focus on internalized gaming. However, it should be appreciated at all times that other embodiments deal with externalized gaming.

In some embodiments these prizes are awarded by directly crediting the relevant consumer accounts, however in other embodiments the prizes are awarded without using consumer accounts, for example by mailing cheques or vouchers to the relevant consumers.

In the context of the present disclosure, it is assumed that a gaming activity is an activity where multiple players provide respective entry fees, in some of the present embodiments these entry fees being in whole or in part provided by way of residual transaction amounts. In exchange for the entry fees, the players are, subject to participation selections, respectively allocated one or more entries. The term "player" as used herein refers to a provider of an entry fee, typically being a consumer. The term should be construed broadly to include both human players, non-human players, constructs or syndicates defined by a group of two or more human and/or non human players (such as a collaboration between human players), and other legal entities (such as corporations or trusts). In some cases, the player is identified in a computing system by a unique identifier, which might include a purpose-defined identifier, identifier based on personal information, email address, cellular telephone number, or the like.

Figure 14A:
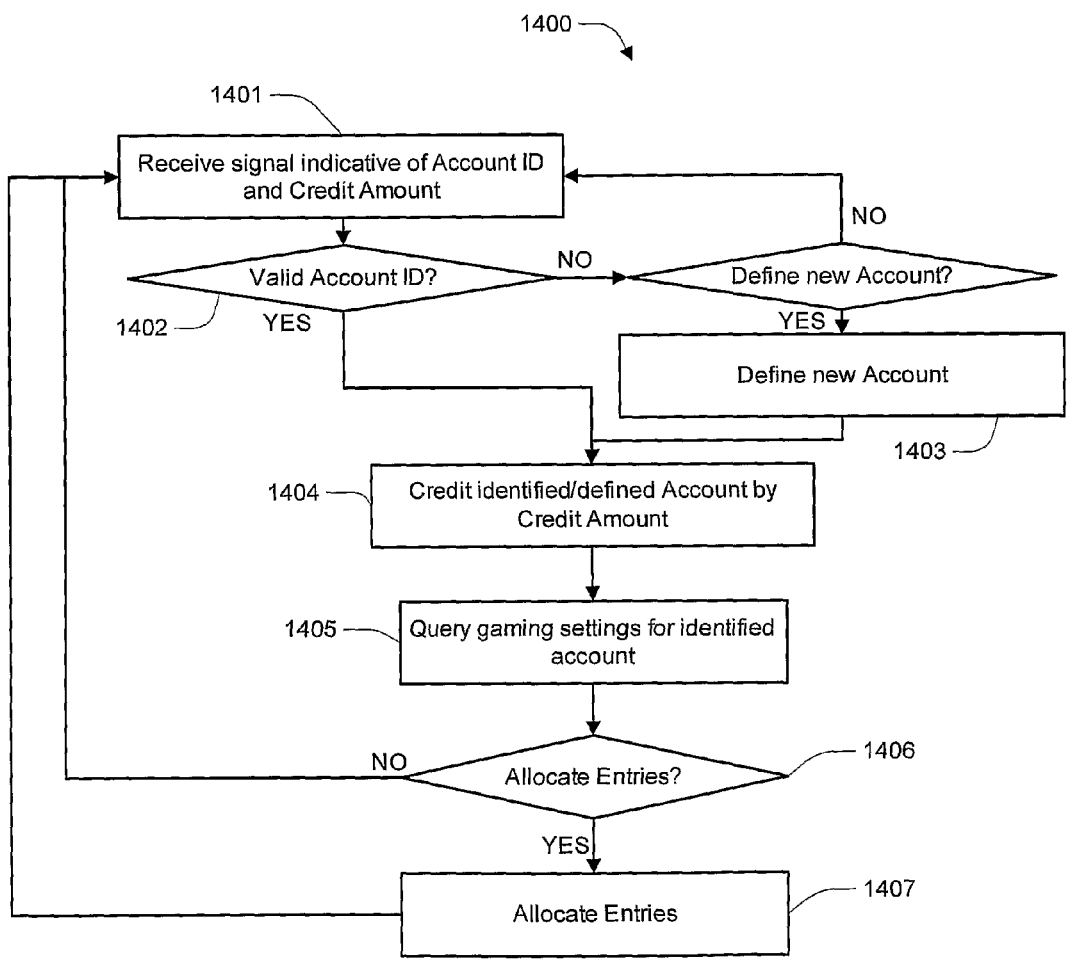
FIG. 14A illustrates a method according to one embodiment.

FIG. 14A illustrates a method 1400 performable at central server 1201 for allowing the allocation of entries to consumers. In some embodiments this method or a variation thereof is performed in whole or in part at the retailer terminal as an alternative, for example where that terminal has no active connection to the central server and operates in an offline mode.

Step 1401 includes receiving from a retailer terminal data indicative of an account identifier and a credit amount. The received account identifier is validated at step 1402 to determine whether it identifies a consumer account in database 1215, and to identify that account. In the event that such an account cannot be identified, a new account is optionally defined at step 1403, which may involve the acquisition of supplementary mandatory data. The identified or newly defined account is credited by the credit amount at step 1404.

Step 1405 includes querying gaming settings for the credited account. These gaming settings essentially determine whether and how entries are to be allocated to a particular consumer. Initially, default settings are implemented for each account, which might or might not provide for the allocation of entries. In some embodiments a consumer is able to modify the gaming settings for his/her account, for example by way of a web or other interface accessible by way of a retailer terminal or account holder terminal. In the case of the latter, in some embodiments consumers use substantially any Internet enabled device to access a website wherein, having provided their account identifier and optionally additional identification verification information, they are able to manage various settings and options for their accounts, including the gaming settings. Several examples of gaming settings are considered below:

No participation. No entries are allocated.

Full participation in traditional gaming. For each gaming activity, the credit available in each consumer account is exchanged for the maximum available number of traditional gaming entries. In some cases this involves syndication, as discussed further below.

Partial participation in traditional gaming. In this case, it might be that for each gaming activity, a proportion of the credit available in each consumer account is exchanged for traditional gaming entries. Again, this might involve syndication.

Full participation in risk free gaming. Risk free gaming essentially involves refundable entry fees and is discussed in more detail below.

Partial participation in risk free gaming.

Participation in partial-risk gaming. Partial-risk gaming is essentially a hybrid of risk free and traditional gaming, and is also discussed in more detail below.

Decision 1406 includes determining whether or not to allocate entries on the basis of the credit amount and gaming settings. Subject to this decision, entries are allocated at step 1407.

Figure 14B:
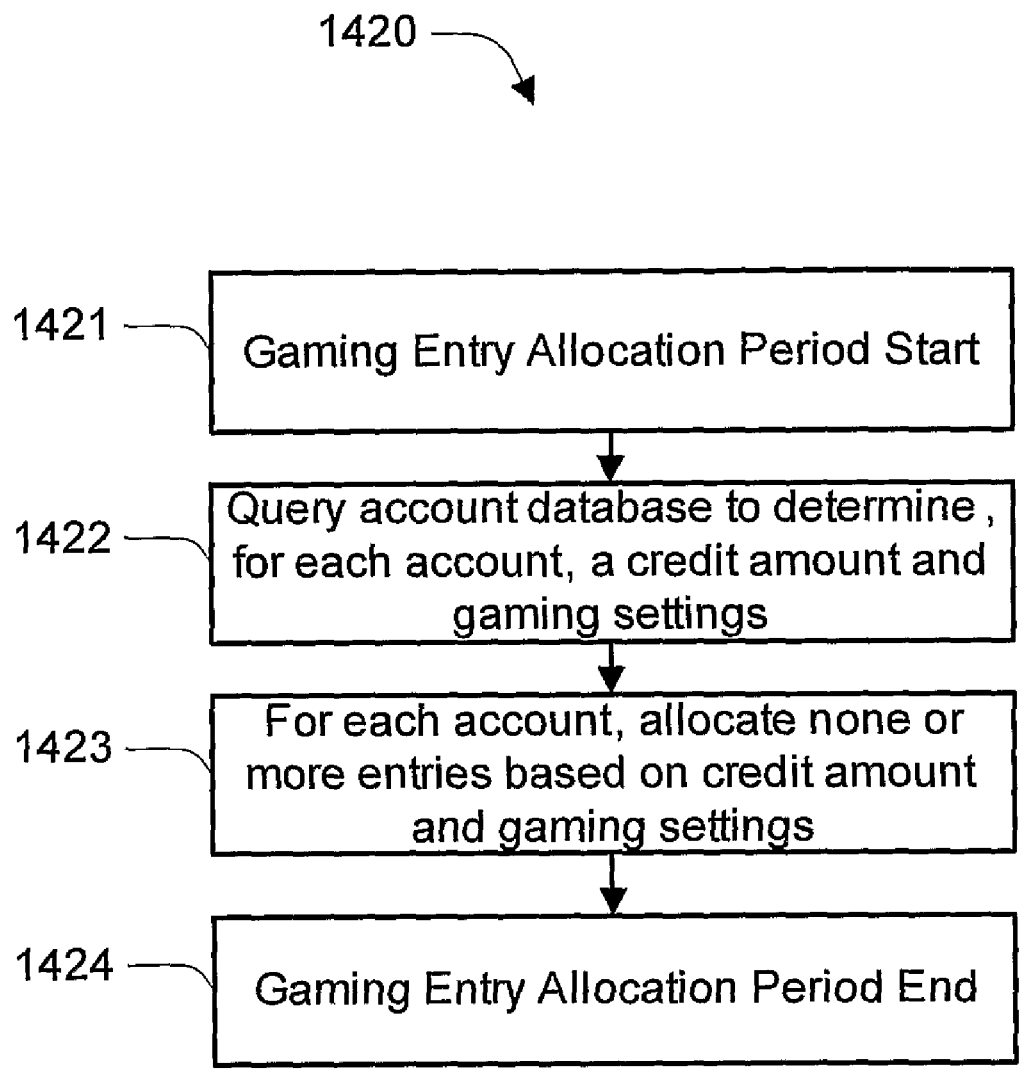
FIG. 14B illustrates a method according to one embodiment.

Whilst the example of FIG. 14A deals with a situation where entries are allocated at the time of crediting a particular account, in other embodiments entries are allocated periodically subject to a gaming period, as shown by method 1420 of FIG. 14B. In this method, a gaming entry allocation period starts at step 1421. In overview, all entries for a particular instance of a gaming activity (defined, for example, by a single prize determination event) are allocated during this period. This includes, at step 1422, querying an account database to determine, for each account, the level of credit in that account and gaming settings in place for that account. Step 1423 includes for each account, allocating none or more entries based on the applicable level of credit and gaming settings. The gaming entry allocation period ends at 1424.

The process of allocation generally includes allocating none or more entry identifiers to the consumers, for example by updating the relevant consumer accounts to include such entry identifiers. In some cases there is also a physically manifested allocation whereby the consumer is provided with a receipt describing the entries.

Figure 15A:
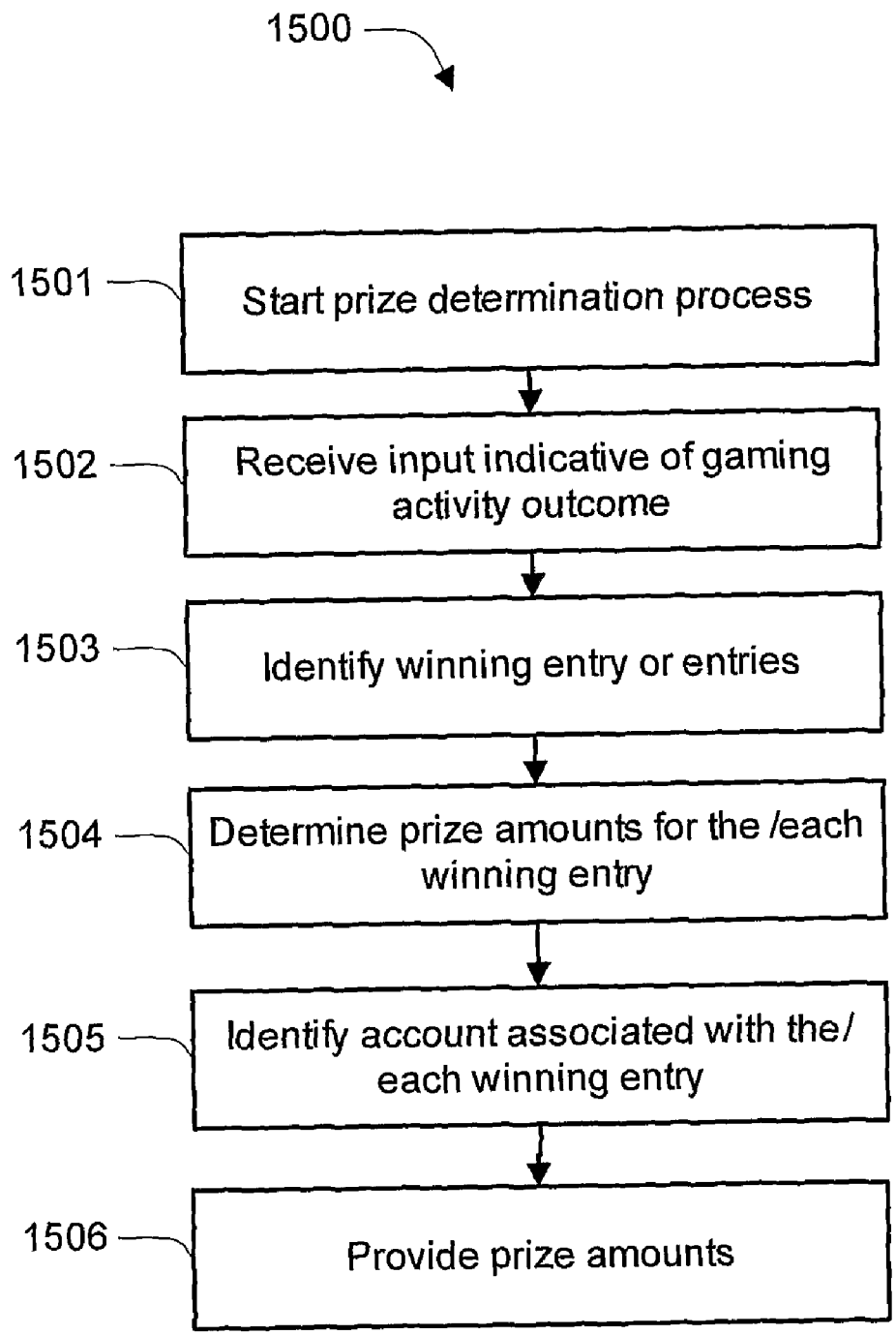
FIG. 15A illustrates a method according to one embodiment.

FIG. 15A illustrates an exemplary method 1500 for awarding prizes. A prize determination process commences at step 1501. Step 1502 includes receiving input indicative of the outcome of a gaming activity, for example from a coupled system or related software application that is responsible for identifying winning entries or outcomes. This allows a winning entry or winning entries to be identified at step 1503. Step 1504 includes determining a prize amount for the/each winning entry. Step 1505 includes identifying a consumer account associated with the/each winning entry, for example by querying database 1215. Step 1506 includes providing the appropriate prize amounts to the relevant consumers. This, in some cases, includes crediting those consumers' accounts by the appropriate prize amounts. However, in other cases the prizes are provided by other means, such as by mailing cheques/other vouchers, or by providing cash or a voucher (which might be redeemable for specified goods/services only) to the consumer at a retail venue the next time that consumer's account identifier is received. In some cases prizes are monetary in nature, whilst in other cases they include goods and/or services.

Figure 15B:
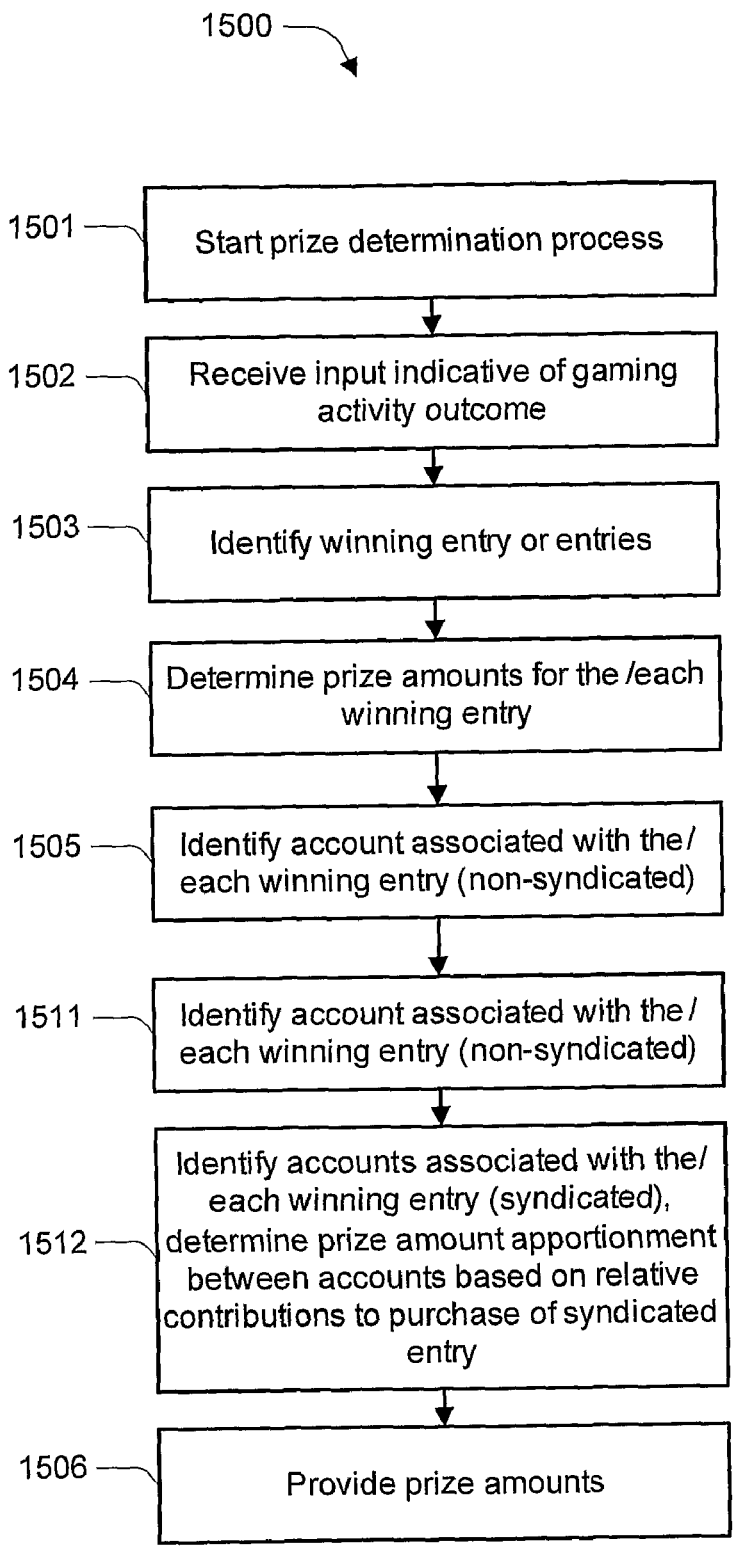
FIG. 15B illustrates a method according to one embodiment.

FIG. 15B illustrates another exemplary method 1510 for awarding prizes, this including additional steps 1511 and 1512 relating to syndicated entries. Syndication is discussed in more detail below.

The regularity of prize determination varies between embodiments, with the possibility of daily, weekly, monthly or other periodic draws. In some cases there are multiple tiers of draw (such as major and minor) which operate on respective determination schedules.

In the context of the present disclosure, there is discussion of players being "allocated" entries and disclosure of players being "provided" entries. The terms "allocated" and "provided" are regarded as synonymous in this regard. Furthermore, neither of these terms should imply a requirement that a player actually physically receives any entries (although, equally, they may do so), only that the entries are notionally allocated to that player.

Although players are considered to provide respective entry fees, it will be appreciated that in some instances a single player provides multiple entry fees on multiple occasions.

Residual Transaction Amounts—Syndication

In some cases there is a minimum spend level in a gaming activity. For example, there is a minimum level of financial consideration in exchange for which one or more entries are able to be obtained. Often, this minimum spend level is determined such that it is equal to the smallest unit of currency for a jurisdiction (i.e., $0.01 in the case of the United States and Australia, such that "X" entries are available for a price of $0.01, wherein $X \geq 1$, but no entries are available for a price of less than $0.01). However, in some embodiments that is not the case. For example, in one embodiment a minimum spend level is set by a third party gaming operator that conducts gaming independently of a system such as system 1100 or system 1200, that minimum spend level being greater than the smallest unit of currency for the relevant jurisdiction.

In some embodiments where the minimum spend level is greater than the smallest unit of currency for a jurisdiction, a syndication process is used such that consumers having amounts of less than the minimum spend level can nevertheless compete in a gaming activity. In overview, credits available in consumer accounts for a plurality of consumers are syndicated together to provide an entry fee of value at least equal to the minimum spend level (or, in some cases, an integral multiple of the minimum spend level), and one or more entries are allocated on the basis of that entry fee. Conceptually, these entries are partially owned by each of the plurality of syndicated consumers. In this way, the loose change of a given consumer is effectively applied to partially fund one or more entries in a gaming activity.

In implementing syndication, it is initially necessary to form syndicates. The manner by which syndicate formation is administered varies between embodiments. Several examples are discussed below:

Upon receipt of a residual transaction amount for a given consumer, data indicative of the consumer and amount is added to a syndicate formation list. Once the sum of the amounts in this list reaches the minimum spend level, an entry fee equal to the minimum spend level, and the available number of entries (often a single entry) is obtained in exchange for that entry fee.

In some cases along the lines of that above, entry fees must be integral multiples of the minimum spend level, and the final amount added to the syndicate formation list brings the total to an amount greater than an integral multiple of the minimum spend level (for example where entries are $1 each). An amount corresponding to the total less the next lowest integral multiple is "rolled-over" into a subsequent syndicate formation list such that the consumer responsible for the final amount is added to two syndicates. For example, assume that the minimum spend level is $1.00, and a total of $0.90 has been added to a syndicate formation list. A further amount of $0.15 is added pursuant to another consumer's residual transaction amount. That consumer contributes $0.10 to the syndicate under formation, and $0.05 to the next syndicate that is formed.

In an example along the lines of FIG. 14B, syndicates are formed at the commencement of a gaming entry allocation period. For example, all of the available amounts in consumer accounts are processed in accordance with a predefined algorithm to determine the manner by which syndicates should be formed. In some cases this includes the generation of syndicate formation lists, as discussed above. In another example, each consumer's credit is split into $0.01 portions, and these portions syndicated randomly or otherwise across the whole pool of consumers.

It will be appreciated that these examples are provided for the sake of explanation only, and should not be regarded as limiting in any way. Those skilled in the art will recognise numerous equivalent and alternative approaches.

Generally speaking, in the case that a syndicated entry wins a prize, that prize is shared among those consumers that contributed to the relevant entry fee, the sharing preferably being in accordance with the consumers' relative contributions. For example, assume that the minimum spend level is $1.00, and a single entry is allocated in exchange for $1.00. Further assume that, for a given syndicated entry, Consumer A contributes $0.10, Consumer B contributes $0.75, and Consumer C contributes the remaining $0.15. The relative contributions for these consumers are respectively 10%, 75% and 15%. Should that entry win a prize, the prize is shared among the consumers in accordance with those percentages.

In some cases syndication is provided as an option only. For example, in some embodiments:

Syndication might be offered as an alternative to value-level participation. In the case of value-level participation, entries are obtained for a consumer upon that consumer's account reaching a pre-specified level of credit (which might be the minimum spend level). For example, each time the account of a particular consumer reaches $X, that $X is exchanged as an entry fee in a pre-identified gaming activity, such as a risk-profile affected gaming activity or a syndicated gaming activity.

Syndication might be offered to provide consumers access to potentially more lucrative gaming activities.

It will be appreciated that syndication allows small amounts of credit to be applied in a useful manner, which might not have otherwise been possible. Given the present context, being management of typically small amounts of credit, this is a particularly advantageous result.

Risk free Gaining in Residual Transaction Management

It will be appreciated from the foregoing description that the term "risk free gaming" essentially describes a form of gaming whereby entry fees are placed subject to a "no-risk" risk profile—that is, 100% of the entry fee is refundable. In some embodiments, consumer accounts are implemented on the basis of a default position of full participation in risk free gaming. In some such embodiments there are no other options (i.e. all consumers have full participation in risk free gaming).

It is presently considered that risk free gaming is particularly advantageous in the context of a system for managing residual transaction amounts. In particular, it is thought that consumer willingness to make use of a residual transaction amount management system will be enhanced on the basis of the credit diverted being later redeemable substantially in full. That is, there is no substantial cost to the consumer in using the system (other than perhaps a commission, service fee, or other administration charge). In some embodiments, it could be considered that there is also an "opportunity cost" to the consumer on the basis of the time-value of the residual transaction amounts under management. In the context of the present invention, however, most consumers would regard this cost as negligible. Moreover, in some embodiments, actual or notional interest could be applied to the consumer accounts. In cases where there is no substantial cost incurred, the consumer's decision to participate is relatively uncomplicated. Such a decision becomes more difficult in the case that the consumer may have to place credit at risk for the purpose of gaming. However, in the case of risk free gaming, this complication is averted. Indeed, the net result is essentially a system for managing residual transaction amounts for the primary purpose of accumulation without the hitherto attendant inconveniences, while providing, as a further benefit, a chance to win prizes. Given that a residual transaction management system is, at a practical level, typically implemented by a supplier for the purpose of consumer enticement and to provide a competitive advantage over other suppliers who do not implement such a system, the application of risk free gaming is particularity advantageous.

Funding of Prizes for Risk Free Gaming Activities

The manner by which prizes are funded for risk free gaming activities varies between embodiments. In the case of traditional gaming activities, funding is a relatively straightforward affair, with the prizes being predominately funded by entry fees (i.e. residual transaction amounts). However, funding is less straightforward in the cases of no risk and partial risk gaming. In some such cases, prizes are funded in whole or in part by "supplementary contributions". The supplementary contribution amount provided by or on behalf of a given player in some embodiments includes components having values corresponding to any one or more of

- A net investment return derived by subjecting individual or cumulative residual transaction amounts to an investment procedure for a period of time (such as from the time a residual transaction amount is received to the time primary prizes are allocated). The investment procedure derives a gross investment return, and of this a net investment return preferably defines a component of a player's supplementary contribution amount. Such investment returns may be actual or notional.
- A net distribution marketing amount. For example, a third party provides a gaming operator with a gross distribution marketing amount (such as currency or goods/services) in consideration for marketing information being provided to a player. Of this gross distribution marketing amount, a net distribution marketing amount preferably provides a component of the player's supplementary contribution amount. In some cases, a player receives a ticket (physical or electronic) as a receipt for placing a residual transaction amount, and this ticket carries the relevant marketing information, which could, for example, be as straightforward as the visual display of a corporate logo for promotional purposes. In some cases a player is able to increase his/her net distribution marketing amount by receiving further marketing material—for example by viewing electronic advertisements.
- A net collection marketing amount. This is similar to the example considered above, however in this case is derived by collecting information from players, such as personal information or opinion information. For example, in some cases a player is able to increase his/her net collection marketing amount by participating in a market research survey, or providing some personal contact information.

Other net operator or third party contribution amounts.

This is by no means an exclusive list, and alternative embodiments make use of a wider range of possible methodologies and amounts. In overview, supplementary contribution amounts are combined into a prize pool for funding prizes in relation to the gaming activity. The relative magnitudes of these amounts as between players preferably affect some characteristic of the gaming activity, the entries for the gaming activity submitted on behalf of respective players, or the manner in which the respective players otherwise participate in the gaming activity.

There is discussion in the above examples of "gross" amounts and "net" amounts. The terms "gross" and "net" are used in a general descriptive sense only. In particular, the term "gross" refers to an amount derived by the gaming operator, and the term "net" refers to an amount that is added as the supplementary contribution amount. In some cases the net amount is the corresponding gross amount less any applicable taxes, levies, duties, commissions or operator charges. In some cases, the gross and net amounts are the same. In other cases there is no direct nexus between the gross and net amounts.

In some cases consumers are able to increase their respective likelihoods of winning a prize by taking active steps to increase their respective supplementary contributions. In some cases this supplementary contribution simply results in additional entries being allocated (i.e. no credit to consumer account), however in other embodiments consumers receive a direct financial reward for making a supplementary contribution (i.e. a credit to the consumer account). For example, in one embodiment, a player who agrees to respond to a survey question at the point of sale receives an additional credit amount in conjunction with the residual transaction amount, this additional credit amount being considered for the allocation of entries and, assuming it is not placed at risk subject to entry settings, can be redeemed via a withdrawal request.

In some embodiments, particularly embodiments involving risk free gaming, prizes are funded out of an investment return derived from temporarily holding the collective loose change of a plurality of consumers. That is, the loose change of these consumers is maintained in one or more interest bearing accounts (or otherwise invested) to generate an investment return, and a portion of this return is distributed as one or more prizes.

Relationship Between Contribution and Allocation/Purchase of Entries

In some of embodiments, the number of entries allocated to a given consumer takes into account the contribution made by that consumer either towards a prize pool or towards the funding of entry purchases. For example, in some embodiments a consumer who makes a greater contribution to a prize pool is allocated a correspondingly greater share in entries. In some embodiments a consumer who makes a greater contribution to the purchase of entries from a separate gaming system is allocated a correspondingly greater share in entries.

In some embodiments, a consumer is able to obtain, or at least provide funding in relation to, one or more entries (or a portion of one or more entries) without placing and entry fee at risk, and instead by allowing funds to be invested, or by participating in marketing activities. Such approaches allow a consumer so as to derive a supplementary contribution amount, and therefore make a non-zero contribution even though no funds are placed at risk (in fact, these funds in essence remain available to the consumer as transactable flexible credit, or as reward point or the like which correspond to transactable flexible credit). In a practical example, consumers are, in this way, essentially able to be provided "free" entries in exchange for viewing advertisements or participating in market research activities. The number of entries allocated to a given consumer is, as in various other examples presently considered, preferably related to the supplementary contribution amount for that consumer.

Prize Pool Generation by Investment of Entry Fees

As foreshadowed, in some embodiments the supplementary income is practically or notionally funded by subjecting some or all of the entry fees collected from consumers (or held directly or notionally on behalf of consumers in relation to transactable flexible credit) to an investment procedure for a period of time, the supplementary income including some or all of the investment return derived from that investment procedure or an amount corresponding to the value of some or all of that investment return.

Any references herein to "investment return" or "investment income" are to be interpreted as references to "net investment return" and "net investment income" unless specifically stated otherwise. In practice, the investment procedure results in the derivation of a gross investment return, and various deductions (such as taxes, levies, duties, commissions, investment charges, broker fees, operator charges, and so on) are taken from this gross investment return. The term "net investment return" defines a remainder of the gross investment return, this net investment return being added to the prize pool as some or all of the supplementary income.

The terms "taxes" and "duties" as used herein are intended to encompass any relevant Federal, State and/or local government taxes, duties or imposts as well as levies or charges applied by intermediaries or other third parties connected with the gaming activity, that are essentially non-discretionary in so far as the gaming operators or consumers are concerned.

The terms "invest", "investing", "investment" and the like as used herein are intended to be afforded a broad interpretation covering the utilisation or disposition of funds or valuable assets in a general sense. Examples include but are not limited to, investment in any financial or real asset or property of any type, whether securitised or otherwise, with value denominated in any currency or combination of currencies, whether listed on a public trading exchange or unlisted on any such exchange, including the following, as well as warrants, options, derivatives, deferred purchase contracts, installment receipts and the like over any of the following:

Deposits with third parties whether interest-bearing or otherwise and whether held with a financial institution or some other party.

Mortgages, debt instruments or securities of any type.

Any form of American Depository Receipts or similar instruments or asset classes as may be available from time to time in any jurisdiction.

Promissory notes, bills of exchange, convertible notes, loan notes or any other form of debt or debt instrument.

Convertible or other bonds.

Preference shares, redeemable preference shares, stocks, equities or shares of any class whether fully or partly paid up.

Warrants, options, derivatives, deferred purchase contracts, instalment receipts and the like.

Options, warrants or similar instruments convertible into stocks, shares or equities of any sort.

Warrants, options, derivatives, deferred purchase contracts, instalment receipts or the like over any index relating to any matter including but not limited to stocks, shares or equities of any sort or futures or any financial instrument or financial asset.

Currency or interest rate swap agreements, forward interest rate agreements and the like.

Real property or property of any other kind including intellectual property.

Any contract, arrangement or instrument of any type which confers a benefit of value in relation to an item or items of value.

Futures contracts and the like in relation to any thing, item or matter.

Currencies.

Precious metals.

Works of art and any other valuables such as stamps, coins or jewels; and

Any other form of investment offering at least the potential for return on capital over a period of time, whether or not the capital is guaranteed, and whether or not a return on capital is guaranteed.

Offshore investment.

Trade in bullion or the like.

Alternatives forms of disposition of valuable assets, for example buy-back contracts and other instruments used in certain jurisdictions in light of Sharia law, or in accord with any other religious or other customs or beliefs.

Additionally, the terms "invest", "investing", "investment" and the like, as used herein, should be construed as including, but not limited to, the use of one or more money management techniques to increase an available amount of funds and investing the resultant increased available amount of funds. It should also be appreciated that the "investment return" need not be cash-based or even financial in nature, provided merely that it has some intrinsic, virtual, deemed or perceived value in the broad context of the gaming activity.

Further, it should be appreciated that for the purposes of the present invention, any investment procedure (or other methodology for generating supplementary contributions for or on behalf of consumers) may be entirely invisible from the consumers' perspectives, being managed as a "back office" operation by or on behalf of the gaming operator. Indeed, in many embodiments, this is the preferred approach, so as to shield the consumers from the detail of potentially complex investment and risk management strategies, which might otherwise detract from the experience and enjoyment of the primary gaming activity itself. This is an important distinction with respect to some forms of investment product, in which an understanding of transparent the underlying investment mechanics is primary, and any associated gaming activity is of secondary significance.

Figure 16A:
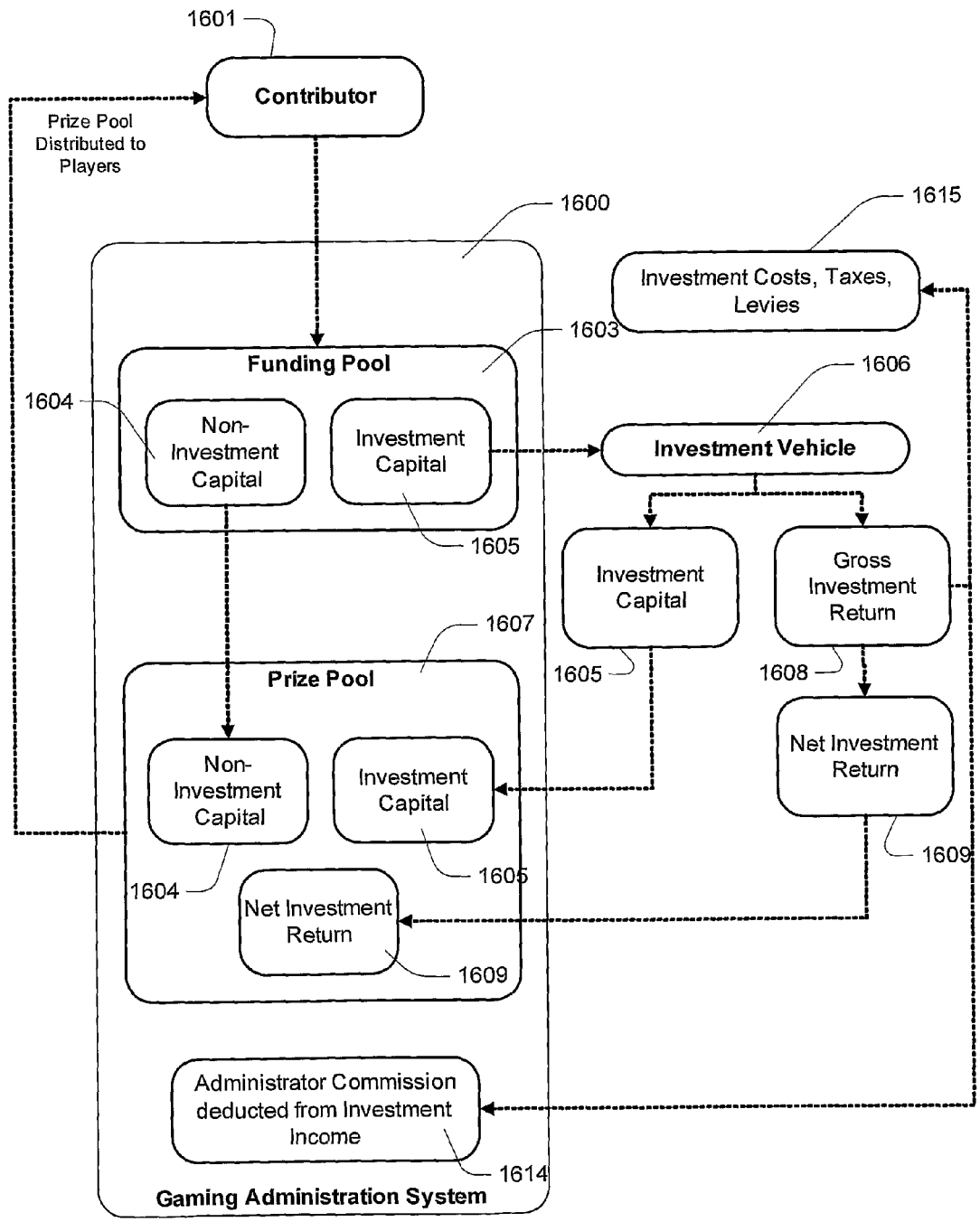
FIG. 16A illustrates an arrangement for the derivation of supplementary income by way of an investment procedure according to one embodiment.

FIG. 16A schematically illustrates an exemplary gaming administration system 1600 according to one embodiment where the prize pool is supplemented by investment income. A contributor 1601 provides funds to system 1600. For example, these funds may be provided by consumers, or held on behalf of consumers, in accordance with a flexible credit arrangement as discussed further above.

The funds are combined into a funding pool 1603. This funding pool includes non-investment capital 1604 and investment capital 1605, although in some embodiments the former has a zero value. Investment capital 1605 is provided to an investment vehicle 1606, optionally by way of electronic funds transfer. In some embodiments the entry fees, or parts thereof, are transferred substantially directly to this vehicle. Non-investment capital 1604 is added to a prize pool 1607.

At the end of a predetermined investment period, investment capital 1605 is added to prize pool 1607. A gross investment return 1608 is received, and from this an administrator commission 1614 is deducted, along with other deductions 1615 (such as taxes, levies, duties, investment costs, and so on), thereby to define a net investment return 1609. Net investment return 1609 is added to prize pool 1607, that prize pool being at an appropriate time distributed among players, including contributor 1601. The contributor distributes prizes among consumers who participate in a flexible credit arrangement.

Figure 16B:
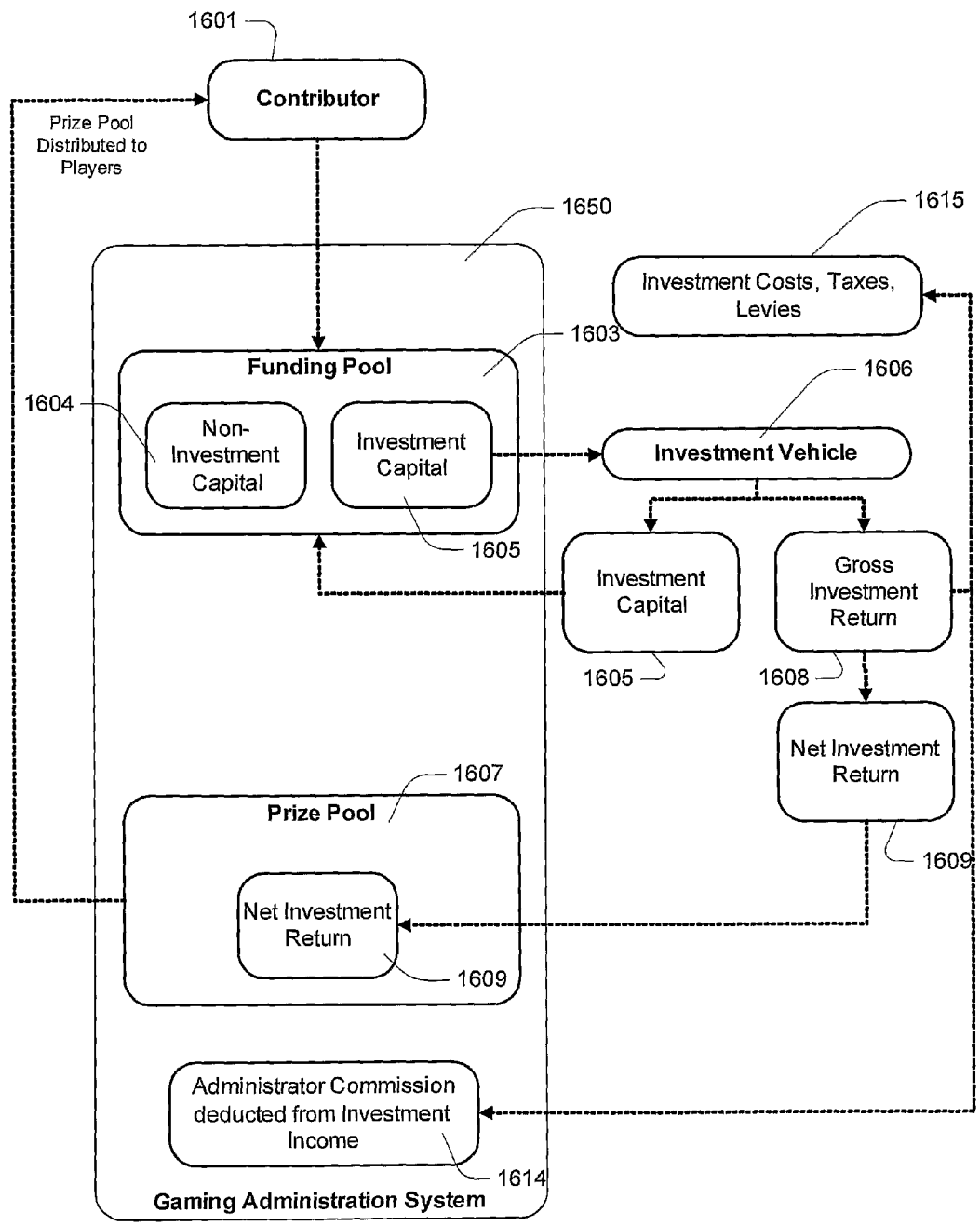
FIG. 16B illustrates an arrangement for the derivation of supplementary income by way of an investment procedure according to one embodiment.

In the example of FIG. 16A, prizes are funded out of the funding pool as well as investment income. However, in some circumstances, all of the funding pool is intended to be returned to the contributor in due course (as consumers' flexible credit is not placed at risk). FIG. 16B schematically illustrates an exemplary gaming administration system 1650 according to one embodiment where the prize pool is defined by investment income.

A contributor 1601 provides funds to system 1650. For example, these funds may be provided by consumers, or held on behalf of consumers, in accordance with a flexible credit arrangement as discussed further above.

The funds are combined into a funding pool 1603. This funding pool includes non-investment capital 1604 and investment capital 1605, although in some embodiments the former has a zero value. Investment capital 1605 is provided to an investment vehicle 1606, optionally by way of electronic funds transfer. In some embodiments the entry fees, or parts thereof, are transferred substantially directly to this vehicle. Non-investment capital 1604 remains in pool 1603.

At the end of a predetermined investment period, investment capital 1605 is returned to pool 1603, and pool 1603 is able to be refunded in whole or in part to contributors in accordance with their instructions. A gross investment return 1608 is received, and from this an administrator commission 1614 is deducted, along with other deductions 1615 (such as taxes, levies, duties, investment costs, and so on), thereby to define a net investment return 1609. Net investment return 1609 is added to prize pool 1607, that prize pool being at an appropriate time distributed among players, including contributor 1601. The contributor distributes prizes among consumers who participate in a flexible credit arrangement.

Hardware/Software Implementation

It will be appreciated that various embodiments of the present invention are technically implemented using various combinations of hardware and software. Some of these are considered below.

Figure 17A:
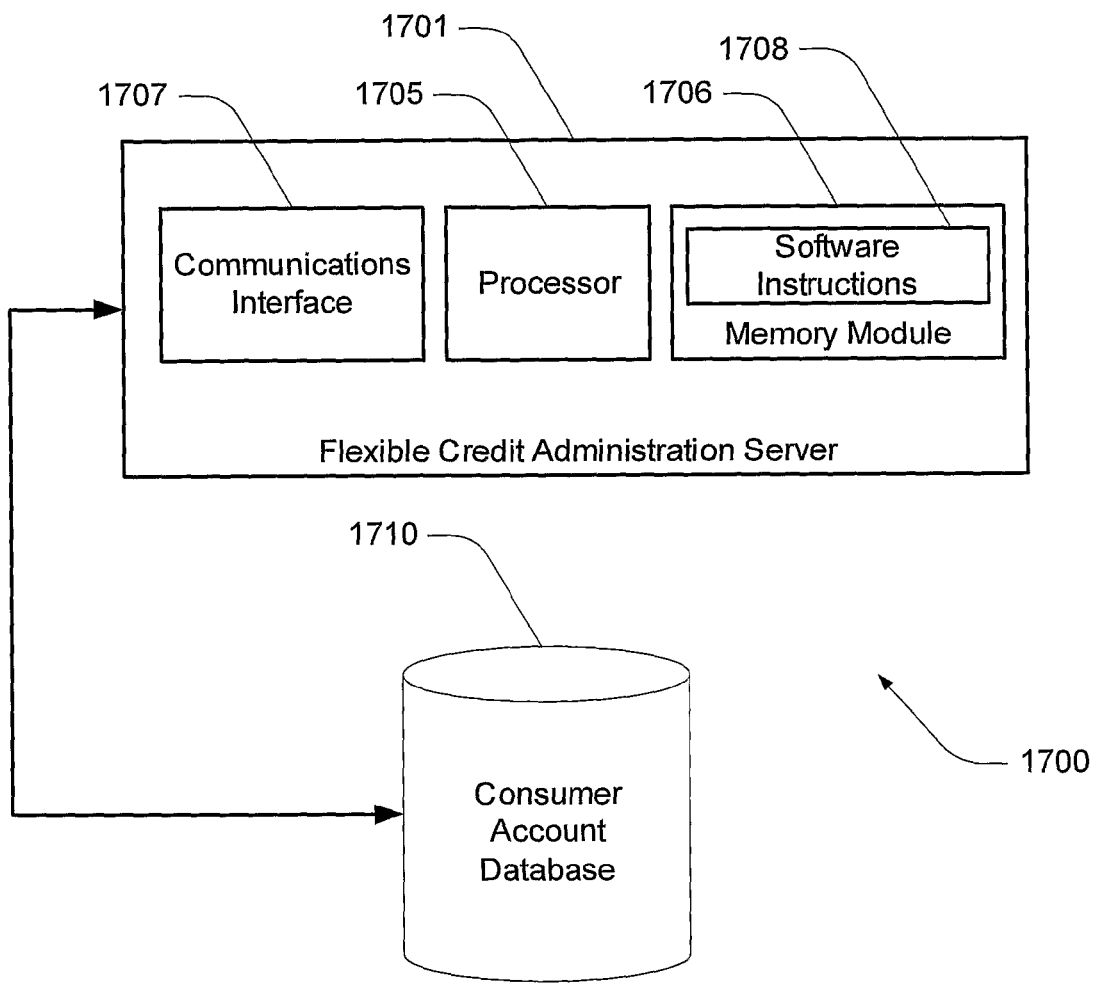
FIG. 17A illustrates an exemplary hardware arrangement according to one embodiment.

FIG. 17A illustrates a system for managing flexible credit, in the form of system 1700. System 1700 includes a flexible credit administration server 1701. This gaming administration server includes a processor 1705 coupled to a memory module 1706 and a communications interface 1707.

Memory module 1706 is configured for maintaining software instructions 1708 which, when executed on processor 1705, allow server 1701 to perform various methods, including but not limited to one or more of the methods described herein.

The term "communications interface" or "interface" should be read broadly to include any component or group of components including one or more of a network interface (such as an Ethernet interface, or other wired/wireless network interface), modem, other interfaces configured to allow communication between server 1701 and another processing platform, ports (such as serial or parallel ports) for receiving data from or providing data to input/output devices such as keyboards, scanners and printers.

As illustrated, server 1701 is coupled to a consumer account database 1710. Although, in the context of the present illustrations, this database is shown as being a single discrete component, in alternate embodiments it is defined by a plurality of distributed components, optionally including memory modules of one or more servers such as server 1701.

Figure 17B:
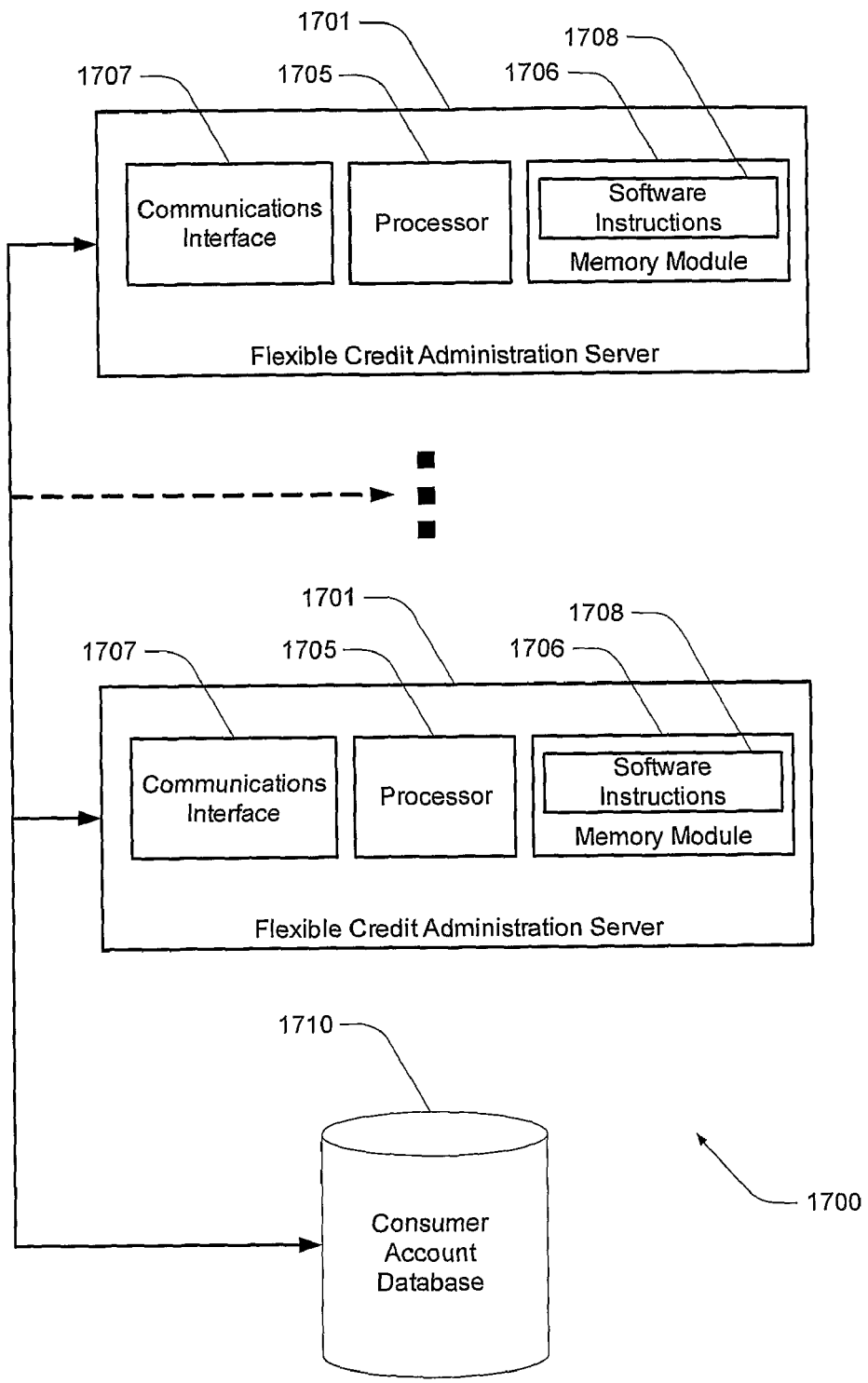
FIG. 17B illustrates an exemplary hardware arrangement according to one embodiment.

In some embodiments, such as that of FIG. 17B, a plurality of like or similar servers 1701 are coupled to a common database 1710. For example, servers 1701 are provided at distributed locations, with a database 1710 provided at a centralised location.

Database 1710 maintains data indicative of transactions and account statuses, which includes, in various embodiments, data indicative of the level of flexible credit held by consumers, and the allocation of entries between consumers.

Figure 17C:
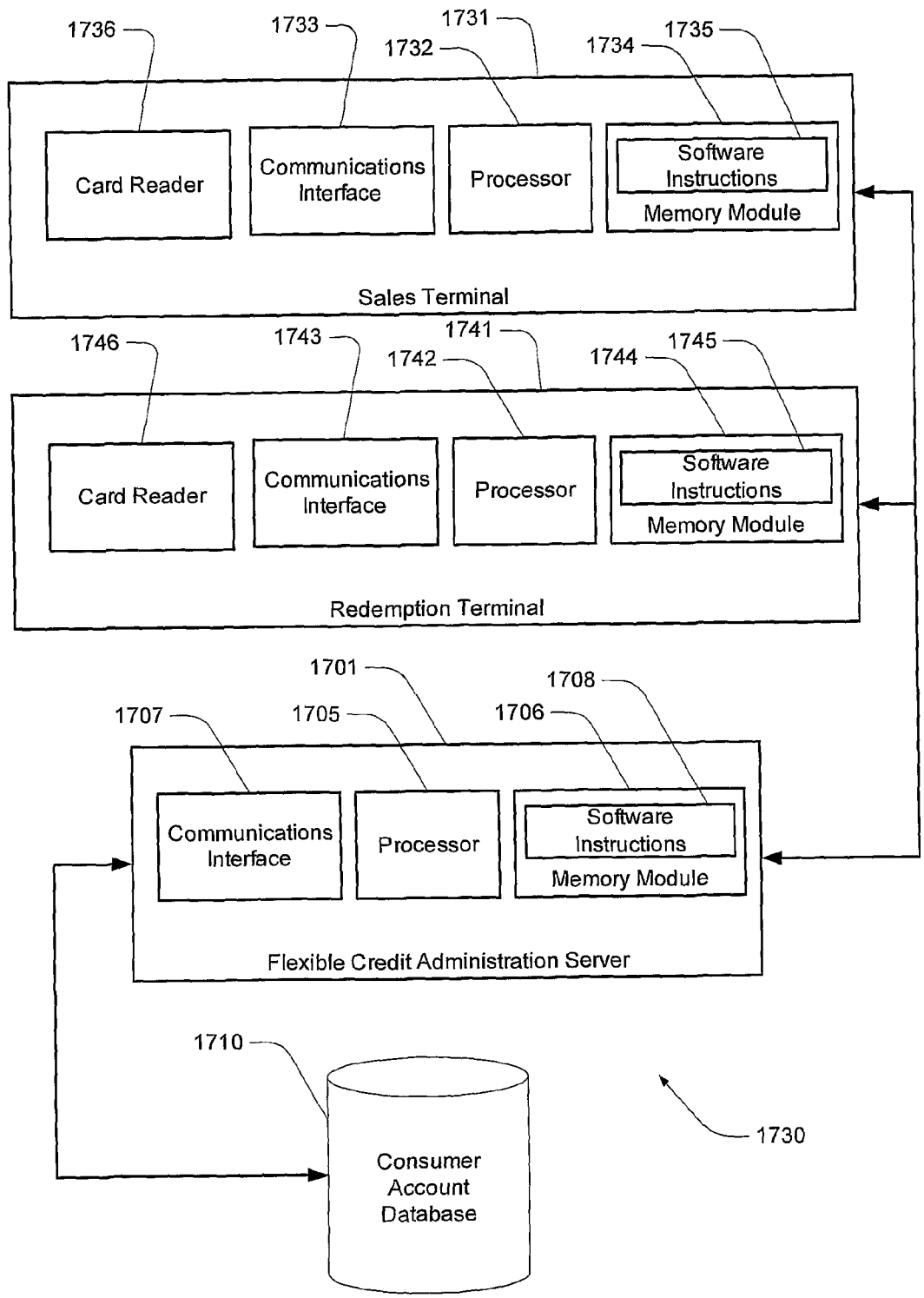
FIG. 17C illustrates an exemplary hardware arrangement according to one embodiment.

FIG. 17C illustrates an exemplary system 1730 where a server 1701 is coupled to a sales terminal 1731 and redemption terminal 1741. In some embodiments these are integrated into a single terminal.

As illustrated, terminal 1731 includes a processor 1732, communications interface 1733 and memory module 1734 (which maintains software instructions 1735).

In overview, a consumer interacts with terminal 1732 to complete a transaction having a flexible credit component. In some embodiments this is a direct interaction, whereas in other embodiments it is an indirect interaction whereby a terminal operator interacts with terminal 1732 on behalf of the consumer. The consumer provides identifying information, which is in the present embodiment read into terminal 1732 from a ID card by way of a card reader (such as a magnetic strip arrangement). This allows terminal 1732 to provide to server 1701 data indicative of a flexible credit adjustment.

As illustrated, terminal 1741 includes a processor 1742, communications interface 1743 and memory module 1744 (which maintains software instructions 1745). A card reader 1746 is also coupled to processor 1742. In overview, to redeem flexible credit/prizes, a consumer presents an ID card. Terminal 1741 then performs a query process to determine whether the ID card is indicative of a level of flexible credit. This, in some cases, requires communications with server 1701. Prizes and/or refunds are provided to the consumer where appropriate. In some cases these are provided by cash, and in some cases by way of a further ticket or other indication of entitlement that is redeemable for cash or cheque either upon presentation, or at some predetermined future point in time. In further cases, the consumer nominates a location to which the prize/refund should be delivered, such as a physical address or bank account. In some cases the consumer arranges for the prize/refund to be credited to a specified bank/credit card account.

In some embodiments, redemption is automated. For example, a consumer is invited to create a user account, this account including details of a bank account to which prizes/refunds are to be credited, and this crediting occurs automatically.

In some embodiments some or all of the general functionalities of either or both of terminal 1731 and 1741 are made available to a consumer via a personal computing platform, such as a desktop computer, laptop computer, cellular telephone, PDA, gaming console, or other platform. In some such embodiments, consumers access a website over the Internet to purchase goods/services (or otherwise complete transactions), for example by selecting risk profiles via a selection interface provided by a web-page viewable through a web-browser application, and providing funds by way of an online payment procedure. In other embodiments, consumers download proprietary software as an alternative to a browser-based approach.

In some embodiments, transactions are completed via online approaches (for example via a website accessible over the Internet) and in-store approaches (for example at a retail location having a sales terminal and/or redemption terminal). In some cases, different rules apply for transactions completed online as opposed to transactions completed in-store.

Figure 18A:
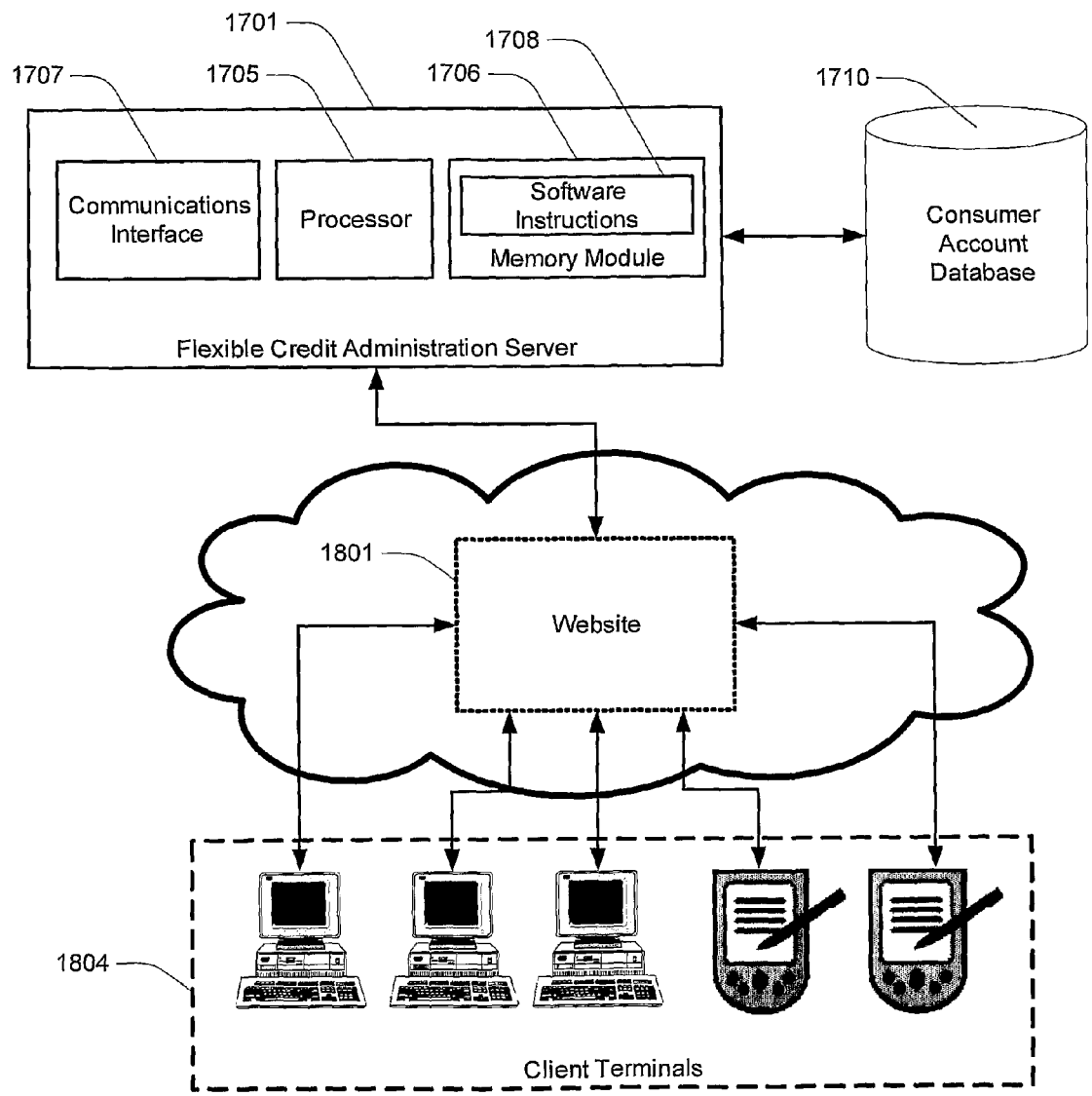
FIG. 18A illustrates an exemplary hardware arrangement according to one embodiment.
Figure 18B:
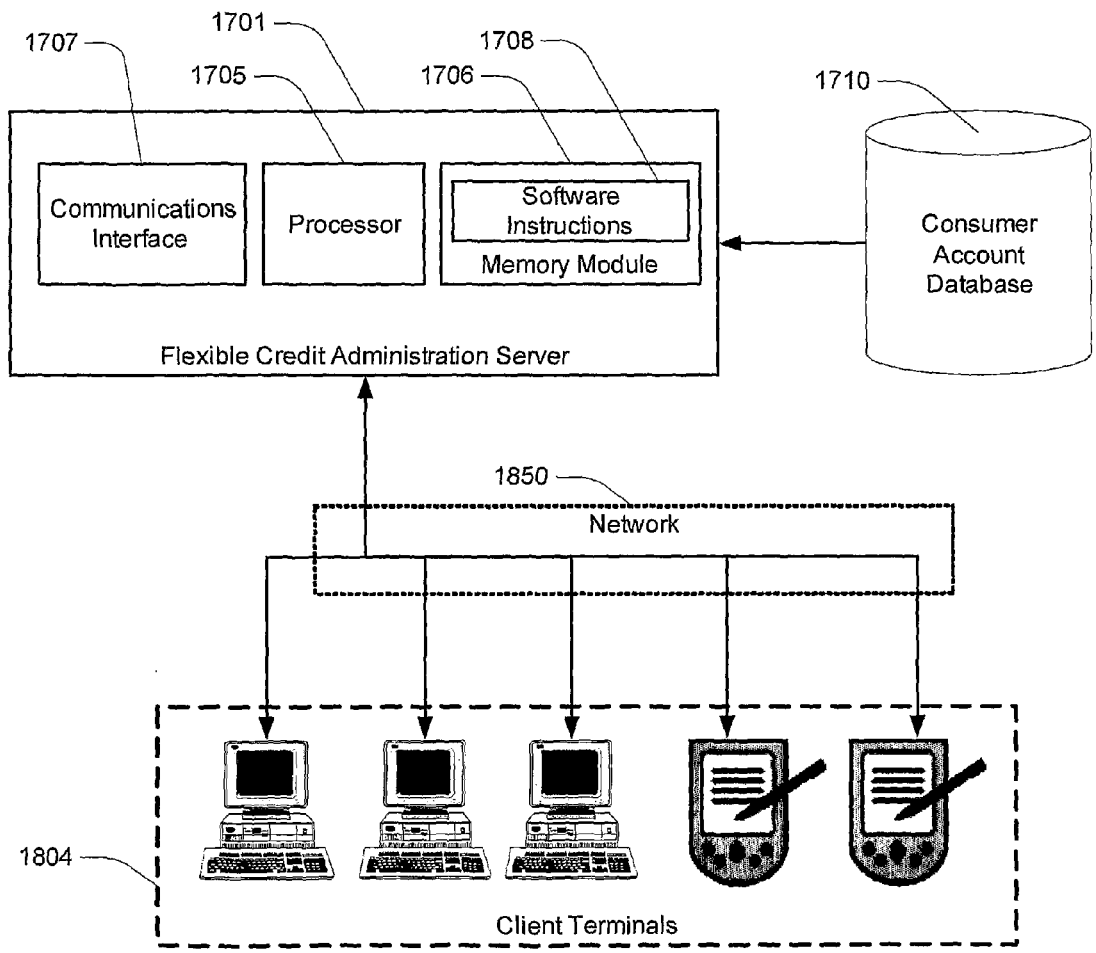
FIG. 18B illustrates an exemplary hardware arrangement according to one embodiment.

FIG. 18A and FIG. 18B illustrate two approaches for interfacing gaming administration server 1701 with a plurality of client terminals 1804 (optionally including the likes of consumers' personal terminals, and terminals provided at retail venues). In some embodiments a combination of the two approaches is used.

The approach of FIG. 18A is to provide a website 1801 on the Internet for interfacing the client terminals with the administration server. The approach of FIG. 18B is to provide a connection, such as a VPN connection, over the Internet or another network (such as a LAN or WAN) 1850 for interfacing the client terminals with the administration server.

Unless specifically stated otherwise, it should be appreciated that throughout the specification terms such as "processing," "computing," "calculating," "determining", analyzing" or the like, in some embodiments refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in some embodiments, performable by one or more processors that accept computer-readable (also called machine-readable) code containing a set of instructions that, when executed by one or more of the processors, carry out at least one of the methods described herein, or a variation on at least one of the methods described herein. Any processor capable of executing a set of instructions (sequential or otherwise) that specify actions to be taken should be included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of each of the methods described herein is in the form of a computer-readable carrier medium carrying a set of instructions (such as a computer program) that are for execution on one or more processors, (such as one or more processors that are part of an information system). Thus, as will be appreciated by those skilled in the art, embodiments of the present invention may be embodied as a method, an apparatus such as a special purpose apparatus, an apparatus such as a data processing system, or a computer-readable carrier medium (such as a computer program product). The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (such as a computer program product on a computer-readable storage medium) carrying computer-readable program code embodied in the medium.

The software may further be transmitted or received over a network via a network interface device or other communications interface. While the carrier medium is shown in an exemplary embodiment to be a single medium, the term "carrier medium" should be taken to include a single medium or multiple media (such as a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing system (such as a computer) executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Comments on Local Laws

It is appreciated that various embodiments described herein include or refer to practices or subject matter that may be considered as being contrary to local laws in various jurisdictions. To the extent that the claims below cover subject matter that is contrary to the local laws of a particular jurisdiction, the claims should be interpreted in that jurisdiction in a manner so as to exclude any practices or subject matter that is indeed contrary to those local laws. A particular example presently considered is Sharia law, which may adopt a contrary stance to various aspects of gaming and investment as described herein. However, those skilled in the art will recognize how certain embodiments of the invention may nevertheless be implemented in accordance with Sharia law.

CONCLUSIONS

It will be appreciated that the above disclosure provides for various novel and inventive systems and methods for providing gaming activities, managing flexible credit, and the like. Generally speaking, an appreciation that gaming activities may be funded without necessarily requiring consumers forfeit (or place at risk) funds allows for the application of gaming across a wider audience, and allows service providers to obtain significant competitive advantages.

Although the invention has been described with reference to specific examples, it will be appreciated by those skilled in the art that the invention may be embodied in many other forms. While there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulae given above are merely representative of procedures that may be used. Functionality may be added or deleted from the block diagrams and operations may be interchanged among functional blocks. Steps may be added to or deleted from methods described herein whilst remaining within the scope of the present invention.

The invention claimed is:

1. A processor-implemented method for providing a gaming activity, the method including the steps of:
   receiving, subject to an interaction between a consumer and a supplier, data indicative of an account identifier and associated data indicative of a flexible credit adjustment;
   querying a consumer account database to identify a consumer account corresponding to the account identifier, wherein each account includes:
   data indicative of a level of transactable flexible credit; and
   data indicative of an allocated none or more entries in relation to a risk free gaming activity;
   updating the level of flexible credit in the identified consumer account based on the flexible credit adjustment; and
   based on the flexible credit adjustment or the updated level of flexible credit in the identified consumer account, updating, by one or more processors, the data indicative of the allocated none or more entries such that the allocation of entries corresponds to the updated level of flexible credit, wherein a predetermined increase in the level of flexible credit causes an increase in the allocation of entries.

2. The method according to claim 1 wherein the transactable flexible credit includes one or more reward points in the context of a reward program.

3. The method according to claim 1 wherein the data indicative of a flexible credit adjustment includes data indicative of a residual transaction amount.

4. The method according to claim 1 wherein the data indicative of a flexible credit adjustment includes data indicative of an increase or decrease in value on a stored value card.

5. The method according to claim 1 wherein the transactable flexible credit includes gaming value in the context of a gaming value account.

6. The method according to claim 1 wherein the transactable flexible credit includes prepaid credit in the context of a prepaid credit arrangement.

7. The method according to claim 1 wherein the transactable flexible credit includes credit in an account with a financial institution.

8. The method according to claim 1 wherein the data indicative of a flexible credit adjustment includes data indicative of one or more characteristics of the interaction between the consumer and the supplier.

9. The method according to claim 8 wherein the interaction includes a transaction between the consumer and the supplier, and wherein the data indicative of a flexible credit adjustment includes data indicative of a purchase amount for the transaction between the consumer and the supplier.

10. The method according to claim 8 wherein the interaction includes a transaction between the consumer and the supplier, and wherein the data indicative of a flexible credit adjustment includes data indicative of goods and/or services related to the transaction between the consumer and the supplier.

11. The method according to claim 8 wherein the data indicative of a flexible credit adjustment includes timing information for the interaction between the consumer and the supplier.

12. The method according to claim 1 wherein the step of updating the data indicative of the allocated none or more entries is performed retrospectively.

13. The method according to claim 1 wherein the step of updating the data indicative of the allocated none or more entries includes:
- determining whether the flexible credit adjustment is positive or negative;
- in the case that the flexible credit adjustment is positive, increasing the allocation of entries; and
- in the case that the flexible credit adjustment is negative, decreasing the allocation of entries.

14. The method according to claim 13 wherein increasing the allocation of entries includes wholly or partially allocating one or more entries to the consumer account.

15. The method according to claim 13 wherein decreasing the allocation of entries includes wholly or partially de-allocating one or more entries from the consumer account.

16. The method according to claim 1 including the steps of:
- identifying one or more winning entries;
- identifying a prize amount associated with each winning entry;
- identifying one or more consumer accounts for which the data indicative of none or more entries is indicative of one or more of the winning entries;
- distributing prizes associated with the winning entries between the identified consumer accounts.

17. The method according to claim 14 wherein the data indicative of none or more entries is indicative of a non-zero allocation proportion for at least one winning entry, and wherein a portion of a prize amount associated with that winning entry is distributed to that consumer account based on the non-zero allocation proportion.

18. A computer program product having non-transitory code configured to cause one or more computers to perform a method for providing a gaming activity, including the steps of:
- receiving, subject to an interaction between a consumer and a supplier, data indicative of an account identifier and associated data indicative of a flexible credit adjustment;
- querying a consumer account database to identify a consumer account corresponding to the account identifier, wherein each account includes:
  - data indicative of a level of transactable flexible credit; and
  - data indicative of an allocated none or more entries in relation to a risk free gaming activity;
- updating the level of flexible credit in the identified consumer account based on the flexible credit adjustment; and
- based on the flexible credit adjustment or the updated level of flexible credit in the identified consumer account, updating, by one or more processors, the data indicative of the allocated none or more entries such that the allocation of entries corresponds to the updated level of flexible credit, wherein a predetermined increase in the level of flexible credit causes an increase in the allocation of entries.

19. A system for providing a gaming activity, comprising: one or more computers configured to:
- receive, subject to an interaction between a consumer and a supplier, data indicative of an account identifier and associated data indicative of a flexible credit adjustment;
- query a consumer account database to identify a consumer account corresponding to the account identifier, wherein each account includes:
  - data indicative of a level of transactable flexible credit; and
  - data indicative of an allocated none or more entries in relation to a risk free gaming activity;
- update the level of flexible credit in the identified consumer account based on the flexible credit adjustment; and
- based on the flexible credit adjustment or the updated level of flexible credit in the identified consumer account, update, by said one or more computers, the data indicative of the allocated none or more entries such that the allocation of entries corresponds to the updated level of flexible credit, wherein a predetermined increase in the level of flexible credit causes an increase in the allocation of entries.

20. A computer-readable carrier medium carrying a set of non-transitory instructions that when executed by one or more processors cause the one or more processors to carry out a gaming method including the steps of:
- receiving, subject to an interaction between a consumer and a supplier, data indicative of an account identifier and associated data indicative of a flexible credit adjustment;
- querying a consumer account database to identify a consumer account corresponding to the account identifier, wherein each account includes:
  - data indicative of a level of transactable flexible credit; and
  - data indicative of an allocated none or more entries in relation to a risk free gaming activity;
- updating the level of flexible credit in the identified consumer account based on the flexible credit adjustment; and
- based on the flexible credit adjustment or the updated level of flexible credit in the identified consumer account, updating, by the one or more processors, the data indicative of the allocated none or more entries such that the allocation of entries corresponds to the updated level of flexible credit, wherein a predetermined increase in the level of flexible credit causes an increase in the allocation of entries.

21. Apparatus for providing a gaming activity, comprising: one or more processors configured to:
- receive, subject to an interaction between a consumer and a supplier, data indicative of an account identifier and associated data indicative of a flexible credit adjustment;
- query a consumer account database to identify a consumer account corresponding to the account identifier, wherein each account includes: (i) data indicative of a level of transactable flexible credit; and (ii) data indicative of an allocated none or more entries in relation to a risk free gaming activity;
- update the level of flexible credit in the identified consumer account based on the flexible credit adjustment;
- based on the flexible credit adjustment or the updated level of flexible credit in the identified consumer account, update the data indicative of the allocated none or more entries such that the allocation of entries corresponds to the updated level of flexible credit, wherein a predetermined increase in the level of flexible credit causes an increase in the allocation of entries.

22. Apparatus according to claim 21 wherein the one or more processors are configured to query the consumer account database wherein each account includes data indicative of a level of transactable flexible credit, which includes one or more reward points in the context of a reward program.

23. Apparatus according to claim 21 wherein the one or more processors are configured to receive the data indicative of the flexible credit adjustment, which includes data indicative of a residual transaction amount.

24. Apparatus according to claim 21 wherein the one or more processors are configured to receive the data indicative of the flexible credit adjustment, which includes data indicative of an increase or decrease in value on a stored value card.

25. Apparatus according to claim 21 wherein the one or more processors are configured to update the data indicative of the allocated none or more entries by:
  determining whether the flexible credit adjustment is positive or negative;
  in the case that the flexible credit adjustment is positive, increasing the allocation of entries; and
  in the case that the flexible credit adjustment is negative, decreasing the allocation of entries.

26. A computer readable medium storing non-transitory signals causing one or more processors configured to:
  receive, subject to an interaction between a consumer and a supplier, data indicative of an account identifier and associated data indicative of a flexible credit adjustment;
  query a consumer account database to identify a consumer account corresponding to the account identifier, wherein each account includes: (i) data indicative of a level of transactable flexible credit; and (ii) data indicative of an allocated none or more entries in relation to a risk free gaming activity;
  update the level of flexible credit in the identified consumer account based on the flexible credit adjustment; and
  based on the flexible credit adjustment or the updated level of flexible credit in the identified consumer account, update the data indicative of the allocated none or more entries such that the allocation of entries corresponds to the updated level of flexible credit, wherein a predetermined increase in the level of flexible credit causes an increase in the allocation of entries.

27. The computer readable medium according to claim 26 wherein the stored non-transitory signals cause the one or more processors to query the consumer account database wherein each account includes data indicative of a level of transactable flexible credit, which includes one or more reward points in the context of a reward program.

28. The computer readable medium according to claim 26 wherein the stored non-transitory signals cause the one or more processors to receive the data indicative of the flexible credit adjustment, which includes data indicative of a residual transaction amount.

29. The computer readable medium according to claim 26 wherein the stored non-transitory signals cause the one or more processors to receive the data indicative of the flexible credit adjustment, which includes data indicative of an increase or decrease in value on a stored value card.

30. The computer readable medium according to claim 26 wherein the stored non-transitory signals cause the one or more processors to update the data indicative of the allocated none or more entries by:
  determining whether the flexible credit adjustment is positive or negative;
  in the case that the flexible credit adjustment is positive, increasing the allocation of entries; and
  in the case that the flexible credit adjustment is negative, decreasing the allocation of entries.

\* \* \* \* \*